(12) United States Patent
Kawabe et al.

(10) Patent No.: US 8,295,062 B2
(45) Date of Patent: Oct. 23, 2012

(54) SWITCHING POWER SUPPLY APPARATUS AND SEMICONDUCTOR DEVICE

(75) Inventors: Keita Kawabe, Hyogo (JP); Naohiko Morota, Hyogo (JP); Kazuhiro Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 12/721,851

(22) Filed: Mar. 11, 2010

(65) Prior Publication Data

US 2010/0309690 A1    Dec. 9, 2010

(30) Foreign Application Priority Data

Jun. 9, 2009   (JP) ................. 2009-138538

(51) Int. Cl.
*H02M 3/335* (2006.01)
(52) U.S. Cl. .................. 363/21.12; 363/21.17
(58) Field of Classification Search ..... 363/21.12–21.18
See application file for complete search history.

(56) References Cited

U.S. PATENT DOCUMENTS

| | | | |
|---|---|---|---|
| 6,445,598 B1 * | 9/2002 | Yamada ...................... | 363/21.12 |
| 6,515,876 B2 * | 2/2003 | Koike et al. ................ | 363/21.12 |
| 7,035,121 B2 | 4/2006 | Umetsu | |
| 7,212,417 B2 * | 5/2007 | Fukumoto ................. | 363/21.15 |
| 7,492,615 B2 * | 2/2009 | Morota et al. ............. | 363/21.16 |
| 7,545,657 B2 | 6/2009 | Shimada et al. | |
| 2004/0264221 A1 | 12/2004 | Mori | |
| 2005/0146901 A1 | 7/2005 | Yamada | |
| 2006/0239040 A1 | 10/2006 | Fukumoto | |
| 2008/0204307 A1 | 8/2008 | Fukuda | |
| 2009/0116265 A1 | 5/2009 | Saji | |
| 2009/0323434 A1 | 12/2009 | Komatsu et al. | |
| 2010/0039087 A1 | 2/2010 | Sakimura et al. | |

FOREIGN PATENT DOCUMENTS

| | | |
|---|---|---|
| JP | 2003-033018 | 1/2003 |
| JP | 2004-242439 | 8/2004 |
| JP | 3610964 | 10/2004 |
| JP | 4096201 | 3/2008 |
| JP | 4203768 | 10/2008 |
| WO | 2004/023633 | 3/2004 |
| WO | 2005/069469 | 7/2005 |

OTHER PUBLICATIONS

English language Abstract of JP 2003-333843 (which is Laid-Open publication of JP 3610964).

* cited by examiner

*Primary Examiner* — Jue Zhang
(74) *Attorney, Agent, or Firm* — Greenblum & Bernstein, P.L.C.

(57) ABSTRACT

The switching power supply apparatus includes a transformer including a primary winding, a secondary winding, an auxiliary winding, a switching device connected to the primary winding, an output voltage generation circuit which is connected to the secondary winding and generates an output voltage, and an auxiliary power voltage generation circuit which is connected to the auxiliary winding and generates an auxiliary power voltage. The switching power supply apparatus also includes a control circuit, which operates using the auxiliary power voltage and controls a driver circuit so that an intermittent oscillation is performed when the output voltage is higher than a first output voltage, and which controls a peak of a current flowing through a switching device is lower than a peak in a normal mode, when the auxiliary power voltage is lower than a first auxiliary power voltage in the intermittent oscillation.

15 Claims, 27 Drawing Sheets

PRIOR ART

SWITCHING POWER SUPPLY APPARATUS AND SEMICONDUCTOR DEVICE

BACKGROUND OF THE INVENTION (1) Field of the Invention

The present invention relates to a switching power supply apparatus and a semiconductor device having functions of operating a switching device to oscillate intermittently when a load is light.

(2) Description of the Related Art

It is generally known that switching power supply apparatuses which stably supply direct-current voltage to loads stop switching operations of switching devices intermittently, which is called intermittent oscillation, when the loads are light, in order to improve the power efficiency with light loads. In this intermittent oscillation, the number of switching events per unit time is reduced by intermittently providing suspension periods in which the switching devices suspend their switching operations. This allows for reduction in switching losses. Furthermore, as the loads become lighter, these suspension periods are controlled to be longer.

However, in a light load state such as a stand-by state, a long suspension period will lead to a decrease in an auxiliary power voltage which is used to supply a control circuit with a current, to the minimum voltage level that the control circuit can maintain its operation. This may cause some problems such as shutting down of the control circuit and an increase in power consumption of the control circuit. It is therefore necessary to prevent the auxiliary power voltage from decreasing to the minimum voltage level that the control circuit can maintain its operation.

First, the intermittent oscillation of conventional switching power supply apparatuses shall be described with reference to the drawings.

FIG. 17 is a block diagram showing an example of a configuration of a switching power supply apparatus 100 of a conventional design.

The switching power supply apparatus 100 is a fly-back power source including a transformer 101 having a primary winding 101a, a secondary winding 101b, and an auxiliary winding 101c.

The primary winding 101a is connected in series with a switching device 108 included in a semiconductor device 106 for controlling a switching power supply. An input voltage VINp is applied to these primary winding 101a and switching device 108. When the switching device 108 is controlled to be turned on by the control circuit 109, electrical power transfers from the primary winding 101a to the secondary winding 101b in the transformer 101.

The switching operation of the switching device 108 induces alternating-current voltage in the secondary winding 101b and the auxiliary winding 101c of the transformer 101. The induced alternating-current voltage in the secondary winding 101b is rectified and smoothed by an output voltage generation circuit 102 including a diode 102a and a capacitor 102b, resulting in an output voltage VOUTp. This output voltage VOUTp is supplied to a load 107.

The output voltage VOUTp is detected by an output voltage detection circuit 104. The output voltage detection circuit 104 feeds back to the control circuit 109 a feedback signal FB_Sp, which is in accordance with the level of the detected output voltage VOUTp. This controls the switching operation of the switching device 108, thereby adjusting energy to be supplied to the load 107. Consequently, the output voltage VOUTp is stabilized at a constant level.

The alternating-current voltage is induced also in the auxiliary winding 101c. The alternating-current voltage is rectified and smoothed by an auxiliary power voltage generation circuit 103 including a diode 103a and a capacitor 103b, resulting in an auxiliary power voltage Vccp, which is used to supply the control circuit 109 with a current.

FIG. 18 is a block diagram showing an example of a configuration of a semiconductor device 106 of a conventional design for use in the switching power supply apparatus 100 shown in FIG. 17.

The semiconductor device 106 shown in FIG. 18 includes the switching device 108 and the control circuit 109. The control circuit 109 includes a start-up constant current supply 110, a regulator 111, a start-up control circuit 112, a feedback signal control circuit 113, an oscillation circuit 117a, an AND circuit 117b, a flip-flop circuit 117c, a NAND circuit 117d, a gate driver 118, a device current detection circuit 121, a comparison circuit for detecting device current 122, a comparison circuit for controlling intermittent oscillation 131, and a reference voltage source 132.

The feedback signal control circuit 113 outputs a feedback control signal Veaop, which is a voltage signal corresponding to the feedback signal FB_Sp outputted from the output voltage detection circuit 104 shown in FIG. 17. To be specific, the feedback signal control circuit 113 increases the level of the feedback control signal Veaop when the load 107 is heavier (when the feedback signal FB_Sp is smaller according to a decrease in the output voltage VOUTp), and decreases the level of the feedback control signal Veaop when the load 107 is lighter (when the feedback signal FB_Sp is larger according to an increase in the output voltage VOUTp).

The comparison circuit for detecting device current 122 compares this feedback control signal Veaop with a device current detection signal VD_Sp, which is a voltage signal corresponding to a device current IDp flowing through the switching device 108 and outputted from the device current detection circuit 121. When the device current detection signal VD_Sp increases to the feedback control signal Veaop after the switching device 108 is turned on, the comparison circuit for detecting device current 122 changes the level of a signal S_idpp which is outputted to a reset terminal R of the flip-flop circuit 117c, from a low level to a high level, thereby turning the switching device 108 off. This means that the semiconductor device 106 controls the magnitude of the device current IDp in accordance with the load 107. In other words, this semiconductor device 106 employs the PWM control in a current mode as a method of controlling the switching operation of the switching device 108.

The comparison circuit for controlling intermittent oscillation 131 compares the feedback control signal Veaop with a reference voltage Vrp which is generated by the reference voltage source 132.

The reference voltage source 132 generates a lower-limit reference voltage Vr1p and an upper-limit reference voltage Vr2p selectively as the reference voltages Vrp in order to operate the comparison circuit for controlling intermittent oscillation 131 with hysteresis.

Now, the operation of the switching power supply apparatus 100 with a light load will be explained with reference to a timing chart shown in FIG. 19.

As shown in FIG. 19, the load 107 becomes lighter from time t1p. This increases the output voltage VOUTp, leading to a decrease in the feedback control signal Veaop. Accordingly, the comparison circuit for detecting device current 122 accelerates its timing of switching the level of the signal S_idpp from a low level to a high level. This decreases a peak value IDPp of the device current IDp flowing through the switching device 108. During the continuous oscillation of the conventional switching power supply apparatus 100, the peak value IDPp of the device current IDp is thus controlled to be smaller as the output voltage VOUTp increases. The technique related to this control is disclosed in Patent reference 1 (Japanese Unexamined Patent Application Publication 2004-242439).

When the feedback control signal Veaop decreases to the lower-limit reference voltage Vr1p at time t2p, the comparison circuit for controlling intermittent oscillation 131 switches the level of a signal S_intp which is outputted to the AND circuit 117b, from a high level to a low level. In the state where the level of this output signal S_intp is low, the level of a signal which is outputted from the AND circuit 117b and inputted to a set terminal S of the flip-flop circuit 117c is held at a low level even when the flip-flop circuit 117b receives a pulse signal CLOCKp outputted from the oscillation circuit 117a. Accordingly, as in the period from time t2p to time t3p, the switching operation is suspended with the switching device 108 being not turned on.

After that, the feedback control signal Veaop increases and when the feedback control signal Veaop reaches the upper-limit reference voltage Vr2p at time t3p, the level of the output signal S_intp from the comparison circuit for controlling intermittent oscillation 131 is switched from a low level to a high level. Accordingly, as in the period from time t3p to time t4p, the switching operation resumes.

Later, when the feedback control signal Veaop decreases to the lower-limit reference voltage Vr1p again, the switching operation is suspended as in the period from time t4p to time t5p.

The comparison circuit for controlling intermittent oscillation 131 thus controls the switching operation so that suspension periods Toffp, in which the switching operation is suspended, are provided intermittently. The intermittent oscillation is thus achieved, which leads to improvement of the power efficiency with light loads.

The following description will be directed to behavior of the auxiliary power voltage for supplying a control circuit with a current, when a load is light, in the conventional switching power supply apparatus 100 which oscillates intermittently when a load is light.

As shown in FIG. 19, during the intermittent oscillation of the switching device 108, the output voltage VOUTp increases in oscillation periods Tonp, in which the switching operation is performed, because power is supplied to the secondary side, while, the output voltage VOUTp gradually decreases in the suspension periods Toffp, in which the switching operation is not performed, because the power supply to the secondary side is suspended. Likewise, the auxiliary power voltage Vccp generated by the auxiliary power voltage generation circuit 103 shown in FIG. 17 also increases in the oscillation periods and gradually decreases in the suspension periods.

In this case, when the load 107 is light in a stand-by state or the like state, the power supply to the secondary side through the switching operation is very small and therefore, the suspension period is long. However, the power consumption by the control circuit 109 hardly changes even when the load 107 changes, with the result that, even when the load 107 is exceptionally light, the auxiliary power voltage Vccp decreases at almost the same speed as in the case with a steady load. If the auxiliary power voltage Vccp decreases, in this suspension period, to the minimum voltage level (hereinafter referred to as a minimum allowable voltage level Vccuvp) that the operation of the control circuit 109 can be maintained, the control circuit 109 becomes unable to control the switching device 108, and the operation of the control circuit 109 stops. These cause a problem that the conventional switching power supply apparatus 100 becomes unable to supply electrical power necessary for the load 107.

A known method to solve this problem is, as disclosed in Patent reference 2 (Japanese Patent 3610964), for example, to switch current supply paths so that the control circuit is supplied with a current from a drain of the switching device when the auxiliary power voltage Vccp has decreased to the minimum allowable voltage level Vccuvp.

FIG. 20 is a block diagram showing an example of a configuration of a semiconductor device 106A for use in the switching power supply apparatus, shown in Patent reference 2. This semiconductor device 106A is characterized by a configuration of a regulator 111A. A comparison circuit 119a detects that the auxiliary power voltage Vccp has decreased to the minimum allowable voltage level Vccuvp. In the semiconductor device 106A, when the auxiliary power voltage Vccp decreases to the minimum allowable voltage level Vccuvp, switches SW_A, SW_B, and SW_C included in a regulator 111A are switched on and off so that the current supply path to a control circuit 109A changes. This approach can prevent the control circuit 109A from shutting down even when the auxiliary power voltage Vccp decreases to the minimum allowable voltage level Vccuvp.

However, the drain from which a current is supplied to the control circuit 109A is higher in potential than the auxiliary power voltage Vccp, and therefore the control circuit 109A has very poor power consumption.

Other conceivable methods for reducing the decrease in the auxiliary power voltage Vccp include increasing the number of turns of the auxiliary winding 101c of the transformer 101 and increasing the capacitance of the capacitor 103b of the auxiliary power voltage generation circuit 103 in FIG. 17.

However, if the load 107 becomes even lighter and the suspension period becomes even longer, then the auxiliary power voltage Vccp inevitably decreases to the minimum allowable voltage level Vccuvp. In addition, the larger number of turns of the auxiliary winding 101c leads to an increase in the auxiliary power voltage Vccp during steady operation. In a situation, for example, where overvoltage protection is provided using the level of the auxiliary power voltage Vccp, the above circumstance may cause malfunction of this overvoltage protection. The increased capacitance of the capacitor 103b of the auxiliary power voltage generation circuit 103 leads to increases in size and cost of the switching power supply apparatus 100.

Other conventional methods to deal with the above problems will be explained below.

For example, Patent reference 3 (Japanese Patent 4096201) discloses a technique of detecting that the auxiliary power voltage has decreased to the limit level due to extended suspension periods of the intermittent oscillation, and invalidating the suspension periods.

FIG. 21A is a block diagram showing an example of a configuration of a semiconductor device 106B for use in the switching power supply apparatus, shown in Patent reference 3. Blocks corresponding to the blocks constituting the semiconductor device 106 shown in FIG. 18 are denoted by the same numerals and symbols, and explanation thereof will be omitted.

In a control circuit 109B included in the semiconductor device 106B shown in FIG. 21A, a comparison circuit for detecting auxiliary power voltage 114B compares the auxiliary power voltage Vccp with the limit level Vccthp, which is set in advance to be higher than the minimum allowable voltage level Vccuvp, and outputs a signal S_Vccp indicating a compassion result to one of input terminals of an OR circuit 120. To the other input terminal of the OR circuit 120, an output signal S_intp of the comparison circuit for controlling intermittent oscillation 131 is inputted.

FIG. 21B is a circuit diagram showing an example of a configuration of the reference voltage source 132 shown in FIG. 21A. This reference voltage source 132 selects either one of two voltage sources Vra and Vrb having different voltages in accordance with the output signal S_intp of the comparison circuit for controlling intermittent oscillation 131 and thereby generates a lower-limit reference voltage Vr1p or an upper-limit reference voltage Vr2p.

FIG. 22 is a timing chart showing an operation of the semiconductor device 106B shown in FIG. 21A which is provided, for example, with the switching power supply apparatus 100 shown in FIG. 17 and with a light load.

As shown in FIG. 22, the suspension period is invalidated at time t9p when the auxiliary power voltage Vccp decreases to the lower-limit level Vccth1p. Accordingly, the operation shifts to continuous oscillation as in the period from time t10p to time t11p. In the continuous oscillation, the auxiliary power voltage Vccp increases. This continuous oscillation continues until the auxiliary power voltage Vccp reaches an upper-limit level Vccth2p. Patent reference 3 thus discloses a way to prevent the above problems.

In addition, a switching power supply apparatus disclosed in Patent reference 4 (Japanese Patent 4203768), for example, detects that the auxiliary power voltage has decreased to the limit level due to extended suspension periods of the intermittent oscillation, as in the case of the above Patent reference 3. The switching power supply apparatus of Patent reference 4 reduces a difference in level between the lower-limit reference voltage and the upper-limit reference voltage, which are generated by the reference voltage source. In other words, the switching power supply apparatus of Patent reference 4 reduces a width of hysteresis operation of the comparison circuit for controlling intermittent oscillation, thereby shortening the cycle of the intermittent oscillation. This results in a reduction in the suspension period. The switching power supply apparatus of Patent reference 4 thus prevents the above problems.

FIG. 23A is a block diagram showing an example of a configuration of a semiconductor device 106C for use in the switching power supply apparatus, shown in Patent reference 4. Blocks corresponding to the blocks constituting the semiconductor device 106A shown in FIG. 20 and the semiconductor device 106B shown in FIG. 21A are denoted by the same numerals and symbols, and explanation thereof will be omitted.

This semiconductor device 106C is different from the semiconductor device 106B shown in FIG. 21A in that a reference voltage source 132C included in a control circuit 109C is configured as depicted in a circuit diagram of FIG. 23B and in that an output signal S_Vccp of a comparison circuit for detecting auxiliary power voltage 114C is inputted to a reference voltage source 132C.

This reference voltage source 132C switches levels of the lower-limit reference voltage and the upper-limit reference voltage in accordance with the output signal S_Vccp of the comparison circuit for detecting auxiliary power voltage 114C, using a resistive divider, thereby controlling so that a difference in level between the lower-limit reference voltage and the upper-limit reference voltage is reduced.

In sum, the semiconductor device 106C is different from the semiconductor device 106B shown in FIG. 21A in control methods applied when the auxiliary power voltage Vccp decreases to the limit level Vccthp.

FIG. 24 is a timing chart showing an operation of the semiconductor device 106C shown in FIG. 23A which is provided, for example, with the switching power supply apparatus 100 shown in FIG. 17 and with a light load.

At time t14p in FIG. 24 when the auxiliary power voltage Vccp decreases to the lower-limit level Vccth1p, the lower-limit reference voltage changes from Vr1p to Vr3p, and the upper-limit reference voltage changes from Vr2p to Vr4p. Since the lower-limit reference voltage and the upper-limit reference voltage are set in advance to satisfy Vr1p<Vr3p and Vr2p<Vr4p, respectively, the difference in level between the lower-limit reference voltage and the upper-limit reference voltage becomes smaller than that before the time t14p. Accordingly, the width of the hysteresis operation of the comparison circuit for controlling intermittent oscillation 131 becomes smaller, resulting in a reduction in the length of the cycle of the hysteresis operation. The suspension period will therefore be shorter than that before the time t14p. To be specific, the suspension period Toff1pb is provided which is shorter than the suspension period Toff1pa provided before time t14p.

Such a shorter suspension period leads to an increase in the minimum voltage level of the auxiliary power voltage Vccp during the suspension period, which prevents the above problems. Furthermore, in this method, the auxiliary power voltage Vccp decreases to the lower-limit level Vccth1p, and even after detection of this decrease, the intermittent oscillation continues, resulting in no increase in the switching loss, unlike Patent reference 3.

SUMMARY OF THE INVENTION

However, the approaches taken by these conventional switching power supply apparatuses disclosed in Patent references 3 and 4 have the following problems.

First, in the method described in Patent reference 3, the presence of the period in which no intermittent oscillation occurs causes an increase in the switching loss, which hinders sufficient improvement of power efficiency with a light load.

In the method described in Patent reference 4, in the case where switching occurs only once in one cycle of the intermittent oscillation, the reduction of the difference in level between the lower-limit reference voltage and the upper-limit reference voltage does not make the suspension period shorter and therefore, the above problems cannot be prevented.

FIG. 25 is a timing chart showing an operation of switching power supply apparatus disclosed in Patent reference 4 including the intermittent oscillation in which switching occurs only once in one cycle Tintp of the intermittent oscillation, with a long suspension period Toff2p and the auxiliary power voltage Vccp decreasing to the lower-limit level Vccth1p. This one cycle Tintp of the intermittent oscillation is given as a sum of an oscillation period Ton2p and the suspension period Toff2p, and the number of switching events in one cycle Tintp is one. A load is kept light at a certain level.

With a light load, the number of switching events in one cycle Tintp of the intermittent oscillation is determined according to a response speed of feedback, from the secondary side, of the switching power supply apparatus, and the amplitude of the change in the feedback control signal Veaop. Consequently, when the response speed of feedback is high or when the amplitude of the change in the feedback control signal Veaop is small, or alternatively when these conditions are both satisfied, the intermittent oscillation occurs with only one switching in one cycle Tintp of the intermittent oscillation.

Power P(Tp) supplied to the secondary side per unit time Tp in the intermittent oscillation is generally given by the following expression (1), using a primary inductance Lp of the transformer, a peak value IDPp of a device current flowing through the switching device, and the number of switching events Nswp per unit time.

[Math 1]

$$P(Tp) = \frac{1}{2} \times Lp \times IDP_p^2 \times Nswp \qquad (1)$$

When the load 107 does not change and is constant, the power P (Tp) supplied to the secondary side per unit time Tp in the intermittent oscillation is constant. Accordingly, when the peak value IDPp of the device current is constant during the oscillation period Tor2p, the number Nswp of switching events per unit time Tp is also constant.

In FIG. 25, the auxiliary power voltage Vccp decreases to the lower-limit level Vccth1p at time t25p, resulting in a reduction in the difference between the lower-limit reference voltage and the upper-limit reference voltage due to the above described control of Patent reference 4. To be specific, the lower-limit reference voltage Vr1p changes to Vr3p, and the upper-limit reference voltage Vr2p changes to Vr4p. However, even when the difference between the lower-limit reference voltage and the upper-limit reference voltage is reduced, the peak value IDp of the device current hardly changes, and the load 107 is kept constant, so that the number Nswp of switching events per unit time Tp does not change either according to the above expression (1). As a result, the suspension period Toff2p does not change either. Consequently, the suspension period after time t25p will be Toff2p, which is the same as that of the suspension period before time t25p. Accordingly, in this case, the auxiliary power voltage Vccp decreases further below the lower-limit level Vccth1p and cannot be prevented from reaching the minimum allowable voltage level Vccuvp as shown at time t30p.

In view of the above problems, an object of the present invention is to provide a switching power supply apparatus and a semiconductor device which are capable of inhibiting an auxiliary power voltage from decreasing to a minimum allowable voltage level, even in the case where switching occurs only once in one cycle of an intermittent oscillation.

In order to solve the above-described problems, the switching power supply apparatus according to the present invention includes a transformer including a primary winding, a secondary winding, and an auxiliary winding; a switching device connected in series with the primary winding; an output voltage generation circuit which is connected between the secondary winding and a load and generates a direct-current output voltage by rectifying and smoothing a first alternating-current voltage induced in the secondary winding; an auxiliary power voltage generation circuit which is connected to the auxiliary winding and generates an auxiliary power voltage by rectifying and smoothing a second alternating-current voltage induced in the auxiliary winding; and a control circuit which operates using the auxiliary power voltage and controls an operation of the switching device; wherein the control circuit includes: a driver circuit which generates first pulse signals for driving the switching device; an intermittent operation control circuit which controls the driver circuit so that an intermittent oscillation is performed in which the first pulse signals are generated less frequently when the output voltage is higher than a first output voltage than when the output voltage is lower than the first output voltage; an auxiliary power voltage detection circuit which detects a magnitude of the auxiliary power voltage; and a peak current control circuit which causes the driver circuit to drive the switching device in a normal mode when the auxiliary power voltage is higher than a first auxiliary power voltage in the intermittent oscillation and which causes the driver circuit to drive the switching device in an auxiliary power voltage decrease mode, in which a peak of a current flowing through the switching device is lower than a peak in the normal mode, when the auxiliary power voltage is lower than the first auxiliary power voltage in the intermittent oscillation.

With this structure, the switching power supply apparatus according to the present invention has a longer suspension period in the intermittent oscillation with a light load, and when the auxiliary power voltage decreases to the lower-limit level of limit levels, the switching power supply apparatus adjusts the current peak in the oscillation period of the intermittent oscillation to be lower than the current peak in the oscillation period of the intermittent oscillation occurring before the auxiliary power voltage decreases to the lower-limit level of limit levels. By so doing, the switching power supply apparatus according to the present invention is capable of shortening the suspension period of the intermittent oscillation and in addition, preventing the auxiliary power voltage from decreasing to the minimum allowable voltage. Accordingly, the switching power supply apparatus according to the present invention is capable of preventing problems such as shutting down of the control circuit caused due to the decrease of the auxiliary power voltage to the minimum allowable voltage, and a significant increase in power consumption.

Furthermore, the switching power supply apparatus according to the present invention is capable of controlling the auxiliary power voltage so that it does not decrease to the minimum allowable voltage level, because the suspension period can be shortened by lowering the current peak in the oscillation period even when switching occurs only once in one cycle of the intermittent oscillation.

Furthermore, the switching power supply apparatus according to the present invention is capable of maintaining the effects of power efficiency improvement, because the intermittent oscillation can continue even after detection of the decrease in the auxiliary power voltage to the lower-limit level of limit levels.

Furthermore, the first auxiliary power voltage may be higher than a minimum voltage that the control circuit can operate.

Furthermore, the switching power supply apparatus may further include an output voltage detection circuit which detects a magnitude of the output voltage and generates a feedback control signal indicating the magnitude of the output voltage, wherein the peak current control circuit further controls the driver circuit by using the feedback control signal so that, in both of the normal mode and the auxiliary power voltage decrease mode, the peak of the current flowing through the switching device becomes lower as the output voltage becomes higher, the peak being included in each of the first pulse signals.

With this structure, the switching power supply apparatus according to the present invention is capable of controlling the output voltage so that it is constant, by controlling the peak of the current flowing through the switching device according to the output voltage.

Furthermore, the intermittent operation control circuit may include: a reference voltage source which generates a first reference voltage corresponding to the first output voltage; and a comparison circuit for controlling intermittent oscillation, which (i) compares the feedback control signal with the first reference voltage to determine whether or not the output voltage is higher than the first output voltage, (ii) keeps the driver circuit from generating the first pulse signals when the output voltage is higher than the first output voltage, and (iii) causes the driver circuit to generate the first pulse signals when the output voltage is lower than the first output voltage, and the peak current control circuit may include: a device current detection circuit which detects the device current flowing through the switching device and generates a device current detection signal, which varies to a further extent as the device current becomes larger, in an opposite orientation to an orientation in which the feedback control signal varies as the output voltage becomes higher; a comparison circuit for detecting device current, which compares the feedback control signal with the device current detection signal and controls the driver circuit so that each of the first pulse signals becomes inactive at a moment when the device current detection signal and the feedback control signal are equalized; and a current peak conversion circuit which converts at least one of the feedback control signal and the device current detection signal, which are inputted to the comparison circuit for detecting device current, so that each of the first pulse signals becomes inactive earlier in the auxiliary power voltage decrease mode than in the normal mode.

With this structure, the comparison circuit for detecting device current or the like device in the switching power supply apparatus according to the present invention can be used for both controls of lowering the peak of the current flowing through the switching device when the auxiliary power voltage is decreasing, and of changing the peak of the current flowing through the switching device according to the output voltage. This allows the switching power supply apparatus according to the present invention to inhibit its circuit area from increasing.

Furthermore, the reference voltage source may further generate a second reference voltage corresponding to a second output voltage higher than the first output voltage, the comparison circuit for controlling intermittent oscillation may further (i) compare the feedback control signal with the second reference voltage to determine whether or not the output voltage is higher than the second output voltage, (ii) keep the driver circuit from generating the first pulse signals when the output voltage is higher than the second reference voltage, and (ii) cause the driver circuit to generate the first pulse signals when the output voltage is lower than the second output voltage, and the current peak conversion circuit may cause the reference voltage source in the normal mode to generate the first reference voltage and cause the reference voltage source in the auxiliary power voltage decrease mode to generate the second reference voltage so that the feedback control signal which is inputted to the comparison circuit for detecting device current varies to a further extent in the auxiliary power voltage decrease mode than in the normal mode, in an orientation in which the feedback control signal changes as the output voltage becomes higher.

Furthermore, the reference voltage source may generate the first reference voltage and the second reference voltage as lower-limit reference voltages and further generate a third reference voltage and a fourth reference voltage as upper-limit reference voltages, the third reference voltage corresponding to a third output voltage higher than the first output voltage, and the fourth reference voltage corresponding to a fourth output voltage higher than the second output voltage, the comparison circuit for controlling intermittent oscillation may compare the feedback control signal with the lower-limit voltages and the upper-limit voltages to keep the driver circuit from generating the first pulse signals from when the output voltage increases to a level corresponding to the upper-limit voltages until when the output voltage decreases to a level corresponding to the lower-limit voltages, and the current peak conversion circuit may cause the reference voltage source in the normal mode to generate the first reference voltage as the lower-limit reference voltages and generate the third reference voltage as the upper-limit voltages, and cause the reference source in the auxiliary power voltage decrease mode to generate the second reference voltage as the lower-limit reference voltages and generate the fourth reference voltage as the upper-limit reference voltages.

Furthermore, the second output voltage may be higher than the third output voltage.

With this structure, the switching power supply apparatus according to the present invention is capable of increasing the difference between the current peak in the normal mode and the current peak in the auxiliary power voltage decrease mode.

Furthermore, the current peak conversion circuit may vary the feedback control signal which is inputted to the comparison circuit for detecting device current to a further extent in the auxiliary power voltage decrease mode than in the normal mode, in an orientation in which the feedback control signal changes as the output voltage becomes higher.

Furthermore, the current peak conversion circuit may vary the device current detection signal which is inputted to the comparison circuit for detecting device current to a further extent in the auxiliary power voltage mode than in the normal mode, in an orientation in which the device current detection signal changes as the output voltage becomes higher.

Furthermore, the device current detection circuit may detect voltages on both terminals of the switching device to generate the device current detection signal.

With this structure, the switching power supply apparatus according to the present invention no longer needs a sense resistor and therefore requires a reduced circuit area as compared to another switching power supply apparatus having a sense resistor, and moreover is capable of reducing loss.

Furthermore, the driver circuit may includes: a flip-flop circuit which generates the first pulse signals to turn on the switching device when the flip-flop circuit is in a set state and to turn off the switching device when the flip-flop circuit is in a reset state; an oscillation circuit which generates second pulse signals, which are generated at constant frequency; and a logical AND circuit which supplies the second pulse signals to a set terminal of the flip-flop circuit when the comparison circuit for controlling intermittent oscillation determines that the output voltage is lower the first output voltage and which maintains an existing state of the flip-flop circuit when the comparison circuit for controlling intermittent oscillation determines that the output voltage is higher the first output voltage, and the comparison circuit for detecting device current may reset the flip-flop circuit at a moment when the device current detection signal and the feedback control signal are equalized.

Furthermore, the semiconductor device according to the present invention may include the above control circuit which is provided on a single semiconductor chip.

With this structure, main circuit components are provided in one semiconductor chip, allowing for a reduction in the number of components for constituting the circuit. The use of the semiconductor device according to the present invention can therefore realize smaller size and weight, and in addition, a lower cost of the switching power supply apparatus.

Furthermore, the semiconductor device according to the present invention may include the above control circuit and the above switching device which are provided on a single semiconductor chip.

With this structure, main circuit components are provided in one semiconductor chip, allowing for a reduction in the number of components for constituting the circuit. The use of the semiconductor device according to the present invention can therefore realize smaller size and weight, and in addition, a lower cost of the switching power supply apparatus.

Furthermore, the semiconductor device according to the present invention may include the above control circuit which is provided over semiconductor chips, and the semiconductor chips may be included in a single module.

With this structure, main circuit components are provided in one semiconductor chip, allowing for a reduction in the number of components for constituting the circuit. The use of the semiconductor device according to the present invention can therefore realize smaller size and weight, and in addition, a lower cost of the switching power supply apparatus.

Furthermore, the semiconductor device according to the present invention may include the above control circuit and the above switching device which are provided over semiconductor chips, and the semiconductor chips may be included in a single module.

With this structure, main circuit components are provided in one semiconductor chip, allowing for a reduction in the number of components for constituting the circuit. The use of the semiconductor device according to the present invention can therefore realize smaller size and weight, and in addition, a lower cost of the switching power supply apparatus.

It is to be noted that the present invention can be implemented not only as the above-described switching power supply apparatus and semiconductor device but also as a method of controlling the switching power supply apparatus, which includes, as steps, characteristic means included in the switching power supply apparatus.

As above, the present invention can provide the switching power supply apparatus and the semiconductor device which are capable of reducing a decrease in the auxiliary power voltage to the minimum allowable voltage level even when switching occurs only once in one cycle of the intermittent oscillation.

FURTHER INFORMATION ABOUT TECHNICAL BACKGROUND TO THIS APPLICATION

The disclosure of Japanese Patent Application No. 2009-138538 filed on Jun. 9, 2009 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
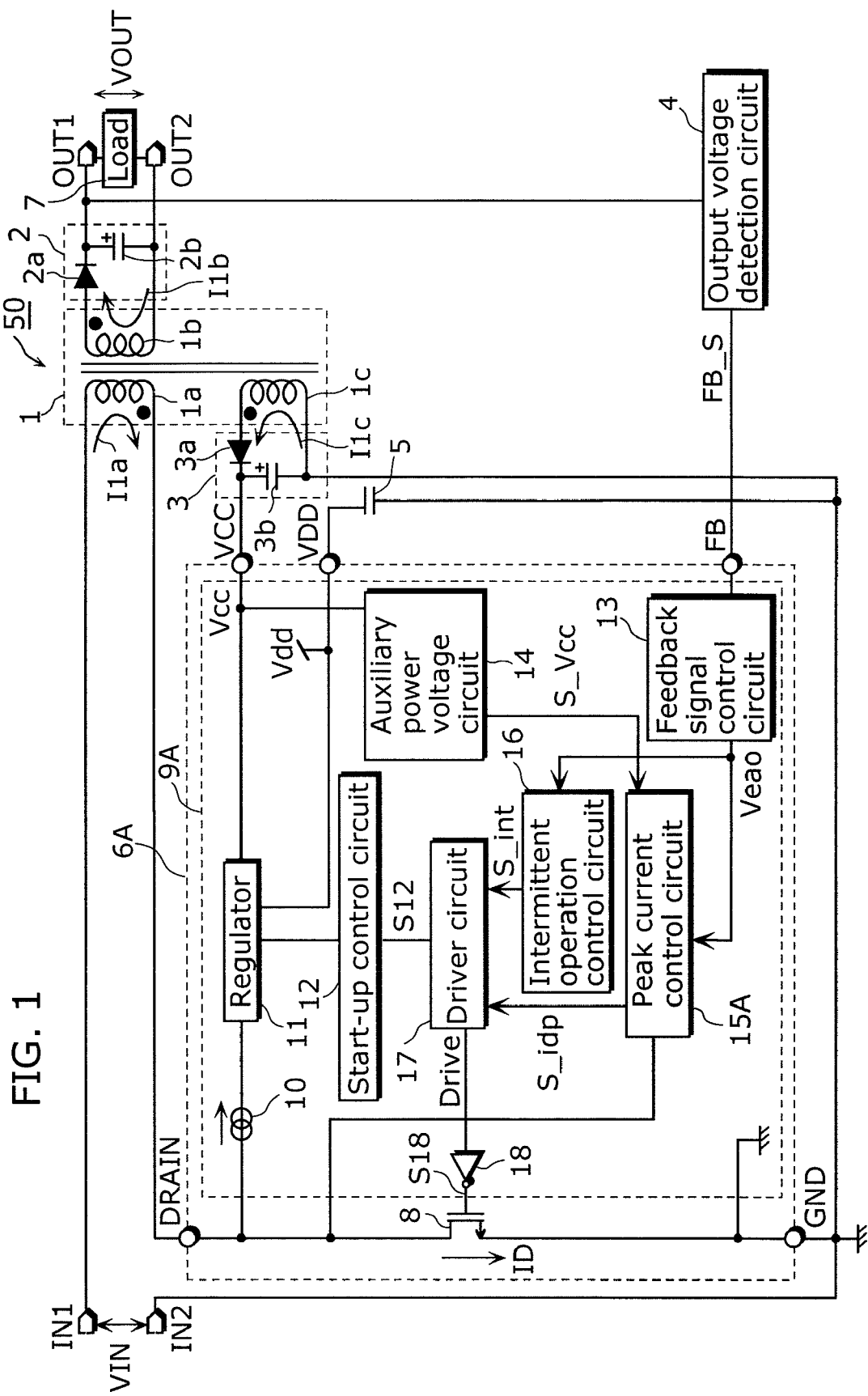
FIG. 1 is a block diagram showing an example of a configuration of a switching power supply apparatus according to a first embodiment of the present invention.

In the following, some examples of embodiments for carrying out the present invention will be described with reference to the drawings. In the drawings, elements with substantially the same configurations, operations, and effects are denoted by the same numerals and symbols. Furthermore, all numerical figures in the following description are only examples for specifically explaining the present invention, which is thus not limited to these illustrated numerical figures. Moreover, the logic level represented by "high" and "low" and the switching state represented by "ON" and "OFF" are also examples for specifically explaining the present invention, and different combinations of these exemplified logic level and switching state may lead to equivalent results. The connections of constituents are also examples for specifically explaining the present invention, and the connections for attaining functionality of the present invention is thus not limited to the exemplified connections. In addition, the following embodiments take the form of hardware and/or software, and the form of hardware may be achieved with software while the form of software may be achieved with hardware.

First Embodiment

FIG. 1 is a block diagram showing an example of a configuration of a switching power supply apparatus 50 according to the first embodiment of the present invention.

The switching power supply apparatus 50 shown in FIG. 1 includes an input terminal IN1, an input terminal IN2, an output terminal OUT1, an output terminal OUT2, a transformer 1, an output voltage generation circuit 2, an auxiliary power voltage generation circuit 3, an output voltage detection circuit 4, a capacitor 5, and a semiconductor device 6A. The switching power supply apparatus 50 supplies a substantially direct-current output voltage VOUT to a load 7 connected between the output terminal OUT1 and the output terminal OUT2 based on a substantially direct-current input voltage VIN provided between the input terminal IN1 and the input terminal IN2.

The semiconductor device 6A includes a switching device 8, a drain terminal DRAIN, an auxiliary power voltage input terminal VCC, an internal circuit power terminal VDD, a feedback signal input terminal FB, a ground terminal GND, and a control circuit 9A.

The transformer 1 includes a primary winding 1a, a secondary winding 1b, and an auxiliary winding 1c.

The ground terminal GND is always held at a ground potential and functions as a ground terminal for the entire switching power supply apparatus 50.

The input terminal IN2 is connected to the ground terminal GND. The primary winding 1a has one terminal connected to the input terminal IN1 and the other terminal connected to a drain of the switching device 8 via the drain terminal DRAIN. The switching device 8 has a gate connected to a gate driver 18 of the control circuit 9A and a source connected to the ground terminal GND.

The switching device 8 is connected in series with the primary winding 1a. The switching of the switching device 8 is controlled based on a control signal S18 which is generated by the control circuit 9A and, in detail, outputted by the gate driver 18. To be specific, the switching device 8 is repeatedly turned on and off, thereby switching between conduction and non-conduction of the device current ID, which flows between the drain and the source of the switching device 8.

The switching device 8 is formed of a transistor device such as a negative channel metal oxide semiconductor (NMOS) transistor or an insulated gate bipolar transistor (IGBT). The switching device 8 may be composed of one transistor device or of multiple transistor devices.

The secondary winding 1b is connected to the output voltage generation circuit 2 including a diode 2a and a capacitor 2b. The secondary winding 1b has one terminal connected to an anode of the diode 2a and the other terminal connected to an output terminal OUT2 via a negative terminal of the capacitor 2b. A cathode of the diode 2a is connected to the output terminal OUT1 via a positive terminal of a capacitor 2b.

This secondary winding 1b is opposite in polarity to the primary winding 1a. This means that the switching power supply apparatus 50 is of the flyback type. While the switching device 8 is in an ON state, a primary current I1a (which is substantially corresponding to the device current ID) flows from the input terminal IN to the drain terminal DRAIN through the primary winding 1a based on the input voltage VIN, resulting in energy storage in the transformer 1. At this time, the secondary current I1b attempts to flow in such a direction that the energy is offset, that is, in an opposite direction to a conducting direction of the diode 2a (an opposite direction to the direction of the secondary current 1b shown in FIG. 1), but does not flow, being blocked by the diode 2a. Next turning off of the switching device 8 allows the secondary current I1b to flow in the conducting direction of the diode 2a based on the stored energy. In addition, this secondary current I1b is smoothed at the capacitor 2b.

The transformer 1 thus converts to the first alternating-current voltage the input voltage which is provided by the switching of the switching device 8.

The output voltage generation circuit 2 is connected between the secondary winding 1b and the load 7. The output voltage generation circuit 2 generates a direct-current output voltage VOUT by rectifying and smoothing the first alternating-current voltage induced by the secondary winding 1b through the switching operation of the switching device 8, and supplies the output voltage VOUT to the load 7 connected to the output terminals OUT1 and OUT2.

The auxiliary winding 1c is connected to the auxiliary power voltage generation circuit 3 including a diode 3a and a capacitor 3b. The auxiliary winding 1c has one terminal connected to an anode of the diode 3a and the other terminal connected to a negative terminal of the capacitor 3b. A cathode of the diode 3a is connected to a positive terminal of the capacitor 3b and connected to an auxiliary power voltage input terminal VCC of the semiconductor device 6A. The negative terminal of the capacitor 3b is connected to the ground terminal GND of the semiconductor device 6A.

This auxiliary winding is the same in polarity as the secondary winding 1b. Accordingly, when the secondary current I1b flows through the secondary winding 1b, a control current I1c flows in a conducting direction of the diode 3a and is smoothed at the capacitor 3b.

The auxiliary power voltage generation circuit 3 is connected to the auxiliary winding 1c. The auxiliary power voltage generation circuit 3 generates an auxiliary power voltage Vcc by rectifying and smoothing the second alternating-current voltage induced by the auxiliary winding 1c through the switching operation of the switching device 8. Furthermore, the auxiliary power voltage generation circuit 3 supplies a current to the control circuit 9A via the auxiliary power voltage input terminal VCC of the semiconductor device 6A.

The output voltage detection circuit 4 detects a level of the output voltage VOUT and according to the detected level of the output voltage VOUT, the output voltage detection circuit 4 outputs a feedback signal FB_S, which is proportional to the level of the output voltage VOUT. The feedback signal FB_S is inputted to the feedback signal control circuit 13 inside the control circuit 9A via a feedback signal input terminal FB of the semiconductor device 6A.

The capacitor 5 is connected between the internal circuit power terminal VDD and the ground terminal GND.

The control circuit 9A operates using the auxiliary power voltage Vcc and controls the switching operation of the switching device 8. To be specific, the control circuit 9A causes continuous oscillation in which the switching device 8 is continuously on and off in a predetermined cycle when the output voltage VOUT is lower than the first output voltage level, and the control circuit 9A causes intermittent oscillation in which the switching operation of the switching device 8 is suspended intermittently when the output voltage VOUT is equal to or higher than the first output voltage level.

In both the continuous oscillation and the intermittent oscillation, the control circuit 9A controls such that the peak of the current flowing through the switching device 8 becomes lower as the output voltage VOUT becomes higher.

Furthermore, the control circuit 9A drives the switching device 8 in a normal mode when the auxiliary power voltage Vcc is higher than a limit level Vccth during the intermittent operation, while the control circuit 9A drives the switching device 8 in an auxiliary power voltage decrease mode when the auxiliary power voltage Vcc is lower than the limit level Vccth during the intermittent operation. The peak of the current flowing through the switching device 8 is lower in the auxiliary power voltage decrease mode than in the normal mode.

This control circuit 9A includes a start-up constant current source 10, a regulator 11, a start-up control circuit 12, a feedback signal control circuit 13, an auxiliary power voltage detection circuit 14, a peak current control circuit 15A, an intermittent operation control circuit 16, a driver circuit 17, and a gate driver 18.

The start-up constant current source 10 is connected between the drain terminal DRAIN and the regulator 11. The start-up constant current source 10 supplies, based on the input voltage VIN, a circuit current for start-up to the capacitor 5 via the regulator 11 and the internal circuit power terminal VDD.

The regulator 111 is connected between the start-up constant current source 10 and the auxiliary power voltage input terminal VCC. At the time of start-up before the switching device 8 starts its switching operation, the regulator 11 supplies a current from the start-up constant current source 10 to the capacitor 5 via the internal circuit power terminal VDD and simultaneously supplies a current to the capacitor 3b of the auxiliary power voltage generation circuit 3 via the auxiliary power voltage input terminal VCC, thereby increasing both of an internal circuit power voltage Vdd and the auxiliary power voltage Vcc.

Later, when the internal circuit power voltage Vdd reaches a start-up voltage Vddon and the switching device 8 starts its switching operation, the regulator 11 stops the current supply from the start-up constant current source 10 and starts the current supply from the auxiliary power voltage input terminal VCC to the internal circuit power terminal VDD. While the switching device 8 performs its switching operation, the control circuit 9A is supplied with a current from the auxiliary power voltage input terminal VCC, so that the internal circuit power voltage Vdd is stabilized at a constant level.

Furthermore, the regulator 11 and the capacitor 5 supply the internal circuit power voltage Vdd to each circuit included in the control circuit 9A.

The start-up control circuit 12 generates, based on the internal circuit power voltage Vdd, a start-up control signal S12, which represents a signal enabling or suspending the switching operation of the switching device 8. When the internal circuit power voltage Vdd is lower than the start-up voltage Vddon, the start-up control circuit 12 sets the start-up control signal S12 at a low level to stop the switching operation of the switching device 8. When the internal circuit power voltage Vdd is equal to or higher than the start-up voltage Vddon, the start-up control circuit 12 sets the start-up control signal S12 at a high level to enable the switching operation of the switching device 8. In other words, the start-up control circuit 12 controls such that the switching device 8 is brought into the switching-suspended state when the internal circuit power voltage Vdd is lower than the start-up voltage Vddon and that the switching device 8 is brought into the switching-enabled state when the internal circuit power voltage Vdd is equal to or higher than the start-up voltage Vddon.

The feedback signal control circuit 13 has its input terminal connected to the feedback signal input terminal FB. The feedback signal control circuit 13 generates a feedback control signal Veao, which is a voltage signal in accordance with the feedback signal FB_S generated by the output voltage detection circuit 4. To be specific, the feedback signal control circuit 13 increases the level of the feedback control signal Veao when the load 7 is heavier with the feedback signal FB_S being smaller according to a decrease in the output voltage VOUT, and decreases the level of the feedback control signal Veao when the load 107 is lighter with the feedback signal FB_S being larger according to an increase in the output voltage VOUT.

The auxiliary power voltage detection circuit 14 detects the level of the auxiliary power voltage Vcc, compares the detected auxiliary power voltage Vcc with the limit level Vccth, and generates a comparison result signal S_Vcc indicating a comparison result. To be specific, the auxiliary power voltage detection circuit 14 changes the level of the comparison result signal S_Vcc from a low level to a high level when the level of the auxiliary power voltage Vcc is equal to or lower than the limit level Vccth. The limit-level Vccth is set in advance to be lower than the voltage level determined according to a ratio of the number of turns of the windings of the transformer 1 and higher than the minimum allowable voltage level Vccuv of the control circuit 9A. The minimum allowable voltage level Vccuv is the minimum voltage level that the operation of the control circuit 9A can be maintained.

The limit level Vccth includes a lower-limit level Vccth1 and an upper-limit level Vccth2, and the auxiliary power voltage detection circuit 14 operates with hysteresis in accordance with the level of the auxiliary power voltage Vcc. To be specific, the level of the comparison result signal S_Vcc is changed from a low level to a high level when the level of the auxiliary power voltage Vcc decreases to the limit level Vccth1, and later when the level of the auxiliary power voltage Vcc increases to the upper-limit level Vccth2, the comparison result signal S_Vcc is changed from a high level to a low level.

The driver circuit 17 is connected to the start-up control circuit 12, the peak current control circuit 15A, and the gate driver 18. The driver circuit 17 generates a drive signal Drive, which is the first pulse signal for driving the switching device 8.

The gate driver 18 generates the control signal S18 indicating a logical negation of the drive signal Drive.

When the control signal S18 is at a high level, the switching device 8 is in an ON state, while, when the control signal S18 is at a low level, the switching device 8 is in an OFF state. In other words, the switching device 8 is in an ON state when the drive signal Drive is at a low level, and is in an OFF state when the drive signal Drive is at a high level.

The intermittent operation control circuit 16 is connected to the feedback signal control circuit 13 and the driver circuit 17. The intermittent operation control circuit 16 generates a comparison result signal S_int to control the driver circuit 17 so that the driver circuit 17 drives the switching device 8 to oscillate continuously or intermittently according to the level of the feedback control signal Veao. To be specific, when the output voltage VOUT is equal to or higher than the first output voltage level, the intermittent operation control circuit 16 controls the driver circuit 17 so that the driver circuit 17 drives the switching device 8 to oscillate intermittently, and when the output voltage VOUT is lower than the first output voltage level, the intermittent operation control circuit 16 controls the driver circuit 17 so that the driver circuit 17 drives the switching device 8 to oscillate continuously.

The driver circuit 17 less frequently generates the pulse which is included in the drive signal Drive, in the intermittent oscillation than in the continuous oscillation.

The peak current control circuit 15A is connected to the feedback signal control circuit 13, the auxiliary power voltage detection circuit 14, the intermittent operation control circuit 16, the driver circuit 17, and the drain of the switching device 8. This peak current control circuit 15A generates, according to the comparison result signal S_Vcc, the comparison result signal S_int for driving the driver circuit 17 in the normal mode or in the auxiliary power voltage decrease mode. To be specific, the peak current control circuit 15A causes the driver circuit 17 to drive the switching device 8 in the normal mode when the auxiliary power voltage Vcc is higher than the limit level Vccth in the intermittent oscillation, and to drive the switching device 8 in the auxiliary power voltage decrease mode, in which the peak of the current flowing through the switching device 8 is lower than that in the normal mode, when the auxiliary power voltage Vcc is lower than the limit level Vccth in the intermittent oscillation.

The peak current control circuit 15A controls the driver circuit 17 such that the peak value IDP of the device current ID flowing through the switching device 8 in each pulse included in the drive signal Drive becomes lower as the output voltage VOUT becomes higher, both in the normal mode and in the auxiliary power voltage decrease mode. To be specific, the peak current control circuit 15A generates a comparison result signal S_idp, by which timing of a rising edge of each pulse included in the drive signal Drive is determined according to the level of the feedback control signal Veao, and outputs this comparison result signal S_idp to the drive circuit 17.

Figure 2:
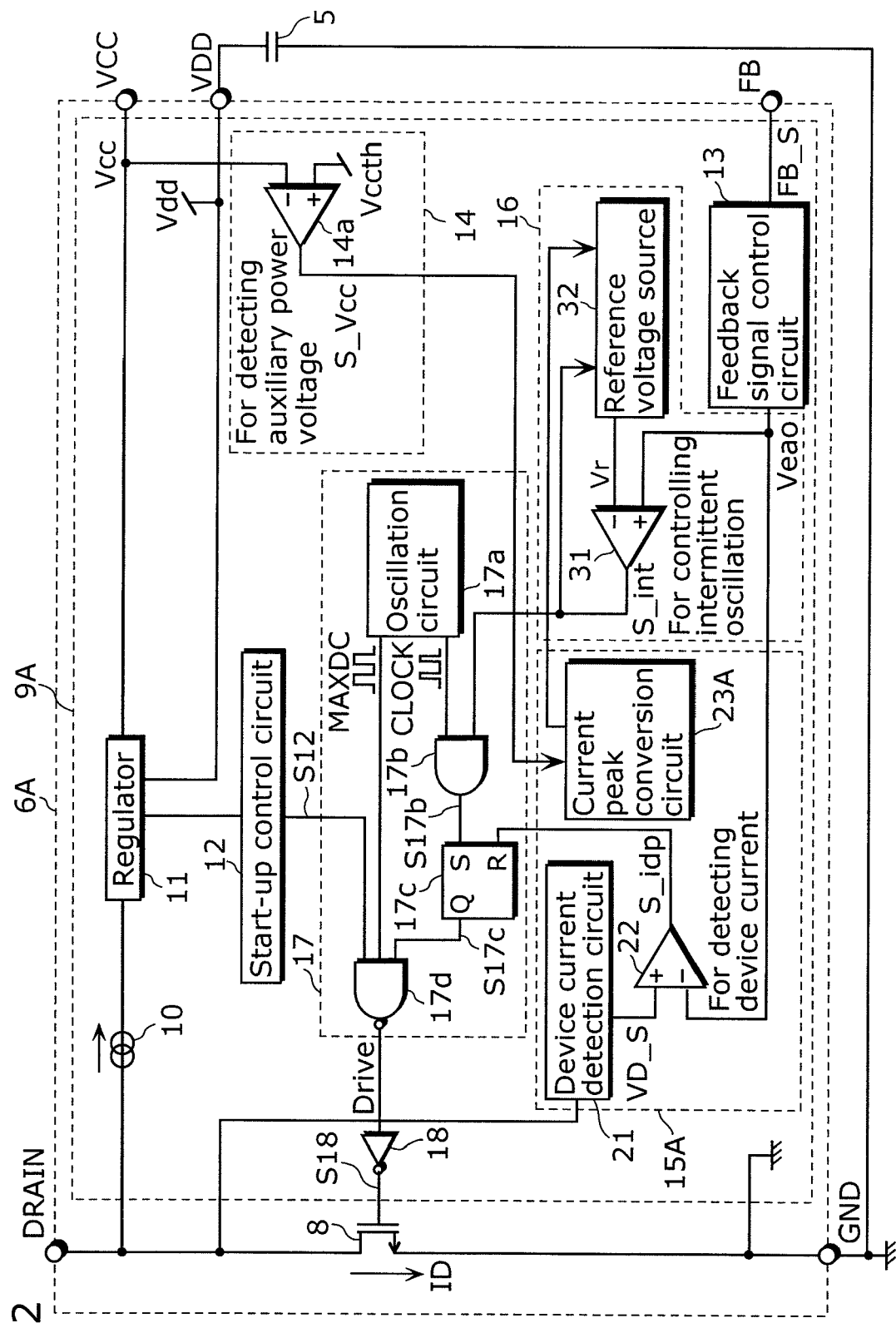
FIG. 2 is a block diagram showing an example of a configuration of a semiconductor device according to the first embodiment of the present invention.

FIG. 2 is a block diagram showing a more specific example of a configuration of the semiconductor device 6A according to the first embodiment of the present invention for use in the above switching power supply apparatus 50 shown in FIG. 1.

As shown in FIG. 2, the peak current control circuit 15A includes a device current detection circuit 21, a comparison circuit for detecting device current 22, and a current peak conversion circuit 23A. The auxiliary power voltage detection circuit 14 includes a comparison circuit for detecting auxiliary power voltage 14a.

The device current detection circuit 21 detects the magnitude of the device current ID flowing between the drain and the source of the switching device 8. The device current detection circuit 21 generates a device current detection signal VD_S representing signals which are monotonically increasing relative to the magnitude of the device current ID. This device current detection signal VD_S changes to a further extent, as the device current ID becomes larger, in an opposite orientation to an orientation in which the feed back control signal Veao changes as the output voltage VOUT becomes higher. The device current detection signal VD_S is inputted to a non-inverting input terminal of the comparison circuit for detecting device current 22. For example, the device current detection circuit 21 detects voltages at both terminals of the switching device 8 to generate the device current detection signal VD_S.

The comparison circuit for detecting device current 22 receives the device current detection signal VD_S through its non-inverting input terminal and receives the feedback control signal Veao through its inverting input terminal. This comparison circuit for detecting device current 22 compares the device current detection signal VD_S with the feedback control signal Veao, and generates the comparison result signal S_idp indicating a comparison result. This comparison result signal S_idp for controlling the driver circuit 17 such that each pulse included in the drive signal Drive becomes inactive at a moment when the device current detection signal VD_S and the feedback control signal Veao are equalized. To be specific, when the level of the device current detection signal VD_S is equal to or higher than the feedback control signal Veao, the comparison result signal S_idp is changed from a low level to a high level.

The current peak conversion circuit 23A is connected to the peak current control circuit 15A and the comparison circuit for detecting auxiliary power voltage 14a. This current peak conversion circuit 23A converts the feedback control signal Veao which is inputted to the comparison circuit for detecting device current 22 so that when the comparison result signal S_Vcc outputted from the comparison circuit for detecting auxiliary power voltage 14a indicates the auxiliary power voltage decrease mode, each pulse included in the drive signal Drive becomes inactive earlier than in the normal mode. In sum, the current peak conversion circuit 23A operates so as to convert the state of the comparison result signal S_idp outputted from the peak current control circuit 15A to the driver circuit 17.

The intermittent operation control circuit 16 includes a comparison circuit for controlling intermittent oscillation 31 and a reference voltage source 32 as shown in FIG. 2.

The comparison circuit for controlling intermittent oscillation 31 receives the feedback control signal Veao through its non-inverting input terminal and receives through its inverting input terminal a reference voltage Vr outputted from the reference voltage source 32. This comparison circuit for controlling intermittent oscillation 31 compares the feedback control signal Veao with the reference voltage Vr corresponding to the first output voltage level, and generates the comparison result signal S_int indicating a comparison result. To be specific, the comparison circuit for controlling intermittent oscillation 31 changes the comparison result signal S_int from a low level to a high level when the level of the feedback control signal Veao is equal to or higher than the reference voltage Vr.

In other words, the comparison circuit for controlling intermittent oscillation 31 determines whether or not the output voltage VOUT is higher than the first output voltage level, and when the output voltage VOUT is higher than the first output voltage level, the comparison circuit for controlling intermittent oscillation 31 does not cause the driver circuit 17 to generate the pulse, while, when the output voltage VOUT is lower than the first output voltage level, the comparison circuit for controlling intermittent oscillation 31 causes the driver circuit 17 to generate the pulse.

The reference voltage source 32 generates the reference voltage Vr which is inputted to the inverting input terminal of the comparison circuit for controlling intermittent oscillation 31 as described above. The level of the reference voltage Vr is changed according to the level of the comparison result signal S_int outputted from the comparison circuit for controlling intermittent oscillation 31. To be specific, the reference voltage source 32 generates a lower-limit reference voltage Vr1a when the comparison result signal S_int is at a high level, and generates an upper-limit reference voltage Vr2a when the comparison result signal S_int is at a low level.

The driver circuit 17 includes an oscillation circuit 17a, an AND circuit 17b, a flip-flop circuit 17c, and a three-input NAND circuit 17d as shown in FIG. 2.

The oscillation circuit 17a generates a constant frequency pulse signal CLOCK and a maximum duty cycle signal MAXDC. The pulse signal CLOCK is inputted to one of the input terminals of the AND circuit 17b. The maximum duty cycle signal MAXDC is inputted to a given one of the input terminals of the three-input NAND circuit 17d to determine the maximum duty cycle, which indicates the maximum period that the switching device 8 is kept on.

The AND circuit 17b generates a logical AND signal S17b indicating a conjunction of the pulse signal CLOCK generated by the oscillation circuit 17a with the comparison result signal S_int outputted from the comparison circuit for controlling intermittent oscillation 31. The AND circuit 17b sets the logical AND signal S17b at a high level when both of the pulse signal CLOCK and the comparison result signal S_int are at high levels, and otherwise sets the logical AND signal S17b at a low level. In other words, when the comparison circuit for controlling intermittent oscillation 31 determines that the output voltage VOUT is lower than the first output voltage level, the AND circuit 17b supplies the pulse signal CLOCK to a set terminal S of the flip-flop circuit 17c, and when the comparison circuit for controlling intermittent oscillation 31 determines that the output voltage VOUT is higher than the first output voltage level, the AND circuit 17b keeps the flip-flop circuit 17c as it is.

The flip-flop circuit 17c receives the logical AND signal S17b through its set terminal S and receives through its reset terminal R the comparison result signal S_idp outputted from the comparison circuit for detecting device current 22. In other words, using the comparison result signal S_idp, the comparison circuit for detecting device current 22 resets the flip-flop circuit 17c at a moment when the device current detection signal VD_S and the feedback control signal Veao are equalized.

The flip-flop circuit 17c generates a flip-flop signal S17c at its non-inverting output terminal Q through an RS flip-flop operation. The flip-flop circuit 17c sets the flip-flop signal S17c at a high level when the logical AND signal S17b is at a high level and the comparison result signal S_idp is at a low level, and the flip-flop circuit 17c sets the flip-flop signal S17c at a low level when the logical AND signal S17b is at a low level and the comparison result signal S_idp is at a high level. In other words, the flip-flop signal S17c is kept at a high level from the rise of the logical AND signal S17b to the rise of the comparison result signal S_idp, and the flip-flop signal S17c is kept at a low level from the rise of the comparison result signal S_idp to the rise of the logical AND signal S17b. In sum, the flip-flop circuit 17c in a set state turns on the switching device 8 while the flip-flop circuit 17c in a reset state turns off the switching device 8.

The three-input NAND circuit 17d generates a drive signal Drive indicating a non-conjunction of three input signals; that is, the flip-flop signal S17c, the maximum duty cycle signal MAXDC, and the start-up control signal S12. The three-input NAND circuit 17d sets the drive signal Drive at a low level when all of the flip-flop signal S17c, and the maximum duty cycle signal MAXDC, and the start-up control signal S12 are at high levels, and otherwise sets the drive signal Drive at a high level.

The current peak conversion circuit 23A is connected to the reference voltage source 32 as shown in FIG. 2.

Figure 3:
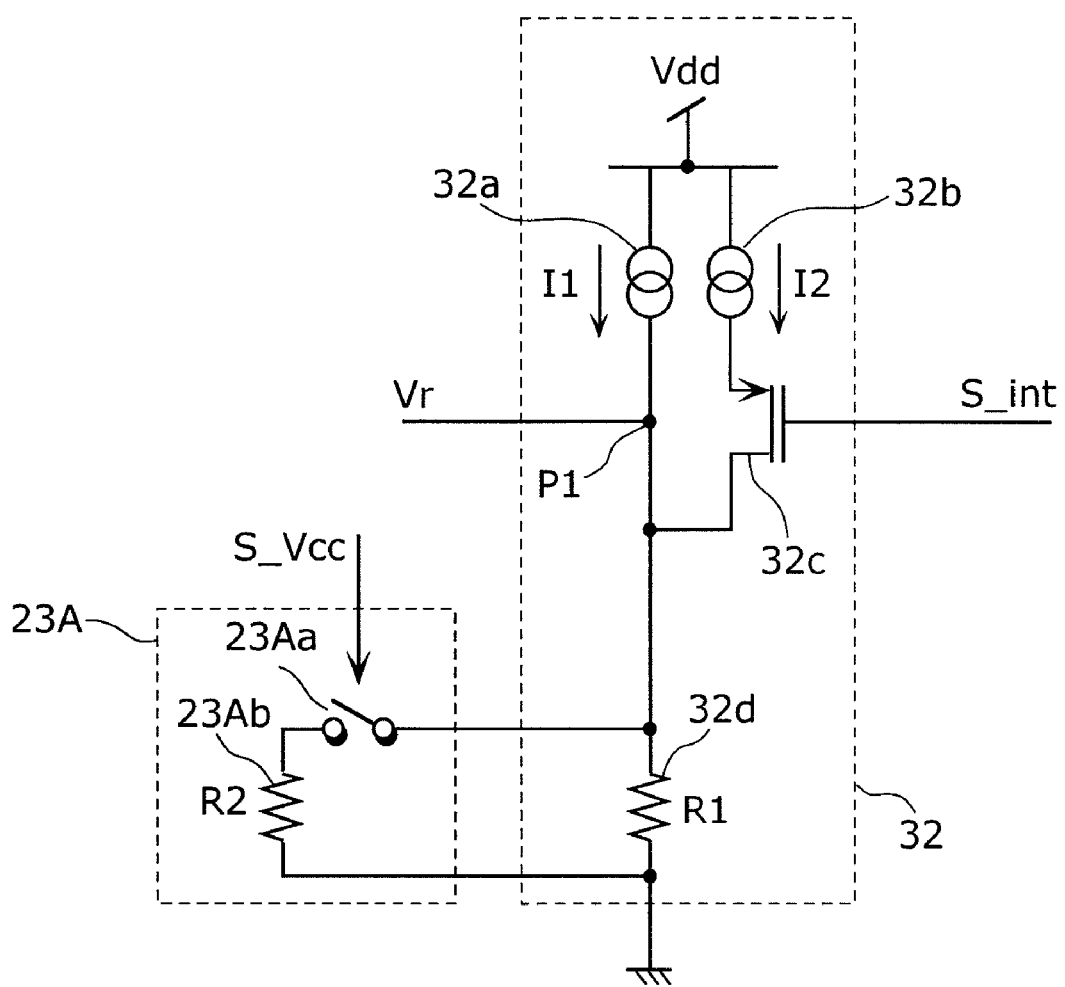
FIG. 3 is a circuit diagram showing an example of configurations of a current peak conversion circuit and a reference voltage source according to the first embodiment of the present invention.

FIG. 3 is a circuit diagram showing a specific example of configurations of the current peak conversion circuit 23A and the reference voltage source 32 in the semiconductor device 6A shown in FIG. 2.

As shown in FIG. 3, the reference voltage source 32 includes a first constant current source 32a which generates a first current I1, a second constant current source 32b which generates a second current I2, a P-type MOSFET 32c connected in series with the second constant current source 32b, and a resistor 32d, which is connected in series with both of the first constant current source 32a and the P-type MOSFET 32c and has a resistance R1. To a control terminal of the P-type MOSFET 32c, a comparison result signal S_int outputted from the comparison circuit for controlling intermittent oscillation 31 is inputted. Of the first current I1 and the second current I2, at least the first current I1 flows through the resistor 32d, and the level of a voltage generated at a connection point P1 is used as a reference voltage Vr.

In the reference voltage source 32, the P-type MOSFET 32c is in an OFF state when the level of the comparison result signal S_int outputted from the comparison circuit for controlling intermittent oscillation 31 is high, with the result that only the first current I1 flows through the resistor 32d and the reference voltage Vr is a lower-limit reference value Vr1a. This means the lower-limit reference voltage Vr1a is given by the following expression (2).

[Math 2]

$$Vr1a = I1 \times R1 \tag{2}$$

On the other hand, when the level of the comparison result signal S_int is low, the P-type MOSFET 32c is in an ON state, with the result that the first current I1 and the second current I2 flow through the resistor 32d at the same time and the reference voltage Vr is an upper-limit reference voltage Vr2a. This means the upper-limit reference voltage Vr2a is given by the following expression (3).

[Math 3]

$$Vr2a = (I1 + I2) \times R1 \tag{3}$$

The reference voltage source 32 thus generates the lower-limit reference voltage Vr1a or the upper-limit reference voltage Vr2a selectively according to the comparison result signal S_int of the comparison circuit for controlling intermittent oscillation 31. This enables the switching power supply apparatus 50 shown in FIG. 1 to perform such intermittent oscillation as described later when a load is light.

As shown in FIG. 3, the current peak conversion circuit 23A includes a switch 23Aa and a resistor 23Ab, which is connected in series with the switching 23Aa and has a resistance R2. This series circuit of the switch 23Aa and the resistor 23Ab is connected in parallel with the resistor 32d in the reference voltage source 32.

The switch 23Aa is controlled to be on or off according to the comparison result signal S_Vcc outputted from the comparison circuit for detecting auxiliary power voltage 14a. To be specific, the switch 23Aa is turned on when the level of the comparison result signal S_Vcc is high, and is otherwise turned off.

With this structure, the reference voltage source 32 selectively generates any of the lower-limit reference voltage Vr1a corresponding to the first output voltage level, the upper-limit reference voltage Vr2a corresponding to the third output voltage level higher than the first output voltage level, a lower-limit reference voltage Vr1b corresponding to the second output voltage level higher than the first output voltage level, and an upper-limit reference voltage Vr2b corresponding to the fourth output voltage level higher than the second output voltage level. The current peak conversion circuit 23A causes the reference voltage source 32 to generate the lower-limit reference voltage Vr1a corresponding to the first output voltage level, and the upper-limit reference voltage Vr2a, in the normal mode, and to generate the lower-limit reference voltage Vr1b corresponding to the second output voltage level, and the upper-limit reference voltage Vr2b, in the auxiliary power voltage decrease mode. By so doing, in the auxiliary power voltage decrease mode, the current peak conversion circuit 23A changes the feedback control signal Veao which is inputted to the comparison circuit for detecting device current 22, to a further extent than in the normal mode, in an orientation that the feedback control signal Veao changes as the output voltage VOUT becomes higher.

The comparison circuit for controlling intermittent oscillation 31 therefore compares the feedback control signal Veao with any of the lower-limit reference voltages Vr1a and Vr1b and the upper-limit reference voltages Vr2a and Vr2b, thereby keeping the driver circuit 17 from generating the pulse included in the drive signal Drive from when the output voltage VOUT increases to the output voltage level corresponding to the upper-limit reference voltage Vr2a or Vr2b until when the output voltage VOUT decreases to the output voltage level corresponding to the lower-limit reference voltage Vr1a or Vr1b.

The operation of the reference voltage source 32 and the current peak conversion circuit 23A configured as above will be explained below.

In the current peak conversion circuit 23A, when the level of the comparison result signal S_Vcc is low, the switch 23Aa is in an OFF state, so that no current flows through the resistor 23Ab. Accordingly, the reference voltage Vr outputted from the reference voltage source 32 will be the lower-limit reference voltage Vr1a or the upper-limit reference voltage Vr2a based on the comparison result signal S_int as described above. The switching of the level of the comparison result signal S_Vcc from a low level to a high level leads to turning the switch 23Aa on, so that a current flows through both of the resistor 32d and the resistor 23Ab. Accordingly, the lower-limit reference voltage changes from Vr1a to Vr1b and the upper-limit reference voltage changes from Vr2a to Vr2b. These Vr1b and Vr2b are given by the following expressions (4) and (5), respectively.

[Math 4]

$$Vr1b = I1 \times \frac{1}{1/R1 + 1/R2} \tag{4}$$

[Math 5]

$$Vr2b = (I1 + I2) \times \frac{1}{1/R1 + 1/R2} \tag{5}$$

At this time, the lower-limit reference voltage Vr1b and the upper-limit reference voltage Vr2b satisfy Vr1b<Vr1a and Vr2b<Vr2a, respectively. This means that with the switch 23Aa in an ON state, both of the lower-limit voltage and the upper-limit voltage are lower that those with the switch 23Aa in an OFF state.

The operation of the switching power supply apparatus 50 configured as above will be explained with reference to FIGS. 1 to 7.

First, a direct-current voltage VIN is applied to the input terminals IN1 and IN2. The direct-current voltage VIN is generated from, for example, commercially-available alternating-current power through rectification and smoothing.

In a switching suspension state immediately after the direct-current voltage VIN is applied to the input terminals IN1 and IN2, the regulator 11 supplies a current to the capacitor 5 via the internal circuit power terminal VDD and simultaneously supplies a current to the capacitor 3b of the auxiliary power voltage generation circuit 3 via the auxiliary power voltage input terminal VCC. The regulator 11 thus increases both of the internal circuit power voltage Vdd and the auxiliary power voltage Vcc.

Later, when the internal circuit power voltage Vdd reaches the start-up voltage Vddon, the start-up control circuit 12 switches the level of the start-up control signal S12 from a low level to a high level. The start-up voltage Vddon is set at such a level that each circuit included in the control circuit 9A can operate well enough.

Moreover, when the internal circuit power voltage Vdd reaches the start-up voltage Vddon, the oscillation circuit 17a outputs the pulse signal CLOCK and the maximum duty cycle signal MAXDC. This causes the switching device 8 to start its switching operation.

Right at the start of the switching operation of the switching device 8, the regulator 11 stops the current supply from the start-up constant current source 10. Furthermore, the current supply starts from the auxiliary power voltage input terminal VCC to the capacitor 5. While the switching device 8 performs its switching operation, the capacitor 5 is supplied with the current from the auxiliary power voltage input terminal VCC so that the internal circuit power voltage Vdd is stabilized at a constant level. Furthermore, the regulator 11 and the capacitor 5 supply the internal circuit power voltage Vdd to each circuit included in the control circuit 9A.

Moreover, when the switching device 8 starts its switching operation, the alternating-current voltage is induced in the secondary winding 1b. The output voltage generation circuit 2 generates the output voltage VOUT from this alternating-current voltage and supplies the generated output voltage VOUT to the load 7 connected between the output terminal OUT1 and the output terminal OUT2.

The alternating-current voltage is induced also in the auxiliary winding 1c. The auxiliary power voltage generation circuit 3 generates the auxiliary power voltage Vcc from this alternating-current voltage and supplies a current to the control circuit 9A via the auxiliary power voltage input terminal VCC as described above.

After the switching device 8 starts its switching operation, the output voltage VOUT is detected by the output voltage detecting circuit 4. The output voltage detection circuit 4 feeds back the feedback control signal FB_S, which is in accordance with the level of the output voltage, to the control circuit 9A. This controls the switching operation of the switching device 8, thereby adjusting energy to be supplied to the load 7 so that the output voltage VOUT is stabilized at a constant level.

The feedback signal control circuit 13 generates the feedback control signal Veao according to the feedback signal FB_S. This feedback control signal Veao is inputted to the inverting input terminal of the comparison circuit for detecting device current 22 and to the non-inverting input terminal of the comparison circuit for controlling intermittent oscillation 31.

Now, the operation with a steady load (the operation of continuous oscillation) will be explained below.

With a steady load, the auxiliary power voltage Vcc is stabilized at a constant voltage level determined by the number of turns of each winding of the transformer 1. This voltage level is set in advance to be higher than the limit level Vccth which is inputted to the non-inverting input terminal of the comparison circuit for detecting auxiliary power voltage 14a. The level of the auxiliary power voltage detection signal S_Vcc which is outputted from the comparison circuit for detecting auxiliary power voltage 14a is therefore low. Accordingly, the switch 23Aa in the current peak conversion circuit 23A is in an OFF state.

Furthermore, since the level of the feedback control signal Veao with the steady load is higher than the reference voltage Vr, the reference voltage source 32 with the steady load generates the lower-limit reference voltage Vr1a. This maintains the comparison result signal S_int of the comparison circuit for controlling intermittent oscillation 31 at a high level. Accordingly, the AND circuit 17b periodically outputs a high level signal to the set terminal S of the flip-flop circuit 17c according to the pulse signal CLOCK outputted from the oscillation circuit 17a. This causes periodical output of a high level signal from the non-inverting output terminal Q of the flip-flop circuit 17c. As a result, the switching device 8 is controlled to be periodically turned on.

Turning on the switching device 8 allows the device current ID to flow through the switching device 8. The magnitude of the device current ID is detected by the device current detection circuit 21. The device current detection circuit 21 generates the device current detection signal VD_S according to the magnitude of the device current ID.

The device current detection signal VD_S is inputted to the non-inverting input terminal of the comparison circuit for detecting device current 22. The comparison circuit for detecting device current 22 compares this device current detection signal VD_S with the feedback control signal Veao which is inputted to the inverting input terminal.

When the device current ID increases after the switching device 8 is turned on, the level of the device current detection signal VD_S increases accordingly. When the level of the device current detection signal VD_S increases to the level of the feedback control signal Veao, the level of the comparison result signal S_idp which is outputted from the comparison circuit for detecting device current 22 is switched from a low level to a high level. Accordingly, the high level signal is inputted to the reset terminal R of the flip-flop circuit 17c, with the result that the level of the signal which is outputted from the non-inverting output terminal Q of the flip-flop circuit 17c is switched from a high level to a low level. This causes the switching device 8 to be turned off.

In other words, during the switching operation of the switching device 8, the timing of turning on the switching device 8 is determined according to the pulse signal CLOCK which is outputted from the oscillation circuit 17a, and the timing of turning off the switching device 8 is determined according to the comparison result signal S_idp which is outputted from the comparison circuit for detecting device current 22.

Furthermore, the maximum duty signal MAXDC which is outputted from the oscillation circuit 17a rises from a low level to a high level at the same time as the pulse signal CLOCK rises, and the maximum duty signal MAXDC then changes to a low level before a rise of the next pulse signal CLOCK. In the case where the ON duration of the switching device 8 becomes long, the level of the maximum duty cycle signal MAXDC becomes low, and then the device current detection signal VD_S becomes equal to or higher than the feedback control signal Veao, the switching device 8 is turned off at a moment when the level of the maximum duty cycle signal MAXDC becomes low. The ON duration of the switching device 8 is thus limited to the period in which the level of the maximum duty cycle signal MAXDC stays high.

Figure 4:
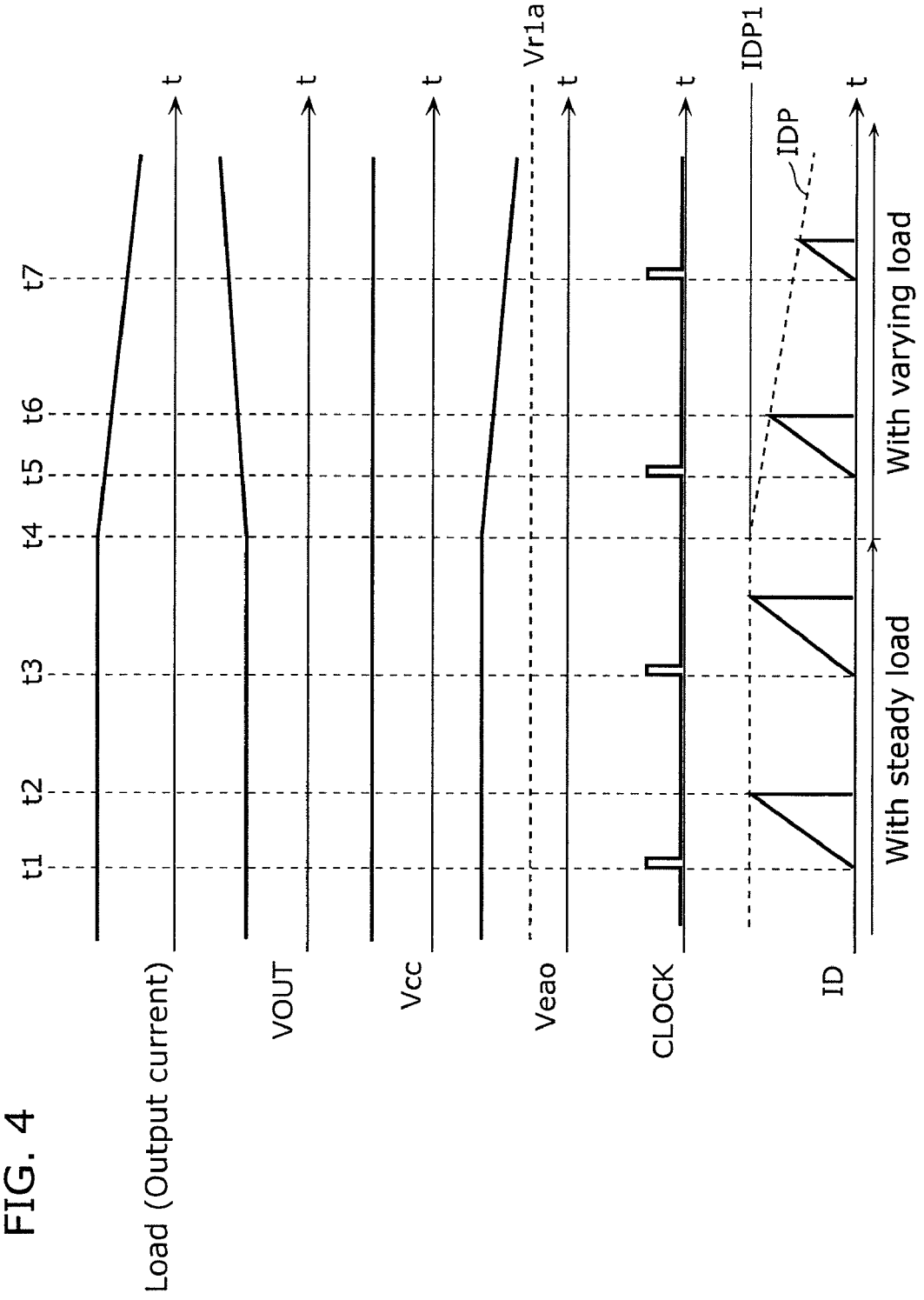
FIG. 4 is a timing chart showing an operation of the switching power supply apparatus with a steady load according to the first embodiment of the present invention.

FIG. 4 is a timing chart showing an operation of the switching power supply apparatus 50 with a steady load.

In FIG. 4, at time t1, the pulse signal CLOCK is outputted from the oscillation circuit 17a. This causes the switching device 8 to be turned on and thereafter the device current ID increases. This accompanies an increase in the device current detection signal VD_S.

When the device current detection signal VD_S reaches the level of the feedback control signal Veao at time t2, the comparison circuit for detecting device current 22 switches the level of the comparison result signal S_idp from a low level to a high level. This causes the switching device 8 to be turned off.

After that, the pulse signal CLOCK is outputted again from the oscillation circuit 17a at time t3, which causes the switching device 8 to be turned off, and a like operation is repeated.

After time t4, in the case where the load 7 changes to be lighter, the power supply to the load 7 will be extreme, resulting in an increase in the output voltage VOUT. Accordingly, the feedback signal FB_S which is generated by the output voltage detection circuit 4 becomes higher, with the result that the level of the feedback control signal Veao lowers.

At time t5, the switching device 8 is turned on, and at time t6, the device current detection signal VD_S reaches the level of the feedback control signal Veao. As described above, at time t6, the level of the feedback control signal Veao is lower than that before time t4 and therefore, the peak value (hereinafter referred to as a current peak IDP) of the device current ID is lower than the current peak IDP1 before time t4.

The switching power supply apparatus 50 thus controls in the continuous oscillation such that the current peak IDP becomes lower as the load 7 becomes lighter. Furthermore, the switching power supply apparatus 50 employs the current mode PWM control method as a method of controlling the switching operation of the switching device 8.

It is to be noted that, as described above, even when the load 7 changes to be lighter, the current which is supplied to the control circuit 9A does not change, so that the auxiliary power voltage Vcc is maintained at a constant voltage level.

Next, the operation with a light load (the operation of intermittent oscillation) will be explained below.

With the load being yet lighter after time t7 in FIG. 4, the output voltage VOUT increases and accordingly, the feedback control signal Veao decreases and the current peak IDP lowers.

When the feedback control signal Veao decreases to the lower-limit voltage Vr1a which is generated by the reference voltage source 32, the level of the comparison result signal S_int of the comparison circuit for controlling intermittent oscillation 31 is switched from a high level to a low level. Accordingly, the level of one of the input signals of the AND circuit 17b becomes low.

This enables the AND circuit 17b to output a low level signal to the set terminal S of the flip-flop circuit 17c even when the pulse signal CLOCK is inputted to the AND circuit 17b. The switching device 8 is therefore not turned on and thus, the switching operation is suspended.

When the level of the comparison result signal S_int of the comparison circuit for controlling intermittent oscillation 31 is switched to be low, the P-type MOSFET 32 in FIG. 3 becomes in an ON state, with the result that, as described above, the reference voltage which is generated by the reference voltage source 32 is switched to the upper-limit reference voltage Vr2a.

While the switching operation is suspended, no energy is supplied to the secondary side, so that the output voltage VOUT lowers and accordingly, the feedback control signal Veao increases. Later, when the feedback control signal Veao increases to the upper-limit reference voltage Vr2a, the level of the comparison result signal S_int of the comparison circuit for controlling intermittent oscillation 31 is switched from a low level to a high level. This causes a high level signal which is in accordance with the pulse signal CLOCK to be inputted to the set terminal S of the flip-flop circuit 17c, and the switching operation is resumed.

Furthermore, when the level of the comparison result signal S_int is switched from a low level to a high level, the reference voltage Vr becomes the lower-limit reference voltage Vr1a again. In the state with a light load even after the switching operation is resumed, the switching operation is thus suspended and resumed repeatedly.

The switching power supply apparatus 50 is thus controlled to stop the switching operation of the switching device 8 intermittently by use of the comparison circuit for controlling intermittent oscillation 31 when the load is light. In other words, the switching power supply apparatus 50 performs so-called intermittent oscillation that the oscillation period, in which the switching device 8 performs its switching operation, and the suspension period, in which the switching operation is suspended, are repeated. As the load 7 becomes lighter, the lowering speed of the output voltage VOUT during the suspension period is reduced, which slows down the increasing speed of the feedback control signal Veao. Accordingly, it takes longer for the feedback control signal Veao to increase to the upper-limit reference value Vr2a, with the result that the suspension period will be longer.

Since the control circuit 9A is supplied with a constant current even in the intermittent oscillation, the auxiliary power voltage Vcc in the intermittent oscillation lowers during the suspension period just as the above output voltage VOUT. The lowering speed of the auxiliary power voltage Vcc is constant regardless of the load.

In the intermittent oscillation, when the load 7 becomes light, for example, in a stand-by state, and therefore the suspension period becomes sufficiently long as compared to the oscillation period, the auxiliary power voltage Vcc will decrease to the lower-limit level Vccth1 during this suspension period. Before the auxiliary power voltage Vcc decreases to the lower-limit level Vccth1, the reference voltage source 32 generates the upper-limit reference voltage Vr2a during the suspension period. When the auxiliary power voltage Vcc decreases to the lower-limit level Vccth1, the level of the auxiliary power voltage detection signal S_Vcc which is outputted from the comparison circuit for detecting auxiliary power voltage 14a is switched from a low level to a high level.

This causes the switch 23Aa in the current peak conversion circuit 23A shown in FIG. 3 to be in an ON state, with the result that the level of the voltage at the connection point P1 in the reference voltage supply 32 becomes lower than the upper-limit reference voltage Vr2a. This means that the auxiliary power voltage Vcc decreases to the lower-limit level Vccth1, and the level of the auxiliary power voltage detection signal S_Vcc is switched from a low level to a high level, resulting in a decrease in the upper-limit reference from Vr2a to Vr2b.

Figure 5:
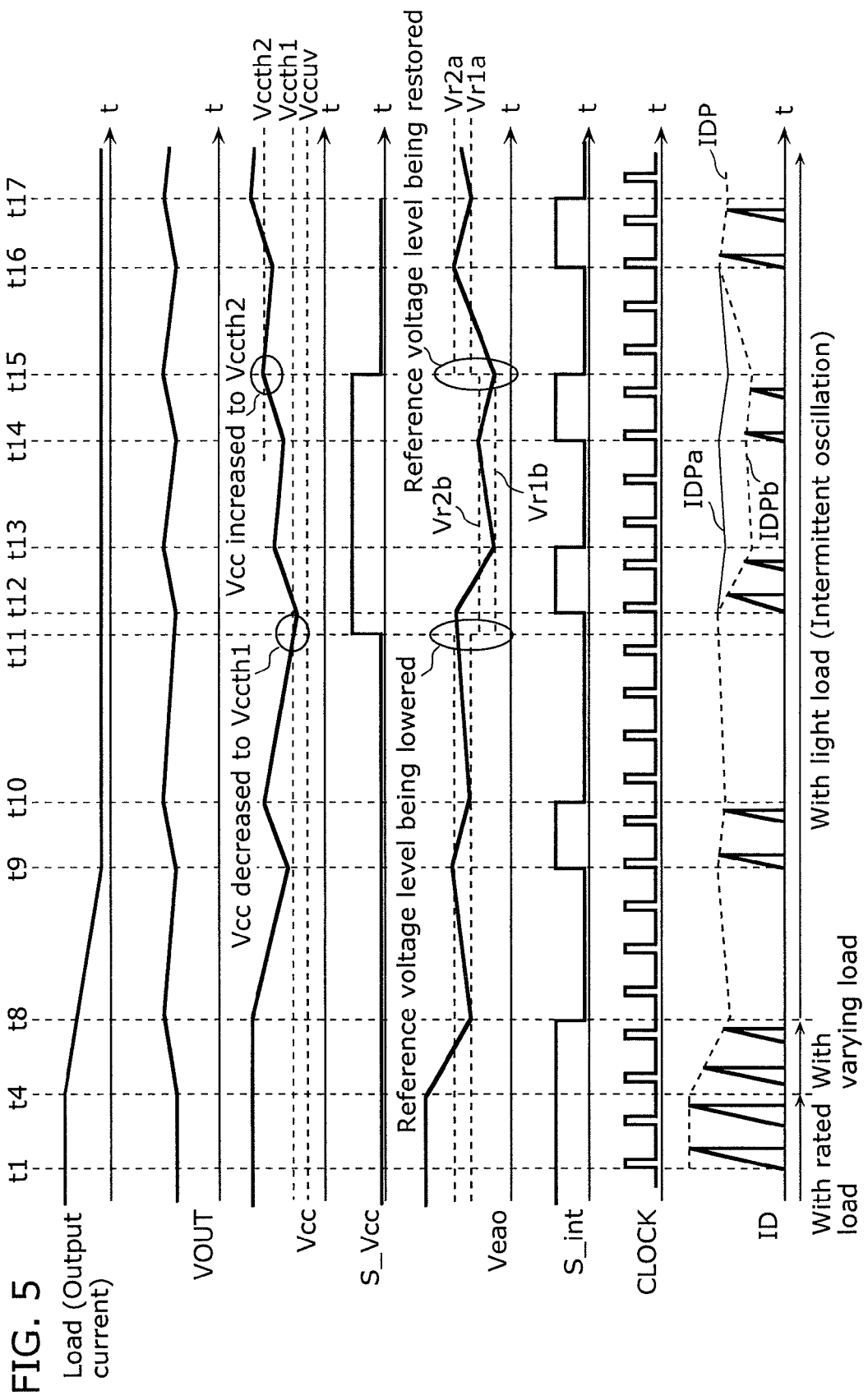
FIG. 5 is a timing chart showing an operation of the switching power supply apparatus according to the first embodiment of the present invention when an auxiliary power supply voltage decreases to a lower-limit level during intermittent oscillation.

FIG. 5 is a timing chart showing an operation of the switching power supply apparatus 50 when the auxiliary power supply voltage Vcc decreases to the lower-limit level Vccth1 with the suspension period being sufficiently long as compared to the oscillation period in the intermittent oscillation. Times t1 and t4 in FIG. 5 indicate the same times as times t1 and t4 in FIG. 4, respectively.

With the load being lighter after time t4 in FIG. 5, the feedback control signal Veao decreases to the lower-limit reference voltage Vr1a, which starts the intermittent oscillation, at time t8. After that, during the period from time t10 to time t12, the load becomes yet lighter, resulting in an increase in the length of the suspension period of the intermittent oscillation and a decrease in the auxiliary power voltage Vcc. At time t11, when the auxiliary power voltage Vcc decreases to the lower-limit level Vccth1, the level of the auxiliary power voltage detection signal S_Vcc which is outputted from the comparison circuit for detecting auxiliary power voltage 14a is switched from a low level to a high level, and the switch 23Aa in the current peak conversion circuit 23A becomes in an ON state. This lowers the reference voltage Vr which is generated by the reference voltage source 32. To be specific, the upper reference voltage decreases from Vr2a to Vr2b, and the lower-limit reference voltage decreases from Vr1a to Vr1b.

With the level of the auxiliary power voltage detection signal S_Vcc switched from a low level to a high level, the hysteresis operation of the comparison circuit for detecting auxiliary power voltage 14a maintains the auxiliary power voltage detection signal S_Vcc at a high level until the auxiliary power voltage Vcc increases to the upper-limit level Vccth2. The switch 23Aa in the current peak conversion circuit 23A thus stays in an ON state.

With the switch 23Aa in the current peak conversion circuit 23A in an ON state, a decrease in the reference voltage Vr leads to a decrease in the level of the feedback control signal Veao in switching of the level of the comparison result signal S_int which is outputted from the comparison circuit for controlling intermittent oscillation 31. This also leads to a decrease in the value of the device current ID in switching of the level of the comparison result signal S_int from a low level to a high level after the switching device 8 is turned on in the oscillation period. This means that the current peak IDP in the oscillation period becomes lower than that before the reference voltage Vr decreases.

Figure 6:
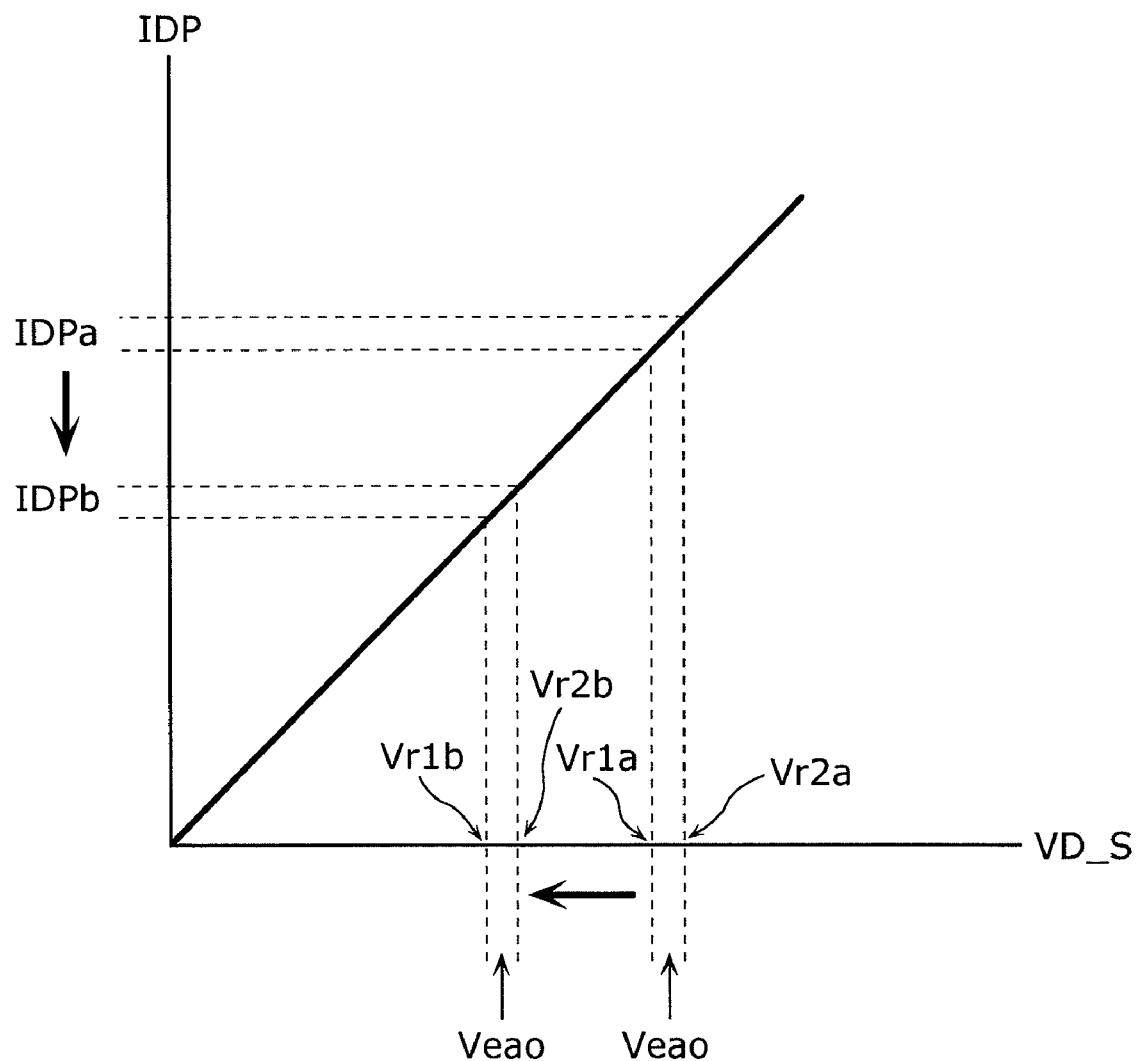
FIG. 6 is a view showing a relation between a device current detection signal and a current peak in the switching power supply apparatus according to the first embodiment of the present invention.

FIG. 6 is a view showing a relation between the device current detection signal VD_S and the current peak IDP in the switching power supply apparatus 50. The device current detection signal VD_S and the current peak IDP have a positive proportional relation. The current peak IDP represents the device current ID which flows in the comparison circuit for detecting device current 22 when the device current detection signal VD_S increases to the feedback control signal Veao. Furthermore, since the level of the feedback control signal Veao in the intermittent oscillation changes periodically between the lower-limit reference voltage and the upper-limit reference voltage, FIG. 6 shows the level of the feedback control signal Veao as the upper-limit value and the lower-limit value of the reference voltage so that these upper-limit reference voltage and lower-limit reference voltage are given levels of the device current detection signal VD_S.

In FIG. 6, before the auxiliary power voltage Vcc decreases to the lower-limit level Vccth1, the oscillation period in the intermittent oscillation corresponds to the period in which the feedback control signal Veao decreases from the upper-limit voltage Vr2a to the lower-limit voltage Vr1a, and the current peak in this period is indicated by IDPa. In this case, IDPa represents a mean value of the current peaks in all the pulses of the device current ID in the oscillation period. A later-described IDPb also represents, just like IDPa, a mean value of the current peaks in all the pulses of the device current ID in the oscillation period.

A decrease in the auxiliary power voltage Vcc to the lower-limit level Vccth1 causes a decrease in the reference voltage Vr and a change in the feedback control signal Veao between the lower-limit voltage Vr1b and the upper-limit voltage Vr2b, with the result that the current peak becomes IDPb. With the reference voltage Vr decreased, the current peak IDP thus becomes lower than that before the reference voltage Vr decreases.

The lowering of the current peak IDP reduces the energy which is supplied to the secondary side during the oscillation period. This means that the energy supplied to the secondary side during the oscillation period from time t14 to time t15 is less than the energy supplied to the secondary side during the oscillation period from time t9 to time t10 in FIG. 5.

It is to be noted that the energy supplied to the secondary side per unit time is constant after time t9 because the load 7 does not change since then. Consequently, as in the period from time t14 to time t15, the lowering of the current peak IDP, which causes the decrease in the energy which is supplied to the secondary side during the oscillation period, will shorten the cycle of the intermittent osciliation so that the energy to be supplied to the secondary side per unit time becomes constant. In other words, when the energy which is supplied to the secondary side during the oscillation period is reduced with the load 7 constant, the lowering speed of the output voltage VOUT in the suspension period becomes higher. This leads to an increase in the increasing speed of the feedback control signal Veao in the suspension period. This means that it takes shorter for the feedback control signal Veao to increase from the lower-limit reference value Vr1b to the upper-limit reference voltage Vr2b, with the result that the suspension period will be shorter. Accordingly, the auxiliary power voltage Vcc increases.

Later, at time t15, the auxiliary power voltage Vcc increases to the upper-limit level Vccth1, and the level of the auxiliary power voltage detection signal S_Vcc is switched from a high level to a low level. The switch 23Aa in the current peak conversion circuit 23A is switched to be in an OFF state, and the reference voltage Vr is restored to its original level. To be specific, the upper-limit reference voltage is restored from Vr2b to Vr2a, and the lower-limit reference voltage is restored from Vr1b to Vr1a. Consequently, in the oscillation period after time t15, the current peak becomes IDPa which is the same as that before time t11 at which the auxiliary power voltage Vcc decreases to the lower-limit level Vcch1, so that the operation is the same as that in the period from time t8 to t11.

The switching power supply apparatus 50 according to the first embodiment of the present invention thus lowers the current peak IDP in the oscillation period of the intermittent oscillation by operating the current peak conversion circuit 23A when the auxiliary power voltage Vcc decreases to the lower-limit level Vccth1. Consequently, the energy which is supplied to the secondary side during the oscillation period is reduced, with the result that the suspension period becomes shorter. The switching power supply apparatus 50 is thus capable of preventing the auxiliary power voltage Vcc from decreasing further below the lower-limit level Vccth1. This means that the switching power supply apparatus 50 according to the first embodiment of the present invention is capable of preventing problems such as shutting down of the control circuit 9A caused due to the decrease of the auxiliary power voltage Vcc to the minimum allowable voltage Vccuv.

Furthermore, the intermittent oscillation continues even when it is detected that the auxiliary power voltage Vcc has decreased the lower-limit level Vccth1. The switching power supply apparatus 50 according to the first embodiment of the present invention is thus capable of solving the above problems while maintaining the effects of power efficiency improvement obtained by the intermittent oscillation with a light load.

In the case where switching occurs only once in one cycle of the intermittent oscillation, the conventional switching power supply apparatus disclosed by Patent reference 4 is not capable of the above problems because the auxiliary power voltage decreases to the limit level and even when this is detected, the suspension period of the intermittent oscillation cannot be shortened. In contrast, the switching power supply 50 according to the first embodiment of the present invention is capable of shortening the suspension period by lowering the current peak IDP in the oscillation period even in the case where switching occurs only once in one cycle of the intermittent oscillation.

Figure 7:
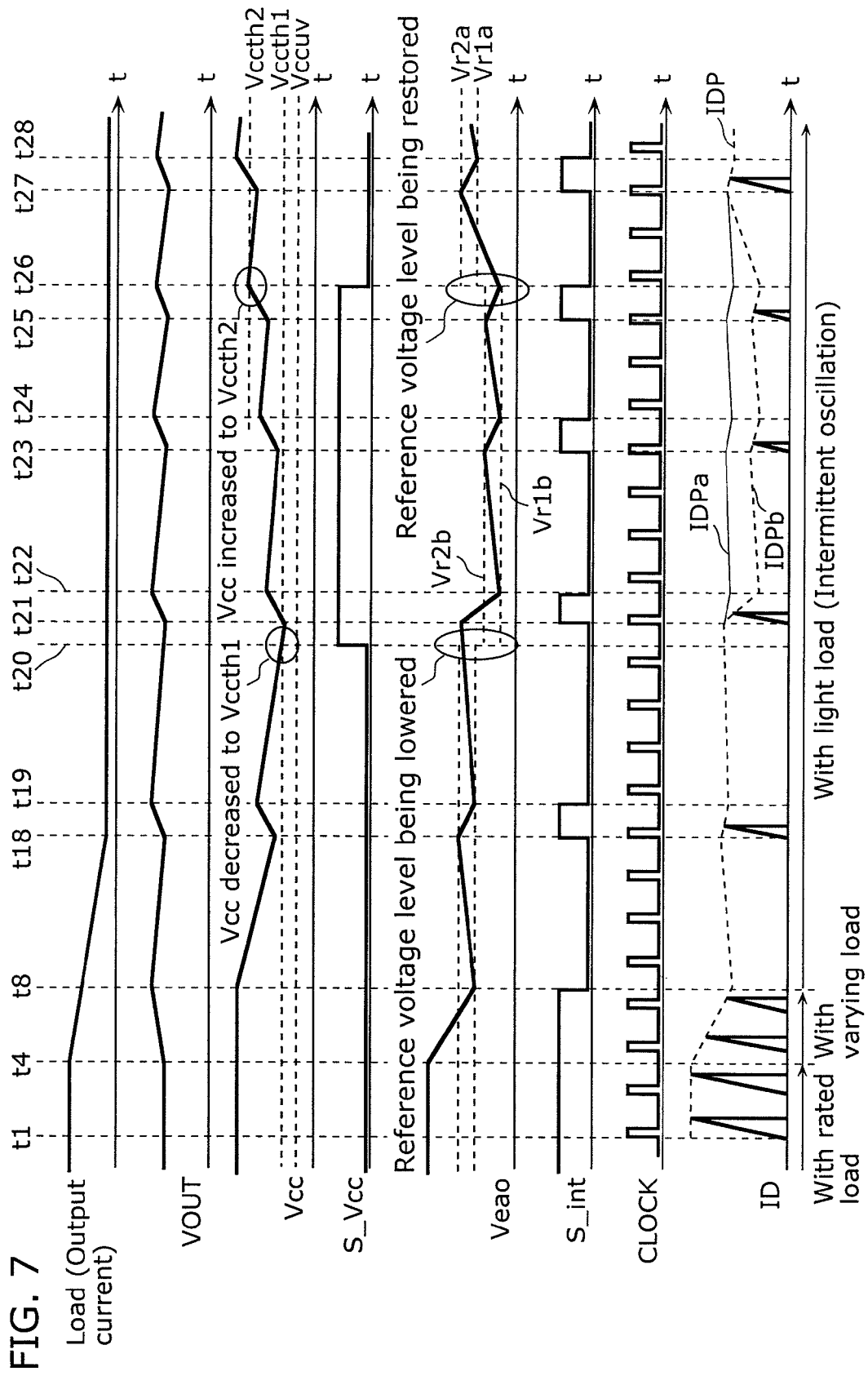
FIG. 7 is a timing chart showing an operation of the switching power supply apparatus according to the first embodiment of the present invention when the auxiliary power voltage decreases to the lower-limit level in a case where switching occurs only once in one cycle of the intermittent oscillation.

FIG. 7 is a timing chart showing an operation of the switching power supply apparatus 50 when the auxiliary power supply voltage Vcc decreases to the lower-limit level Vccth1 in the case where switching occurs only once in one cycle of the intermittent oscillation.

At time t20, the auxiliary power voltage Vcc decreases to the lower-limit level Vccth1. In the period from time 20 to time t26, in which the auxiliary power voltage Vcc is increasing to the upper-limit level Vccth2, the reference voltage Vr is lower than the reference voltage Vr provided before time t20. Accordingly, the current peak IDP in the oscillation periods from time t23 to time t24 and from time t25 to time t26 is lower than the current peak in the oscillation period before time t20. Consequently, the suspension period after time t20 becomes shorter than the suspension period before time t20, with the result that the above problems can be solved.

The switching power supply apparatus 50 according to the first embodiment of the present invention is thus capable of preventing the above problems in any intermittent oscillation including a case where switching occurs only once in one cycle of the intermittent oscillation.

It is to be noted that although the lower-limit reference voltages Vr1$a$ and Vr1$b$ and the upper-limit reference voltages Vr2$a$ and Vr2$b$ satisfy Vr2$a$>Vr1$a$>Vr2$b$>Vr1$b$ in the above description, the upper-limit reference voltage Vr2$b$ in the auxiliary power voltage decrease mode may be equal to or greater than the lower-limit reference voltage Vr1$b$ in the normal mode. That is, Vr2$a$>Vr2$b$≧Vr1$a$>Vr1$b$ is available.

However, in order to set the current peak IDP in the auxiliary power voltage decrease mode to be lower than the current IDP in the normal mode, it is preferable to satisfy the above relation Vr2$a$>Vr1$a$>Vr2$b$>Vr1$b$.

Second Embodiment

The switching power supply apparatus 50 according to the second embodiment of the present invention is a variation of the above-described switching power supply apparatus 50 according to the first embodiment and is different from the switching power supply apparatus 50 according to the first embodiment in the configuration for lowering the current peak IDP in the auxiliary power voltage decrease mode. To be specific, the switching power supply apparatus 50 according to the second embodiment lowers the current peak IDP in the auxiliary power voltage decrease mode by decreasing the feedback control signal Veao_S which is inputted to the comparison circuit for detecting device current 22 in the auxiliary power voltage decrease mode.

The following explanation for the second embodiment will focus on the differences from the first embodiment. The other configurations, operations, and effects will not be explained since they are the same as or like those in the first embodiment.

The switching power supply apparatus 50 according to the second embodiment of the present invention is different from that according to the first embodiment in a configuration of a control circuit 9B included in a semiconductor device 6B. To be more specific, what is different is a configuration of a current peak conversion circuit 23B included in a peak current control circuit 15B.

Figure 8:
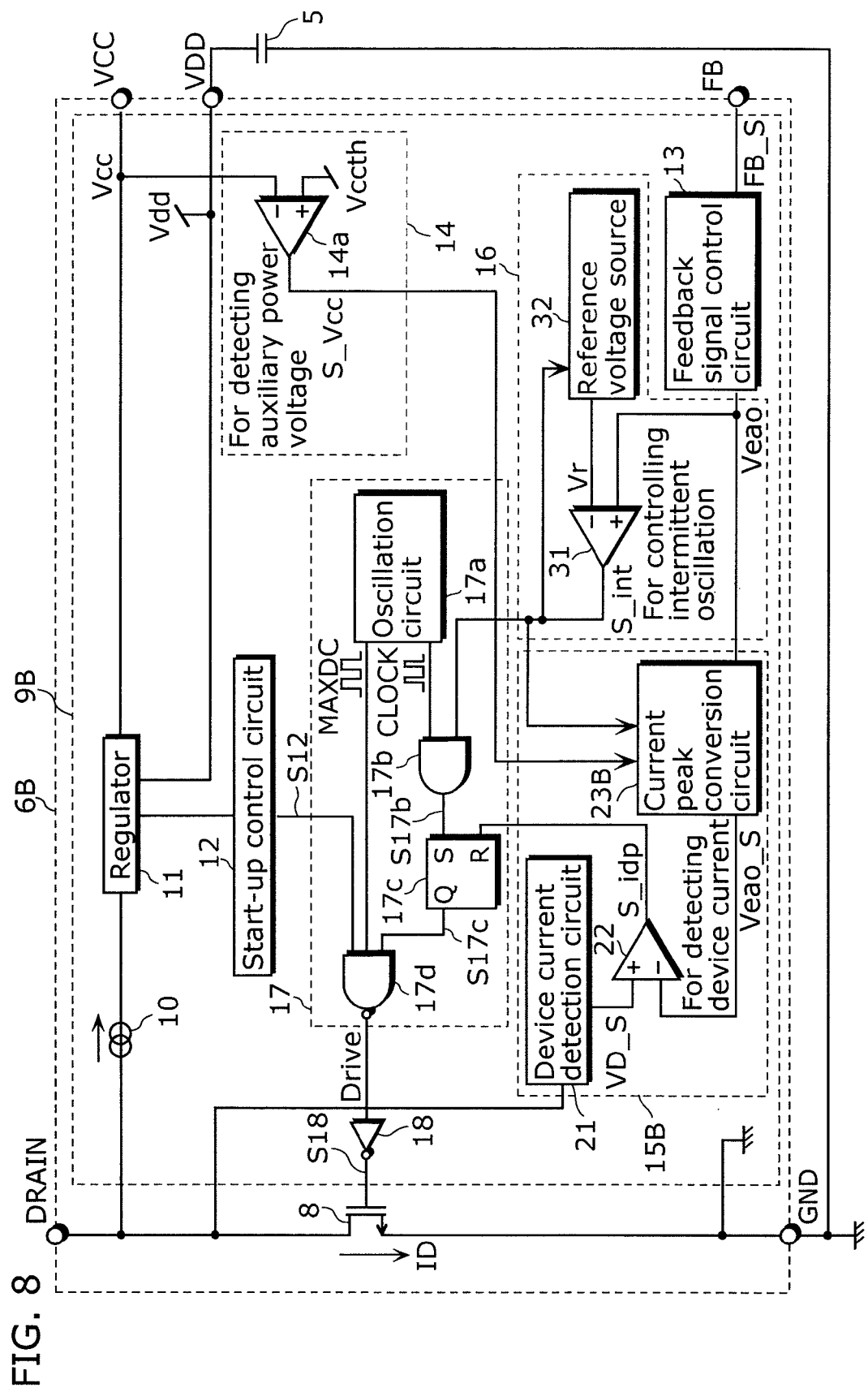
FIG. 8 is a block diagram showing an example of a configuration of a semiconductor device according to a second embodiment of the present invention.

FIG. 8 is a block diagram showing an example of a configuration of the semiconductor device 6B according to the second embodiment.

The current peak conversion circuit 23B shown in FIG. 8 is connected between the feedback signal control circuit 13 and the inverting input terminal of the comparison circuit for detecting device current 22, and is connected also to an output of the comparison circuit for controlling intermittent oscillation 31. The current peak conversion circuit 23B outputs to the inverting input terminal of the comparison circuit for detecting device current 22 the signal Veao_S which monotonically increases relative to the feedback control signal Veao.

This current peak conversion circuit 23B converts the feedback control signal Veao which is inputted to the comparison circuit for detecting device current 22, so that each pulse included in the drive signal Drive becomes inactive earlier in the auxiliary power voltage decrease mode than in the normal mode.

To be specific, in the auxiliary power voltage decrease mode, the current peak conversion circuit 23B varies the feedback control signal Veao_S which is inputted to the comparison circuit for detecting device current 22, to a further extent than in the normal mode, in an orientation that the feedback control signal Veao varies as the output voltage VOUT becomes higher. Thus, in the current peak conversion circuit 23B, the feedback control signal Veao_S which is inputted to the comparison circuit for detecting device current 22 is smaller in the auxiliary power voltage decrease mode than in the normal mode.

Figure 9:
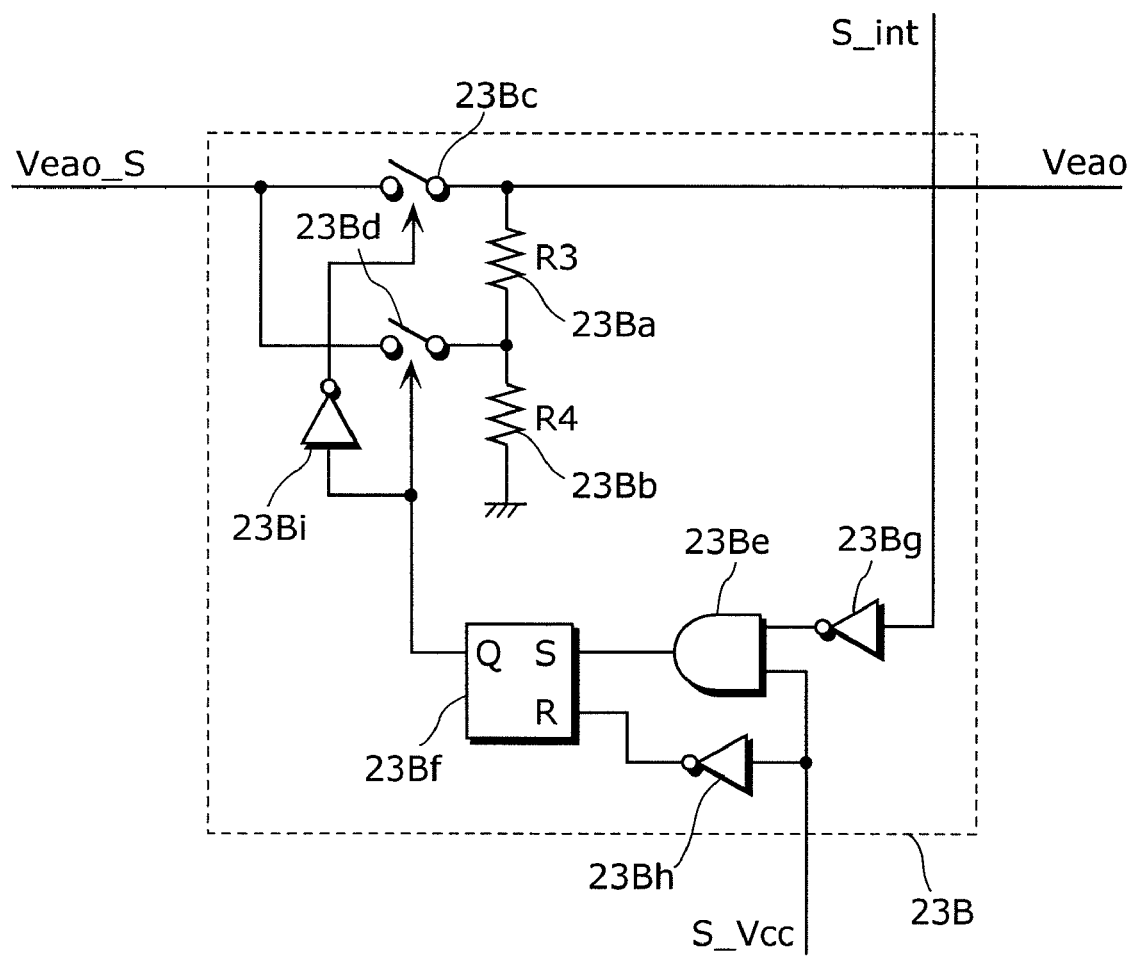
FIG. 9 is a circuit diagram showing an example of a configuration of a current peak conversion circuit according to the second embodiment of the present invention.

FIG. 9 is a circuit diagram showing a specific example of a configuration of the current peak conversion circuit 23B for use in the semiconductor device 6B according to the second embodiment shown in FIG. 8.

The current peak conversion circuit 23B shown in FIG. 9 includes: two resistors 23Ba and 23Bb, which are connected in series with each other and have resistances R3 and R4, respectively; two switches 23Bc and 23Bd, each having one of its terminals connected to a line of the output signal Veao_S in the current peak conversion circuit 23B; an AND circuit 23Be, to which the intermittent oscillation control signal S_int and the auxiliary power voltage detection signal S_Vcc are inputted; a flip-flop circuit 23Bf; and three inverter circuits 23Bg, 23Bh, and 23Bi.

One of the terminals of the resistor 23Ba and the other one of the terminals of the switch 23Bc are connected to a line of the feedback control signal Veao. The other one of the resistor 23Ba is connected to one of the terminals of the resistor 23Bb, and the other one of the terminals of the resistor 23Bb is connected to a ground potential. The other one of the terminals of the switch 23Bd is connected to a connection point of the resistor 23Ba to the resistor 23Bb (the other one of the terminals of the resistor 23Ba and the one of the terminals of the resistor 23Bb).

Next, the operation of the current peak conversion circuit 23B will be explained.

Generally, in the continuous oscillation and in the oscillation period of the intermittent oscillation, the level of the intermittent oscillation control signal S_int is high, and the level of the auxiliary power voltage detection signal S_Vcc is low. This means that the levels of the two signals inputted to the AND circuit 23Be are low, with the result that a low level signal is outputted from a non-inverting output terminal Q of the flip-flop circuit 23Bf. Accordingly, the switch 23Bc is in an ON state, and the switch 23Bd is in an OFF state. In other words, during the oscillation period, the output signal Veao_S of this current peak conversion circuit 23 is the same signal as the feedback control signal Veao.

Now, when the suspension period of the intermittent oscillation starts, the level of the intermittent oscillation control signal S_int switches from a high level to a low level, and an inverted signal of this intermittent oscillation control signal S_int, i.e., a high level signal, is inputted to one of the input terminals of the AND 23Be. When the auxiliary power supply voltage Vcc decreases to the lower-limit level Vccth1 in this state, the level of the auxiliary power voltage detection signal S_Vcc is switched from a low level to a high level, and the levels of the two signals which are inputted to the AND circuit 23Be become high.

At this time, the AND circuit 23Be outputs the high level signal to a set terminal S of the flip-flop circuit 23Bf. Accordingly, the output of the high level signal from the non-inverting output terminal Q of the flip-flop circuit 23Bf causes the switch 23Bc to be in an OFF state and the switch 23Bd to be in an ON state. The level of the output signal Veao_S therefore lowers to the level of the feedback control signal Veao resistively divided, as given by the following expression (6).

[Math 6]

$$\text{Veao\_S} = \frac{R4}{R3+R4} \times Veao \quad (6)$$

This state with the level of the feedback control signal Veao lowered will last until a high level signal is inputted to a reset terminal R of the flip-flop circuit 23Bf. In other words, when the auxiliary power voltage Vcc increases to the upper-limit level Vccth2 and the level of the auxiliary power voltage detection signal S_Vcc is switched from a high level to a low level, then a high level signal is inputted to the reset terminal R of the flip-flop circuit 23Bf. This causes the switch 23Bc to be in an ON state and the switch 23Bd in an OFF state. The output signal Veao_S thus becomes the same signal again as the feedback control signal Veao.

Figure 10:
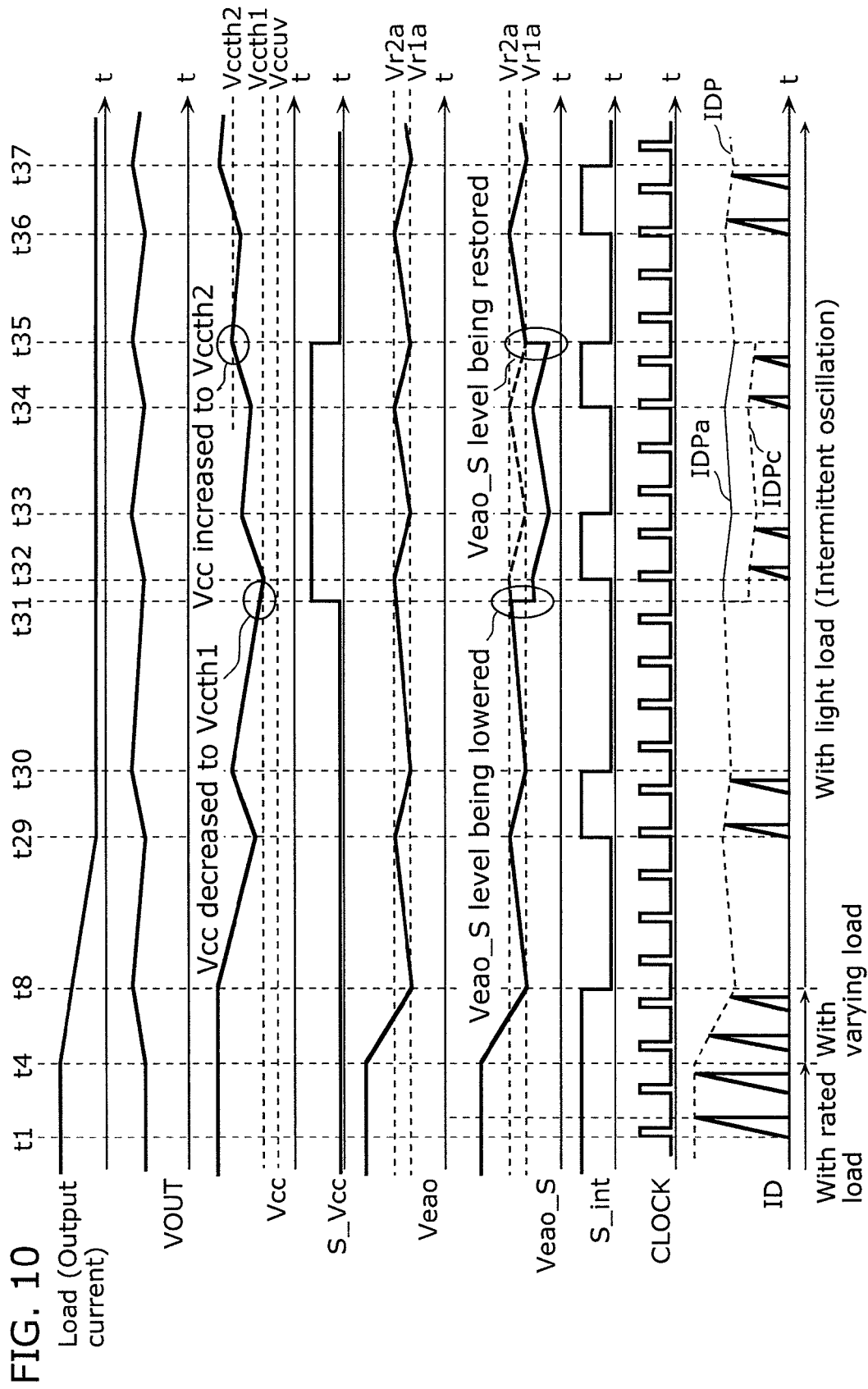
FIG. 10 is a timing chart showing an operation of a switching power supply apparatus according to the second embodiment of the present invention when an auxiliary power supply voltage decreases to a lower-limit level during intermittent oscillation.

FIG. 10 is a timing chart showing an operation of the semiconductor device 6B according to the second embodiment which is provided, for example, with the switching power supply apparatus 50 shown in FIG. 1.

When the suspension period becomes sufficiently long as compared to the oscillation period in the intermittent oscillation and at time t31, the auxiliary power voltage Vcc decreases to the lower-limit level Vccth1, the level of the power supply voltage detection signal S_Vcc is switched from a low level to a high level. This causes the switch 23Bc and the switch 23Bd shown in FIG. 9 to be in an OFF state and in an ON state, respectively. The level of the output signal Veao_S of the current peak conversion circuit 23B therefore decreases to the level given by the above expression (6). This output signal Veao_S is inputted to the inverting input terminal of the comparison circuit for detecting device current 22. The comparison circuit for detecting device current 22 compares the output signal Veao_S with the device current detection signal VD_S.

At time t32, if the feedback control signal Veao increases to the upper-limit reference voltage Vr2a, the oscillation period starts. As described above, the level of the output signal Veao_S of the current peak conversion circuit 23B is lower after time t31, and the current peak in the oscillation period from time t32 to time t33 is therefore IDPc, which is lower than the current peak IDPa before time t31.

Figure 11:
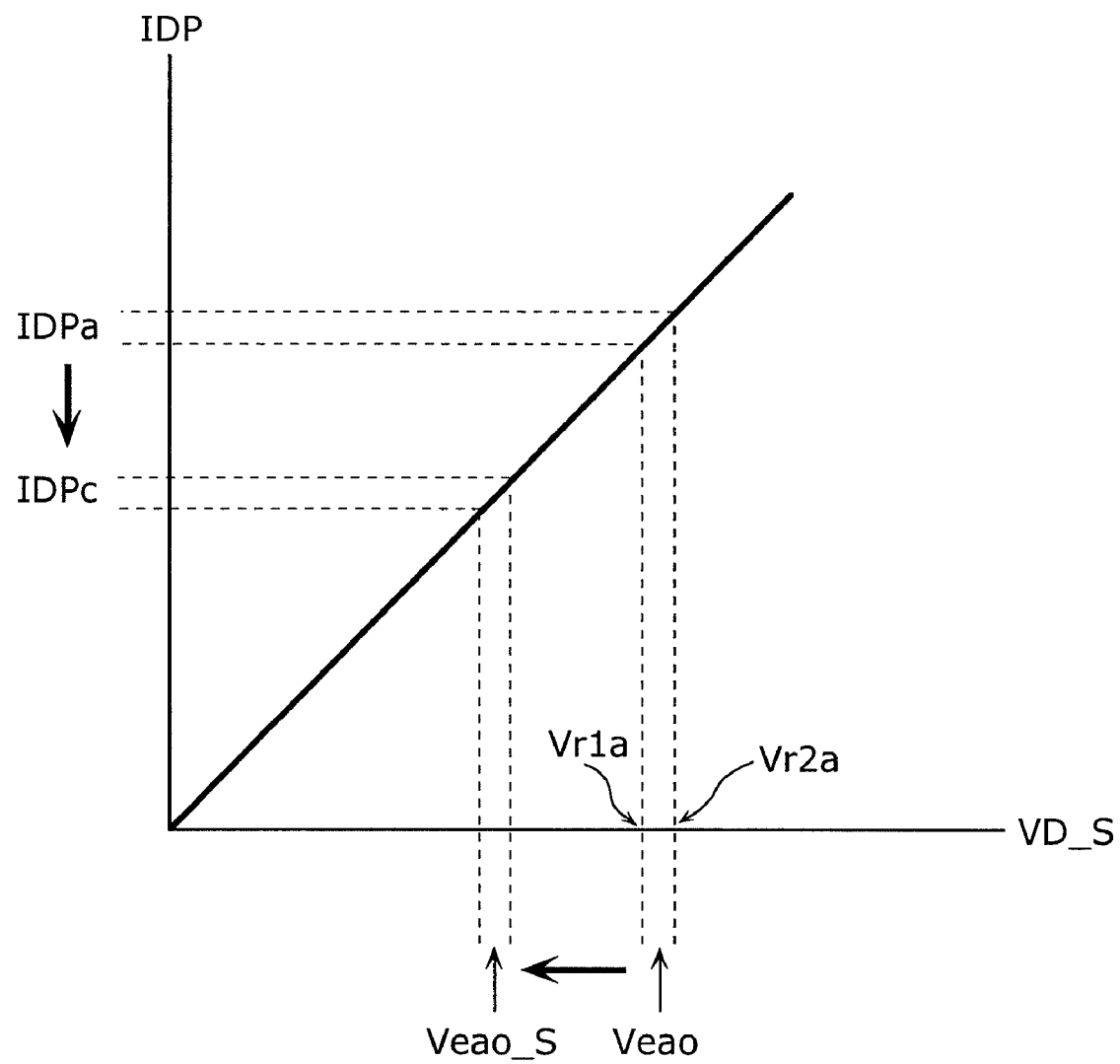
FIG. 11 is a view showing a relation between a device current detection signal and a current peak in the switching power supply apparatus according to the second embodiment of the present invention.

FIG. 11 is a view showing a relation between the device current detection signal VD_S and the current peak IDP in the second embodiment.

In the oscillation period before the auxiliary power voltage Vcc decreases to the lower-limit level Vccth1, the output signal Veao_S of the current peak conversion circuit 23B is the same signal as the feedback control signal Veao. The current peak at this time is thus IDPa, as in the case of FIG. 6 according to the first embodiment.

On the other hand, when the auxiliary power voltage Vcc decreases to the lower-limit level Vccth1, the reference voltage Vr does not change, unlike FIG. 6, but the level of the output signal Veao_S of the current peak conversion circuit 23B becomes lower than the level of the feedback control signal Veao, and the current peak therefore changes to IDPc, which is lower than IDPa.

Such lowering of the current peak IDP makes the suspension period from time t33 to time t34 shorter than the suspension period from time t30 to time t32, resulting in an increase in the auxiliary power voltage Vcc.

Next, at time t35, the auxiliary power voltage Vcc increases to the upper-limit level Vccth1, and the level of the auxiliary power voltage detection signal S_Vcc is switched from a high level to a low level. Accordingly, the high level signal is inputted to the reset terminal R of the flip-flop circuit 23Bf. This causes the switch 23Bc to be in an ON state and the switch 23Bc in an OFF state in the current peak conversion circuit 23B. The output signal Veao_S of the current peak conversion circuit 23B therefore comes out of the low level state and becomes the same signal as the feedback control signal Veao. Thus, the current peak in the oscillation period from time t36 to t37 becomes IDPa, which is the same as the current peak in the oscillation period before time t31.

As described above, in the semiconductor device 6B according to the second embodiment, when the auxiliary power voltage Vcc decreases to the lower-limit level Vccth1, the level of the output signal Veao_S which is outputted from the current peak conversion circuit 23B and inputted to the inverting input terminal of the comparison circuit for detecting device current 22 is switched to a low level. The semiconductor device 6B is therefore capable of lowering the current peak IDP of the oscillation period in the auxiliary power voltage decrease mode. This shortens the suspension period, with the result that the semiconductor device 6B is capable of preventing the problems such as shutting down of the control circuit caused due to the decrease of the auxiliary power voltage Vcc to the minimum allowable voltage Vccuv.

Furthermore, the above operation allows the semiconductor device 6B according to the second embodiment to lower the current peak IDP in the oscillation period even when switching occurs only once in one cycle of the intermittent oscillation. Consequently, the same effects as those obtained by the first embodiment can be obtained in any intermittent oscillation.

Third Embodiment

The switching power supply apparatus 50 according to the third embodiment of the present invention is a variation of the above-described switching power supply apparatus 50 according to the first embodiment and is different from the switching power supply apparatus 50 according to the first embodiment in the configuration for lowering the current peak IDP in the auxiliary power voltage decrease mode. To be specific, the switching power supply apparatus 50 according to the third embodiment lowers the current peak IDP in the auxiliary power voltage decrease mode by increasing the device current detection signal VD_S which is inputted to the comparison circuit for detecting device current 22 in the auxiliary power voltage decrease mode.

The following explanation for the third embodiment will focus on the differences from the first and second embodiments. The other configurations, operations, and effects will not be explained since they are the same or alike as those in the first and second embodiments.

The switching power supply apparatus 50 according to the third embodiment of the present invention is different from that according to the first embodiment in a configuration of a control circuit 9C included in a semiconductor device 6C. To be more specific, what is different is a configuration of a current peak conversion circuit 23C included in a peak current control circuit 15C.

Figure 12:
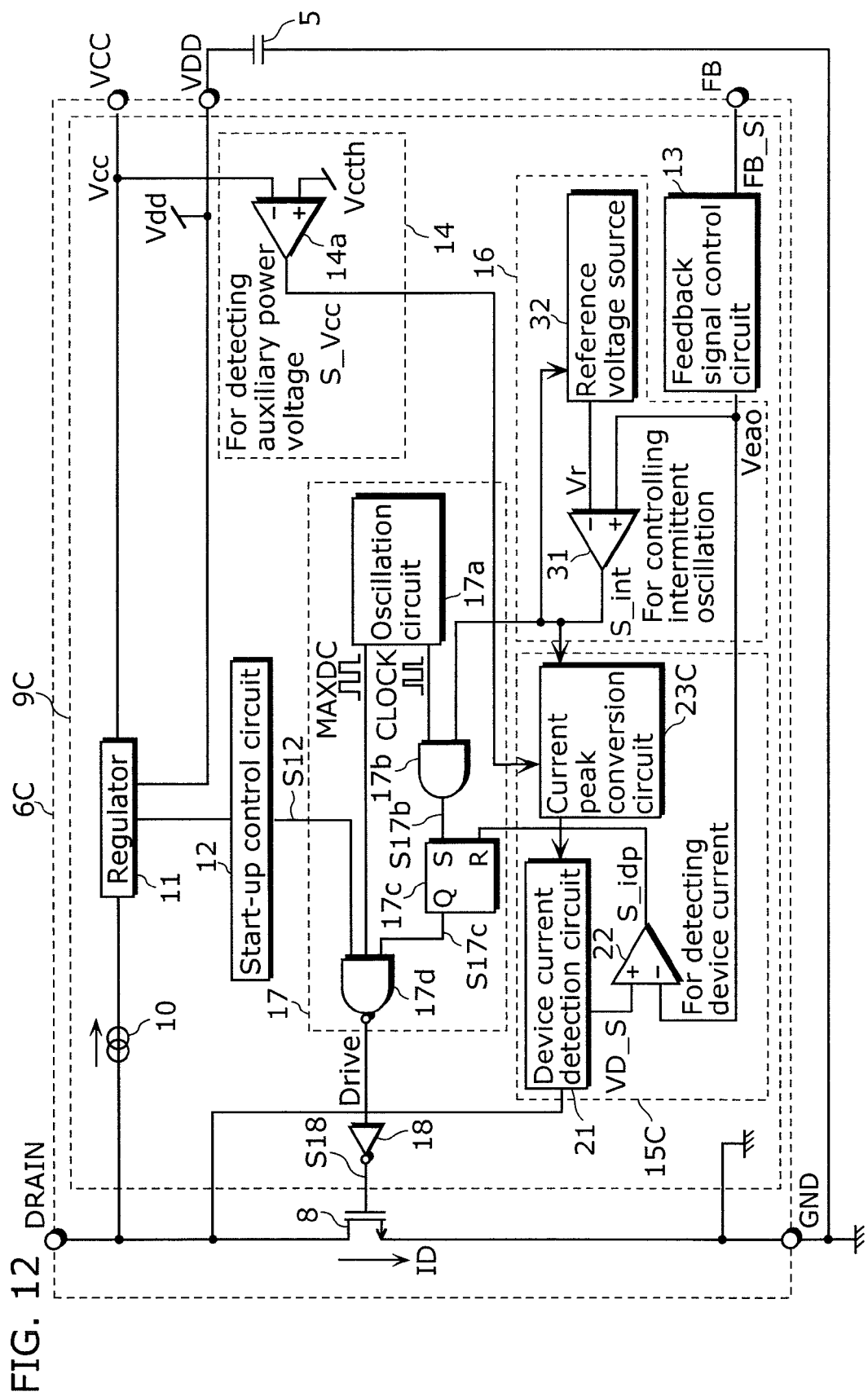
FIG. 12 is a block diagram showing an example of a configuration of a semiconductor device according to a third embodiment of the present invention.

FIG. 12 is a block diagram showing an example of a configuration of the semiconductor device 6C according to the third embodiment.

The current peak conversion circuit 23C shown in FIG. 12 is connected to the device current detection circuit 21 and the output of the comparison circuit for controlling intermittent oscillation 31.

This current peak conversion circuit 23C converts the device current detection signal VD_S which is inputted to the comparison circuit for detecting device current 22 so that each pulse included in the drive signal Drive becomes inactive earlier in the auxiliary power voltage decrease mode than in the normal mode.

To be specific, in the auxiliary power voltage decrease mode, the current peak conversion circuit 23C changes the device current detection signal VD_S which is inputted to the comparison circuit for detecting device current 22, to a further extent than in the normal mode, in an orientation that the device current detection signal VD_S changes as the device current ID becomes larger. Thus, in the current peak conversion circuit 23C, the device current detection signal VD_S is larger in the auxiliary power voltage decrease mode than in the normal mode.

Figure 13:
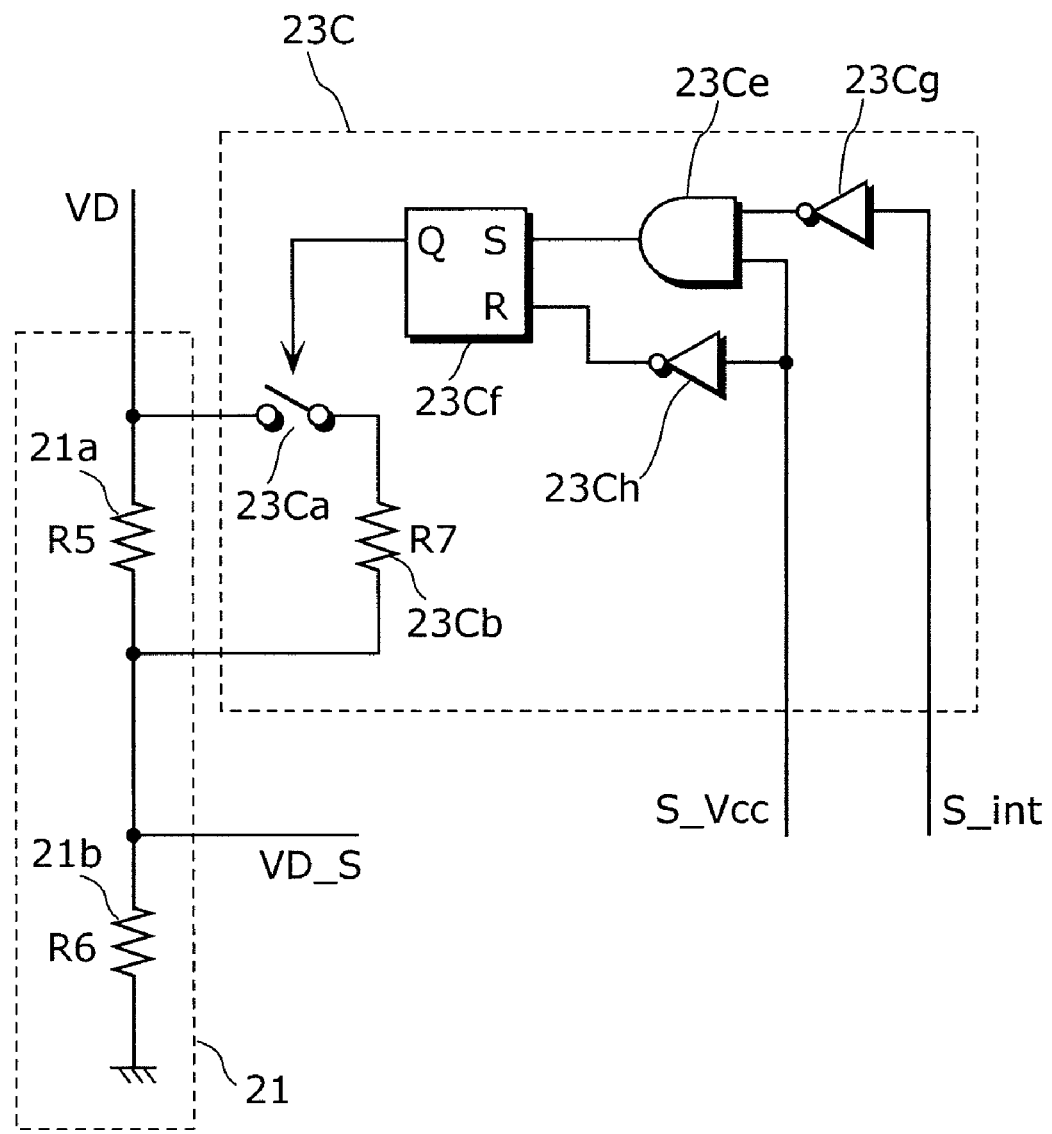
FIG. 13 is a circuit diagram showing an example of configurations of a current peak conversion circuit and a device current detection circuit according to the third embodiment of the present invention.

FIG. 13 is a circuit diagram showing a specific example of configurations of the device current detection circuit 21 and the current peak conversion circuit 23C for use in the semiconductor device 6C according to the third embodiment shown in FIG. 12.

As shown in FIG. 13, this device current detection circuit 21 includes two resistors 21a and 21b, which are connected in series with each other and have resistances R5 and R6, respectively. This device current detection circuit 21 receives a voltage signal VD, and outputs a signal which is obtained by resistively dividing the level of the voltage signal VD indicating the magnitude of the device current ID; that is, outputs the device current detection signal VD_S.

The current peak conversion circuit 23C includes a resistor 23Cb having a resistance R7 and a switch 23Ca connected in series with the resistor 23Cb. This series circuit of the switch 23Cb and the switch 23Ca is connected in parallel with the resistor 21a in the device current detection circuit 21.

As in the case of the above second embodiment, the current peak conversion circuit 23C includes an AND circuit 23Ce, a flip-flop circuit 23Cf, and two inverter circuits 23Cg and 23Ch, as means for controlling the switch 23Ca between its ON state and OFF state.

The operation of these device current detection circuit 21 and current peak conversion circuit 23 will be explained below.

During the oscillation period of the intermittent oscillation, a low level signal is outputted from a non-inverting output terminal Q of the flip-flop circuit 23Cf as in the case of the above current peak conversion circuit 23B according to the second embodiment. Accordingly, the switch 23Ca is in an OFF state. A device current detection signal VD_Sa at this time is therefore given by the following expression (7) using the voltage signal VD.

[Math 7]

$$VD\_Sa = \frac{R6}{R5 + R6} \times VD \quad (7)$$

Now, when the suspension period of the intermittent oscillation starts and the auxiliary power voltage Vcc decreases to the lower-limit level Vccth1, then a high level signal is outputted from the non-inverting output terminal Q of the flip-flop circuit 23Cf. This causes the switch 23Ca to be in an ON state. Accordingly, the device current detection signal VD_Sa changes to VD_Sb as given by the following expression (8).

[Math 8]

$$VD\_Sb = \frac{R6}{\left(\frac{1}{1/R5 + 1/R7}\right) + R6} \times VD \quad (8)$$

According to the above expression (7) and (8), the relation between VD_Sa and VD_Sb satisfies VD_Sa<VD_Sb. This state with the changed relation between the input signal VD and the output signal, i.e., the device current detection signal VD_S, of the device current detection circuit 21 will last until the auxiliary power voltage Vcc increases to the upper-limit level Vccth2.

Figure 14:
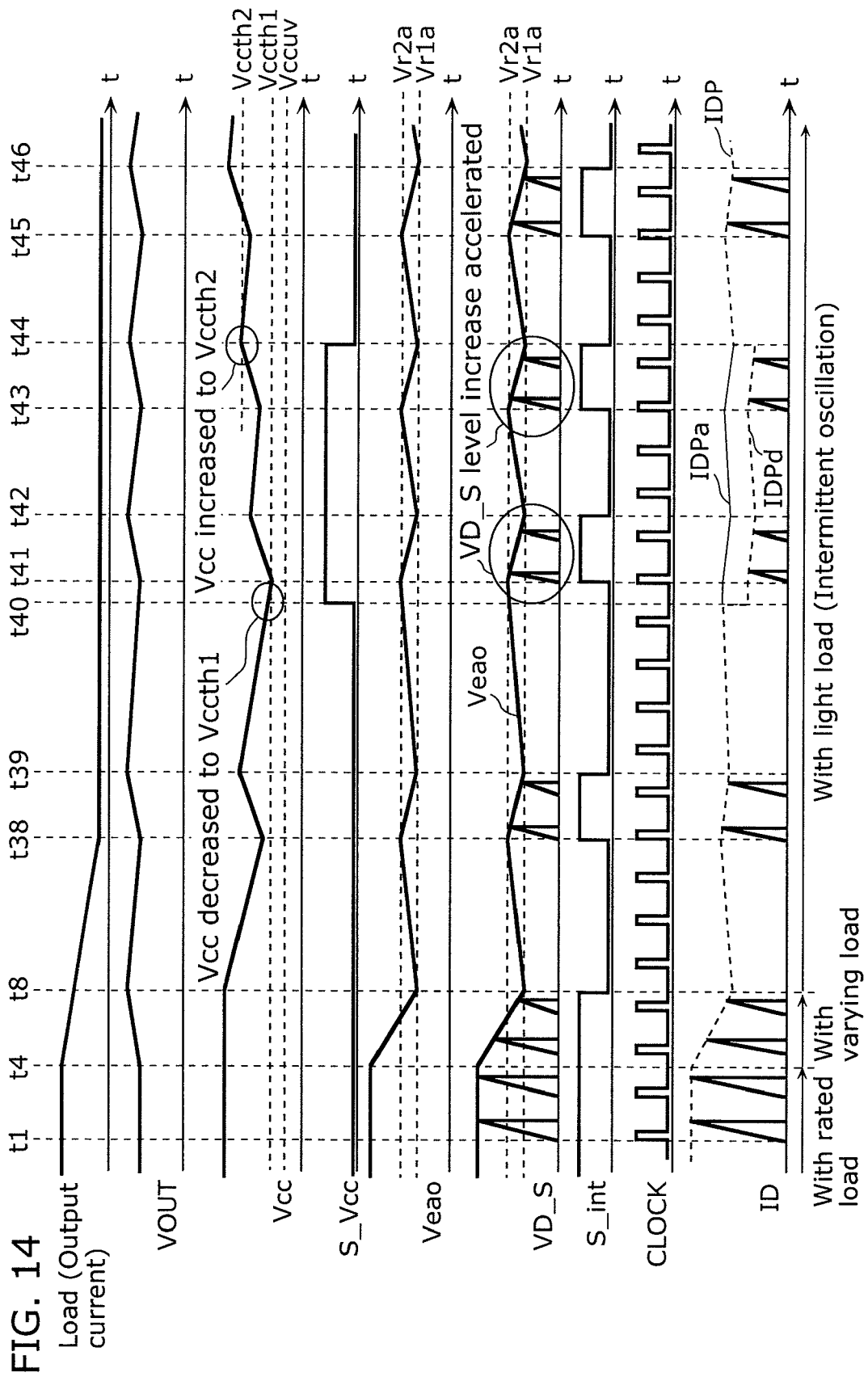
FIG. 14 is a timing chart showing an operation of a switching power supply apparatus according to the third embodiment of the present invention when an auxiliary power supply voltage decreases to a lower-limit level during intermittent oscillation.

FIG. 14 is a timing chart showing an operation of the semiconductor device 6C according to the third embodiment which is provided, for example, with the switching power supply apparatus 50 shown in FIG. 1.

When the suspension period of the intermittent oscillation becomes long and at time t40, the auxiliary power voltage Vcc decreases to the lower-limit level Vccth1, the switch 23Ca of FIG. 13 is turned on. Accordingly, the relation between the input signal VD and the output signal, i.e., the device current detection signal VD_S, of the device current detection circuit 21 changes from the above expression (7) to the above expression (8). Thus, the level of the device current detection signal VD_S becomes larger than the level of the input signal VD.

At time t41, if the feedback control signal Veao increases to the upper-limit reference voltage Vr2a, the oscillation period starts.

Figure 15:
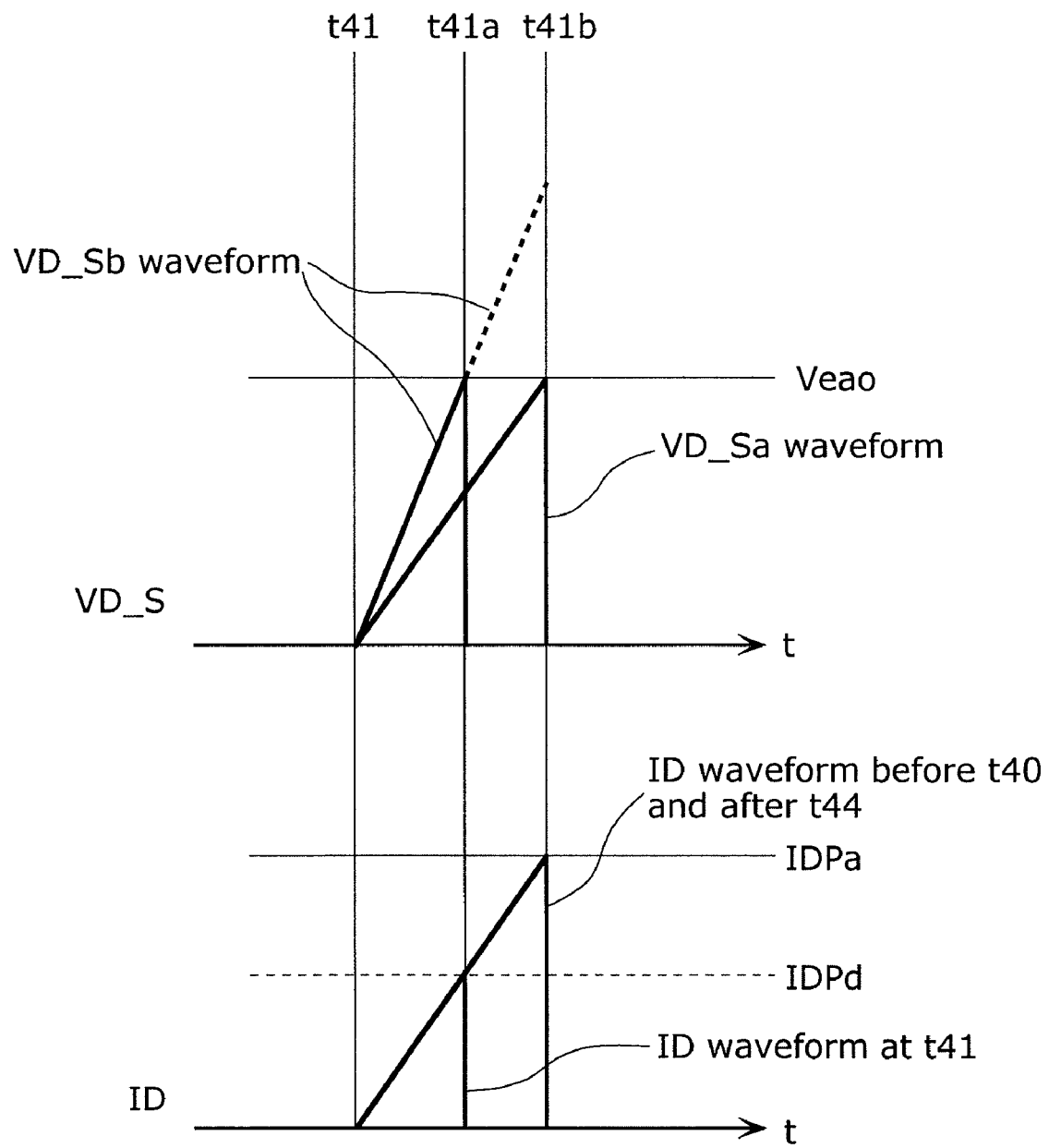
FIG. 15 is a waveform diagram showing a current detection signal and a device current in the switching power supply apparatus according to the third embodiment of the present invention.

FIG. 15 is a waveform diagram showing the current detection signal VD_Sb and the device current ID when the switching device 8 is turned on at time t41. In addition, waveforms of the device current detection signal VD_Sb and the device current ID in the oscillation period before time t40 are shown as waveforms for comparison.

Referring to FIG. 15, first, in the waveforms in the oscillation period before time t40, the switching device 8 is turned on at time t41. Next, at time t41b, the device current detection signal VD_Sb increases to the level of the feedback control signal Veao, and the switching device 8 is turned off. Accordingly, the current peak of the device current ID becomes IDPa.

On the other hand, when the switching device 8 is turned on at time t41 and the device current ID increases, the device current detection signal VD_Sb, of which increase speed is greater than the increase speed of the device current detection signal VD_Sa, reaches the level of the feedback control signal Veao at time t41a. This causes the switching device 8 to be turned off at time t41a. Accordingly, the current peak IDPd at this time is lower than the current peak IDPa in the oscillation period before time t40.

Figure 16B:
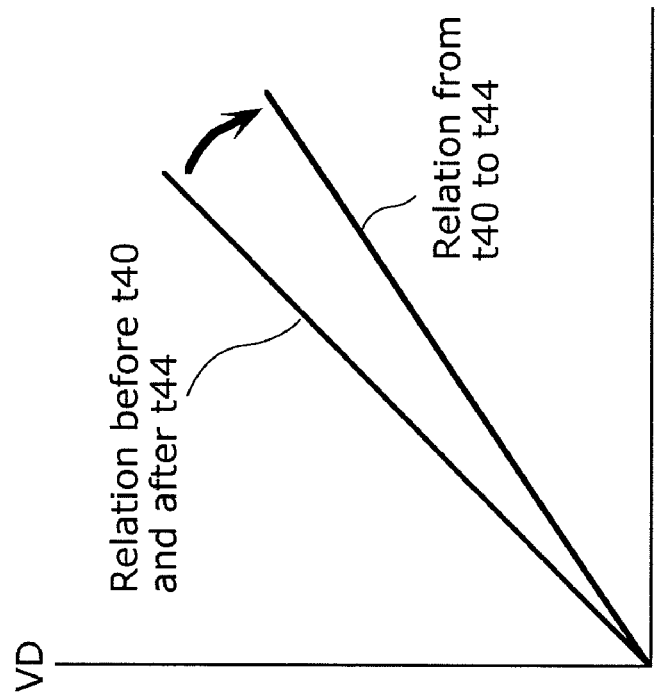
FIG. 16B is a view showing a relation between the device current detection signal and a current peak in the switching power supply apparatus according to the third embodiment of the present invention.
Figure 16A:
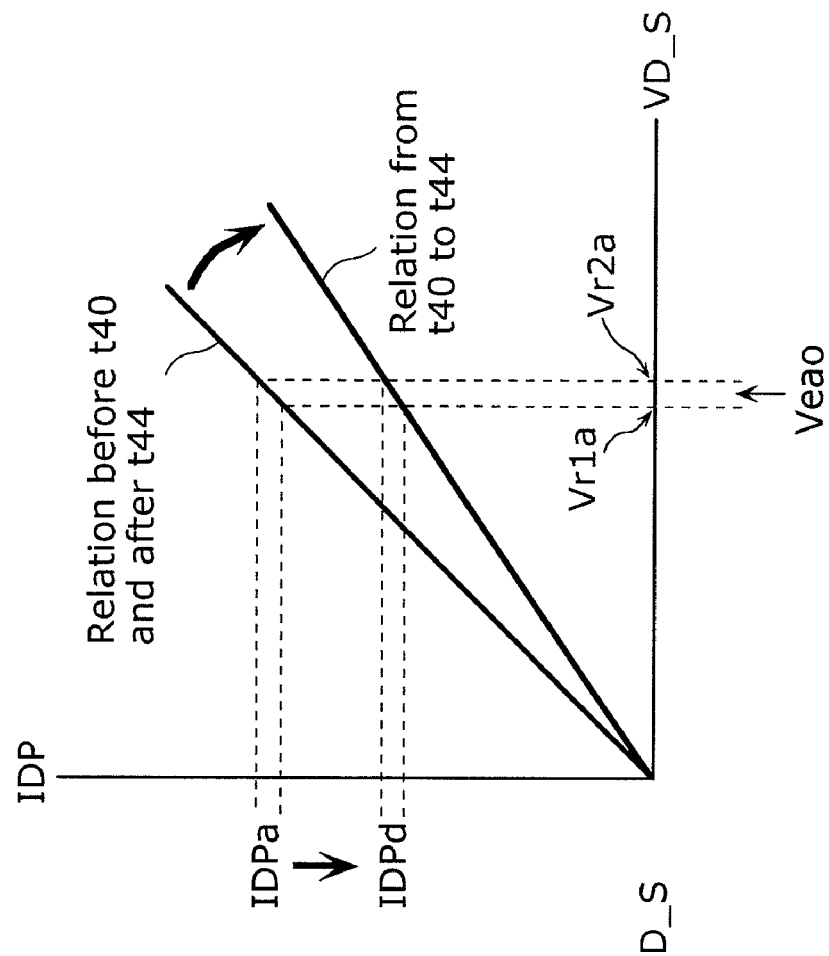
FIG. 16A is a view showing a relation between an input signal of the device current detection circuit and the device current detection signal in the switching power supply apparatus according to the third embodiment of the present invention.
Figure 17:
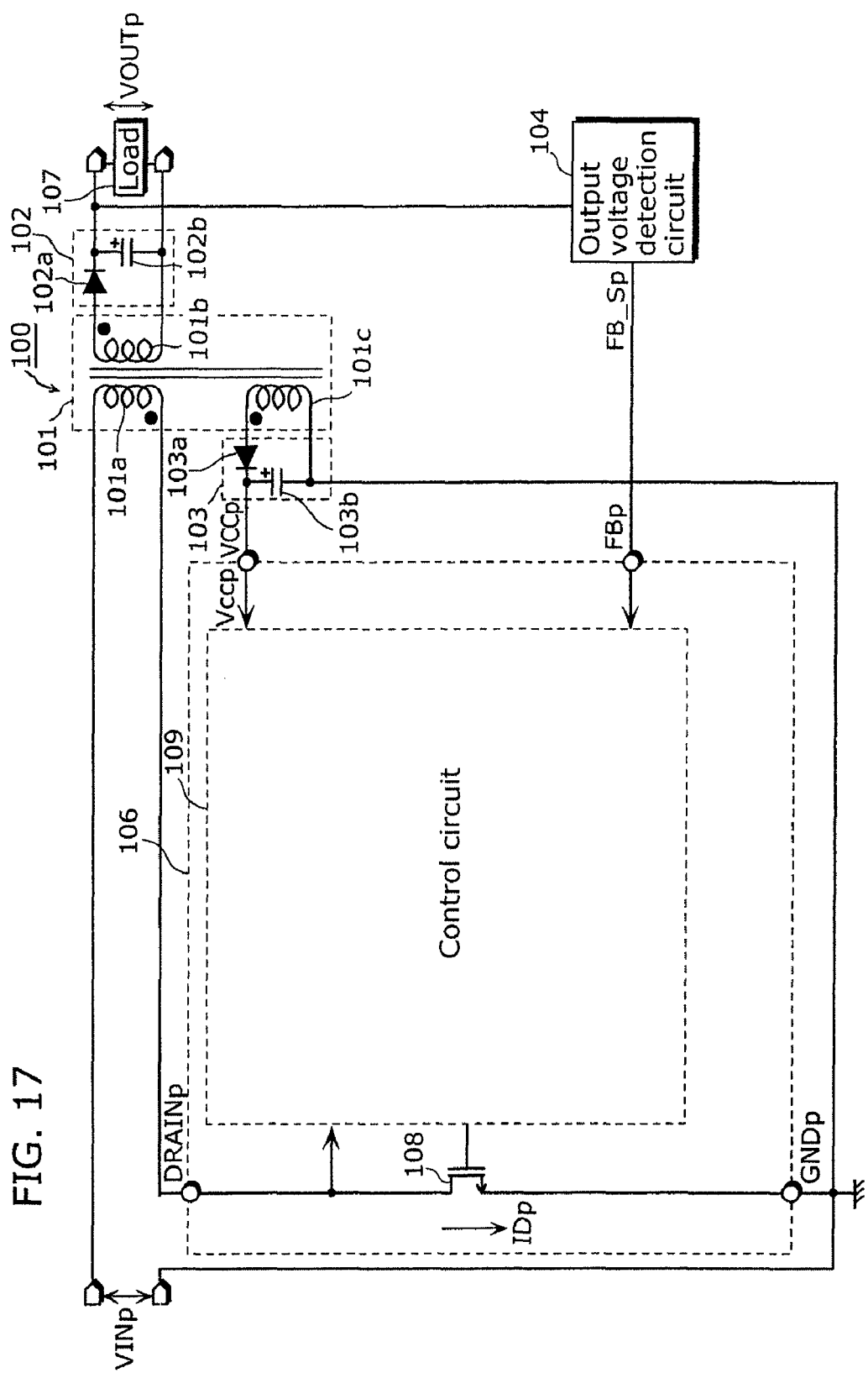
FIG. 17 is a block diagram showing an example of a configuration of a switching power supply apparatus of a conventional design.
Figure 18:
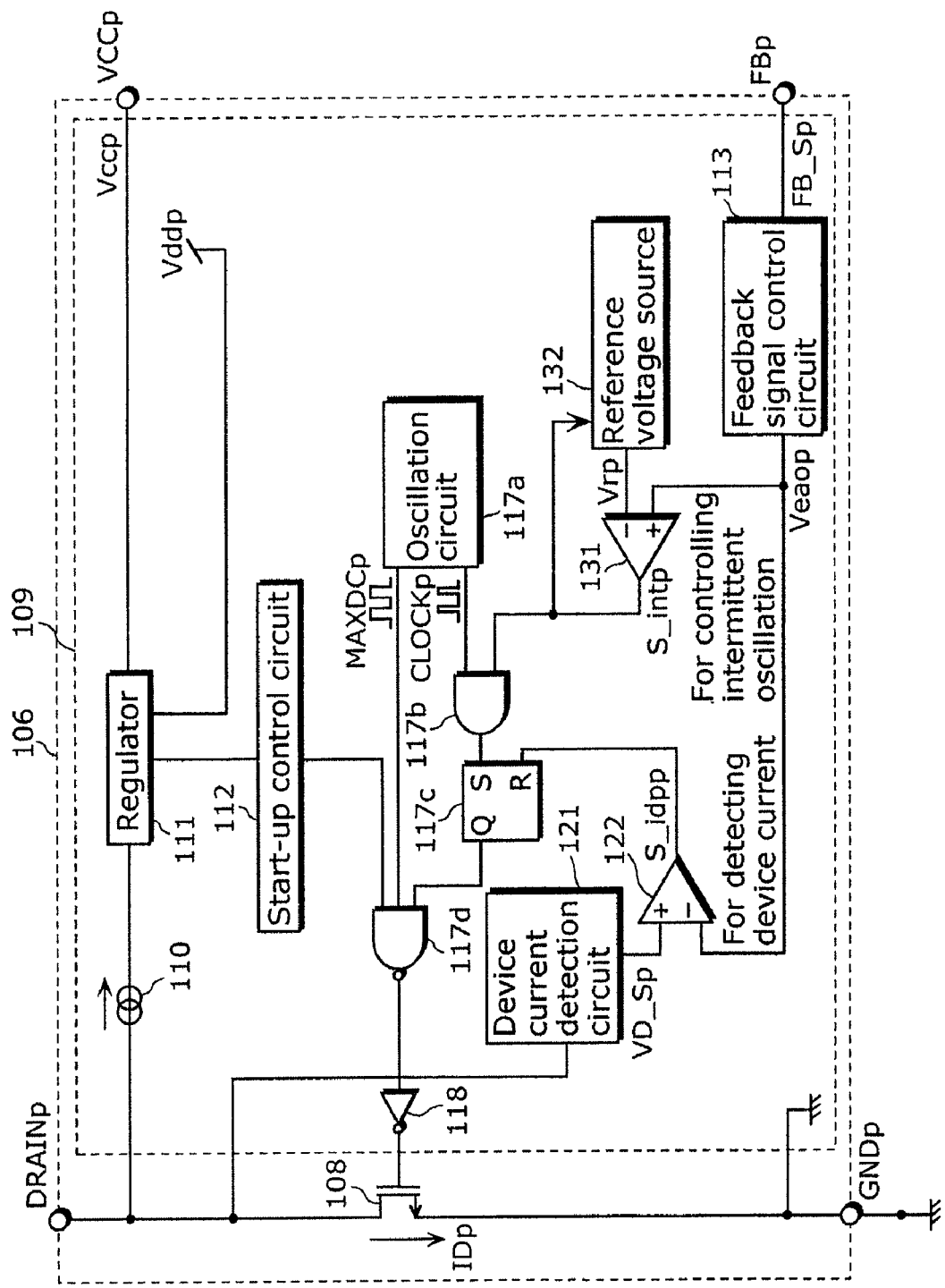
FIG. 18 is a block diagram showing an example of a configuration of a semiconductor device of a conventional design.
Figure 19:
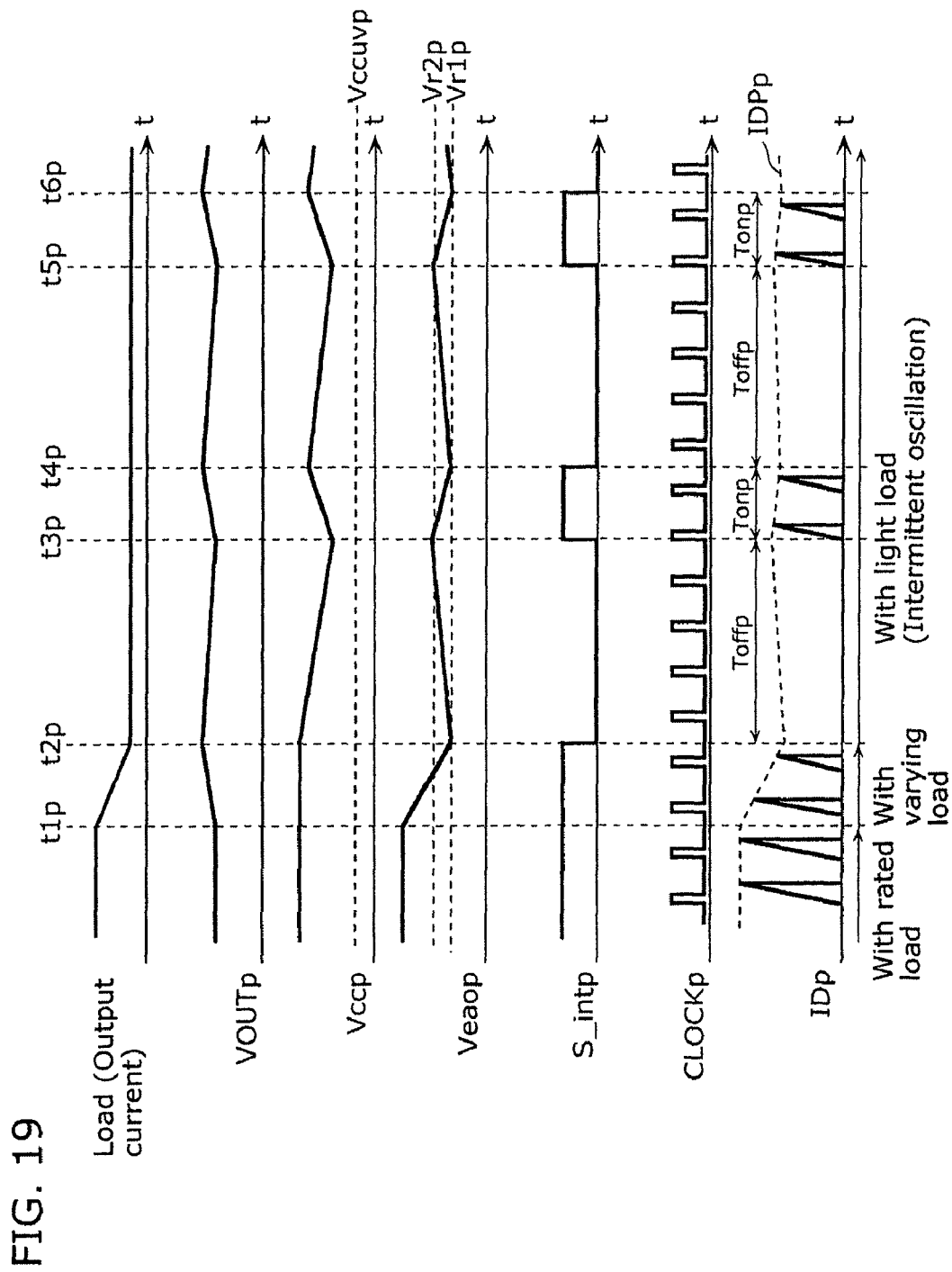
FIG. 19 is a timing chart showing intermittent oscillation of the switching power supply apparatus of the conventional design.
Figure 20:
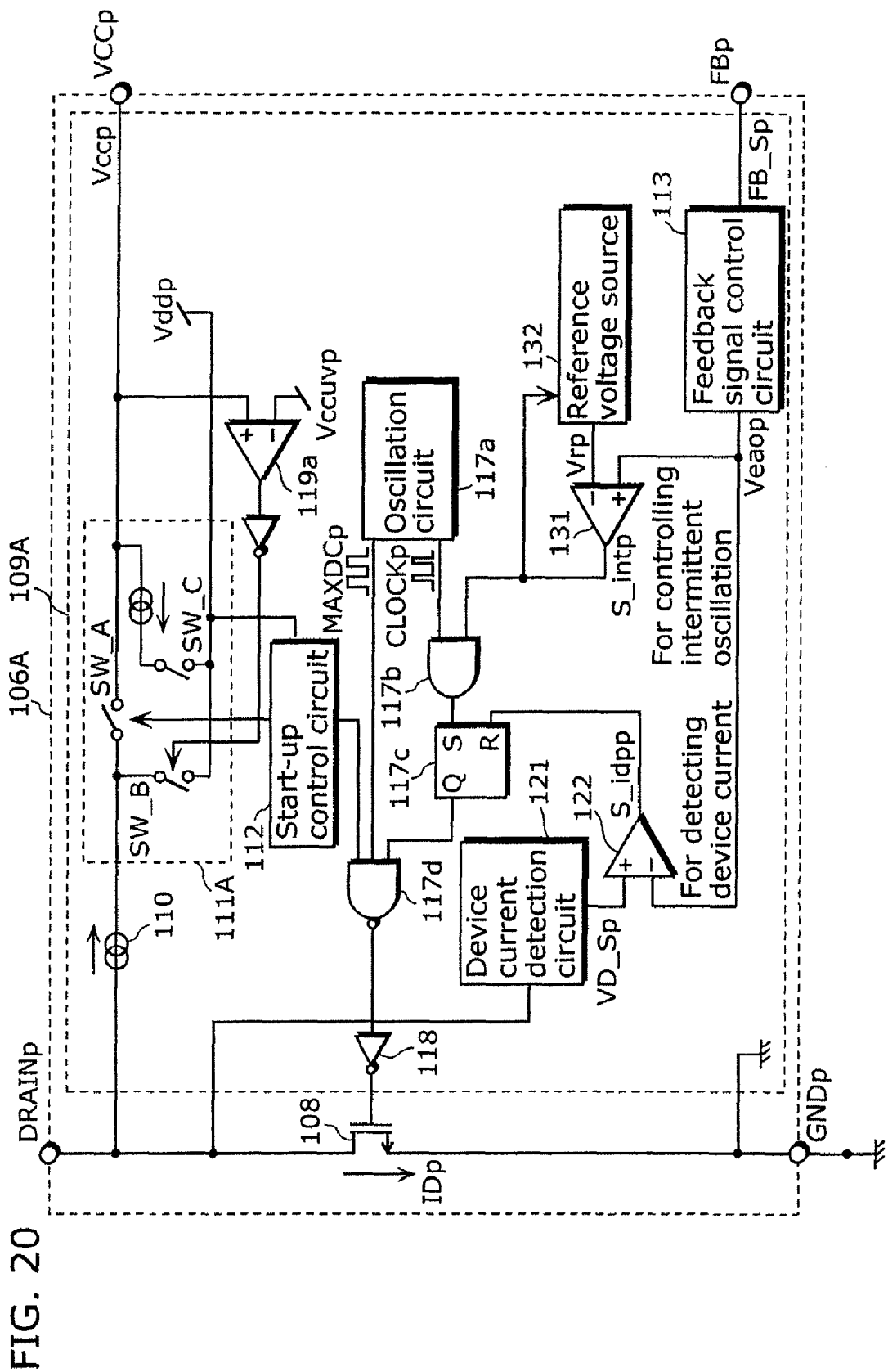
FIG. 20 is a block diagram showing an example of a configuration of a semiconductor device of a conventional design.
Figure 21A:
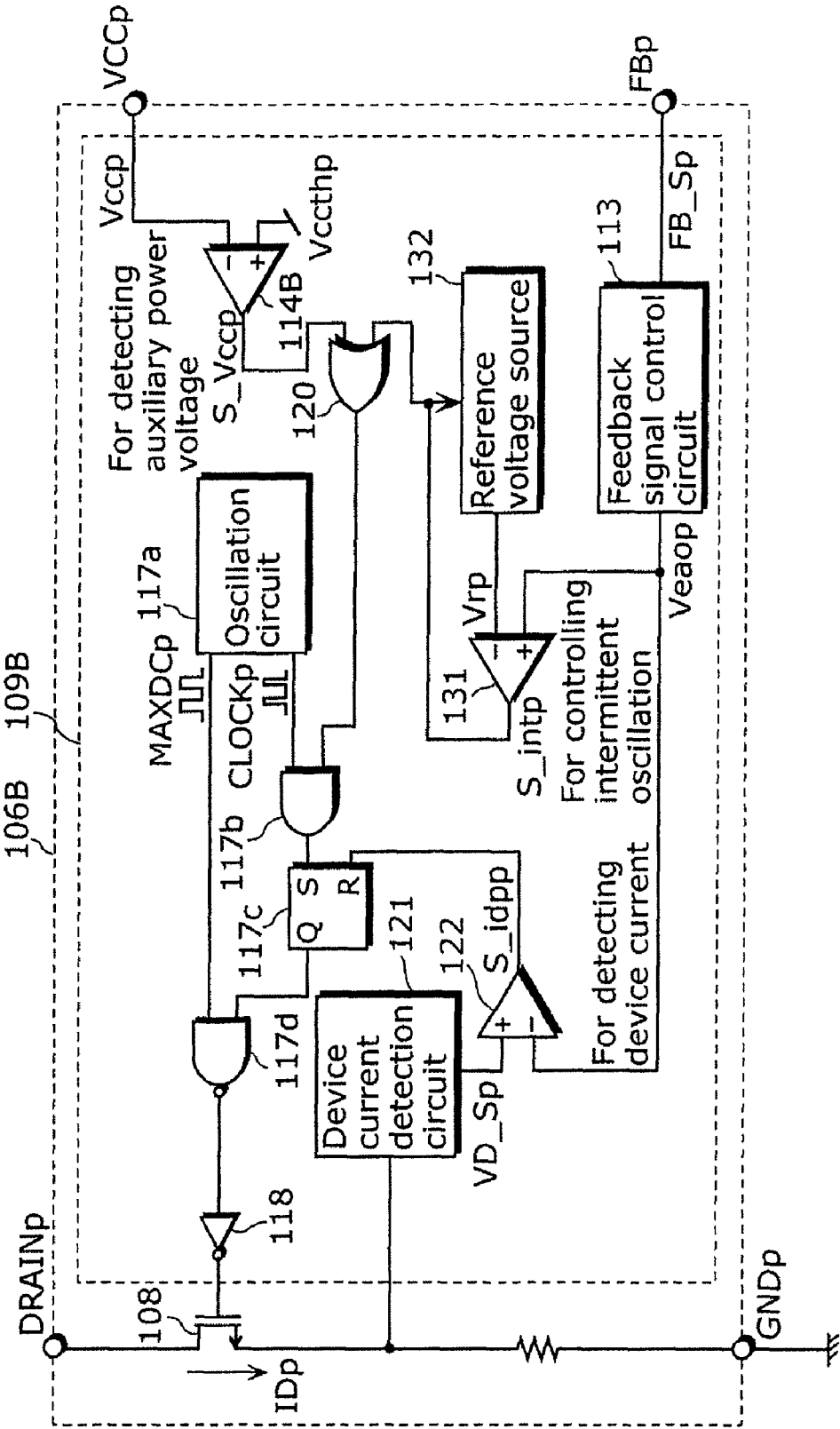
FIG. 21A is a block diagram showing an example of a configuration of a semiconductor device of a conventional design.
Figure 21B:
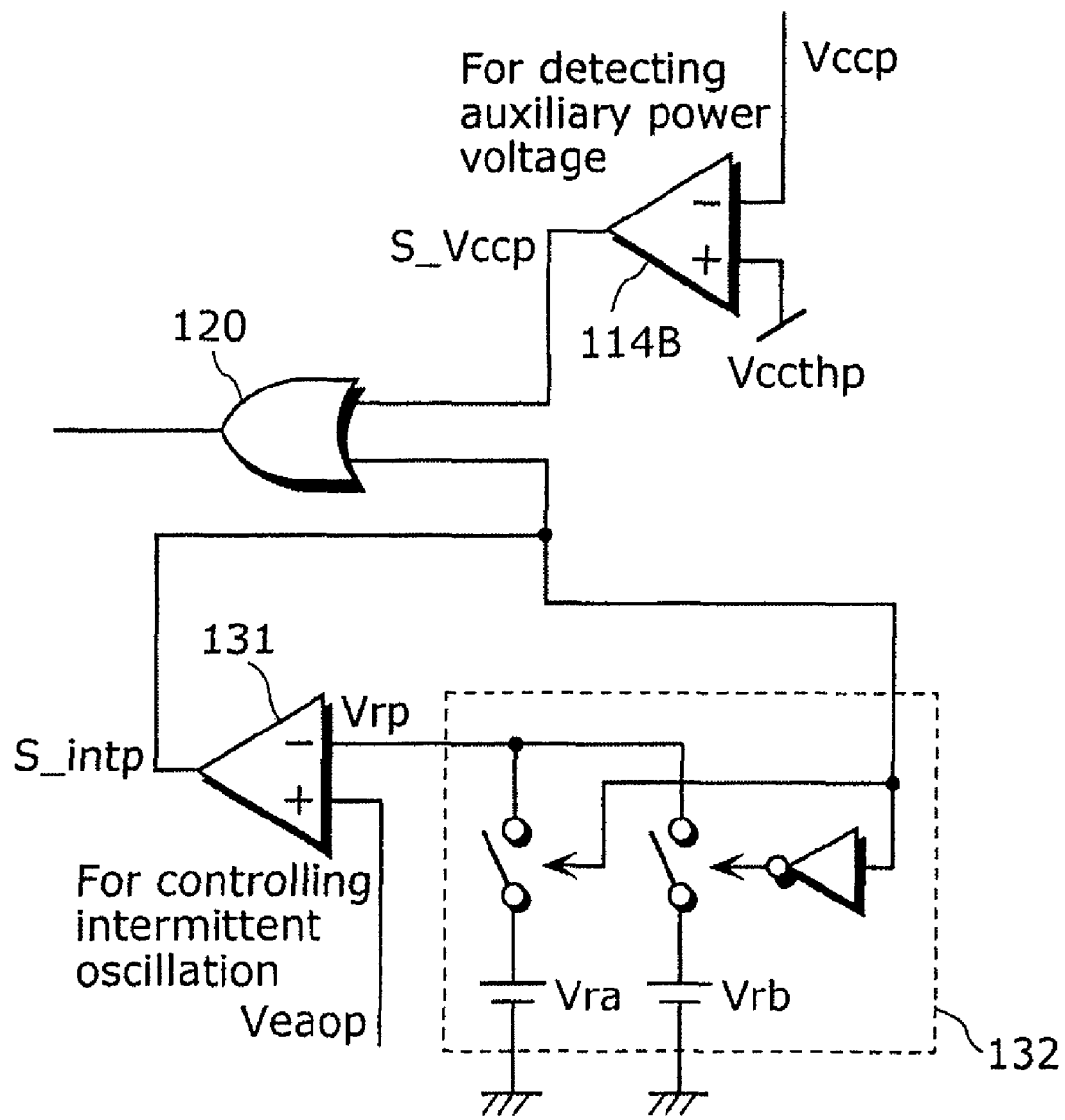
FIG. 21B is a circuit diagram showing an example of a configuration of a reference voltage source of a semiconductor device of the conventional design.
Figure 22:
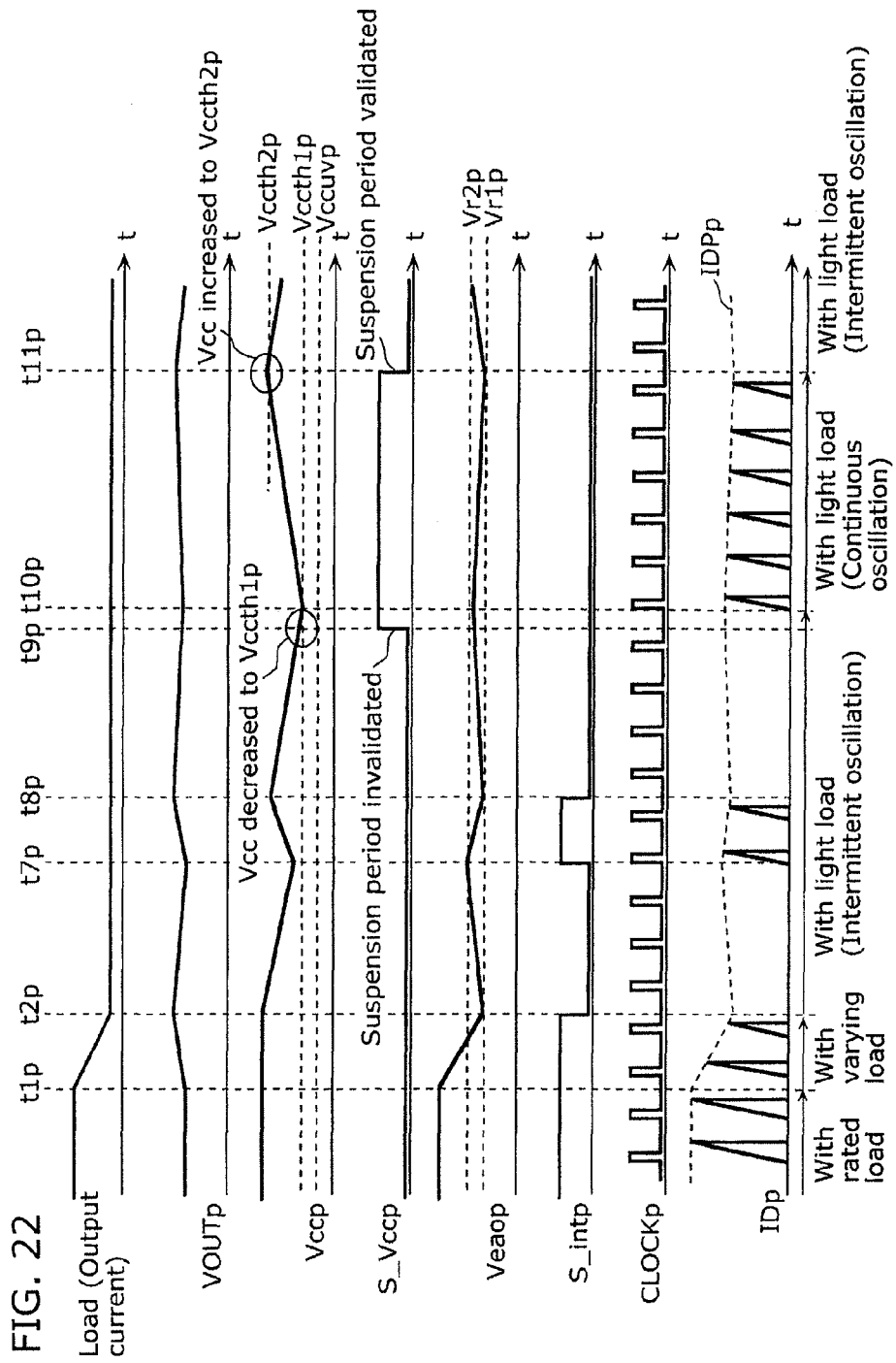
FIG. 22 is a timing chart showing an operation of a switching power supply apparatus of a conventional design when an auxiliary power voltage decreases to a lower-limit level during intermittent oscillation.
Figure 23A:
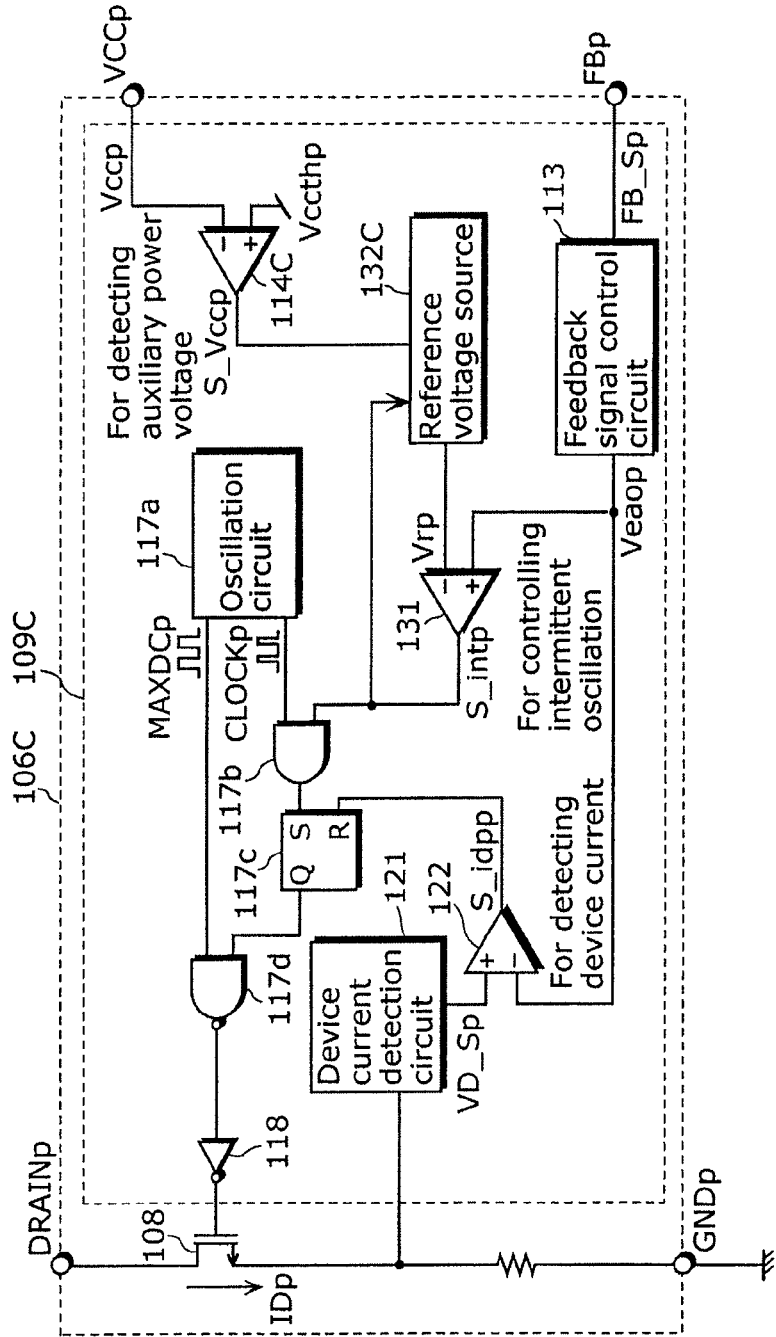
FIG. 23A is a block diagram showing an example of a configuration of a semiconductor device of a conventionally style.
Figure 23B:
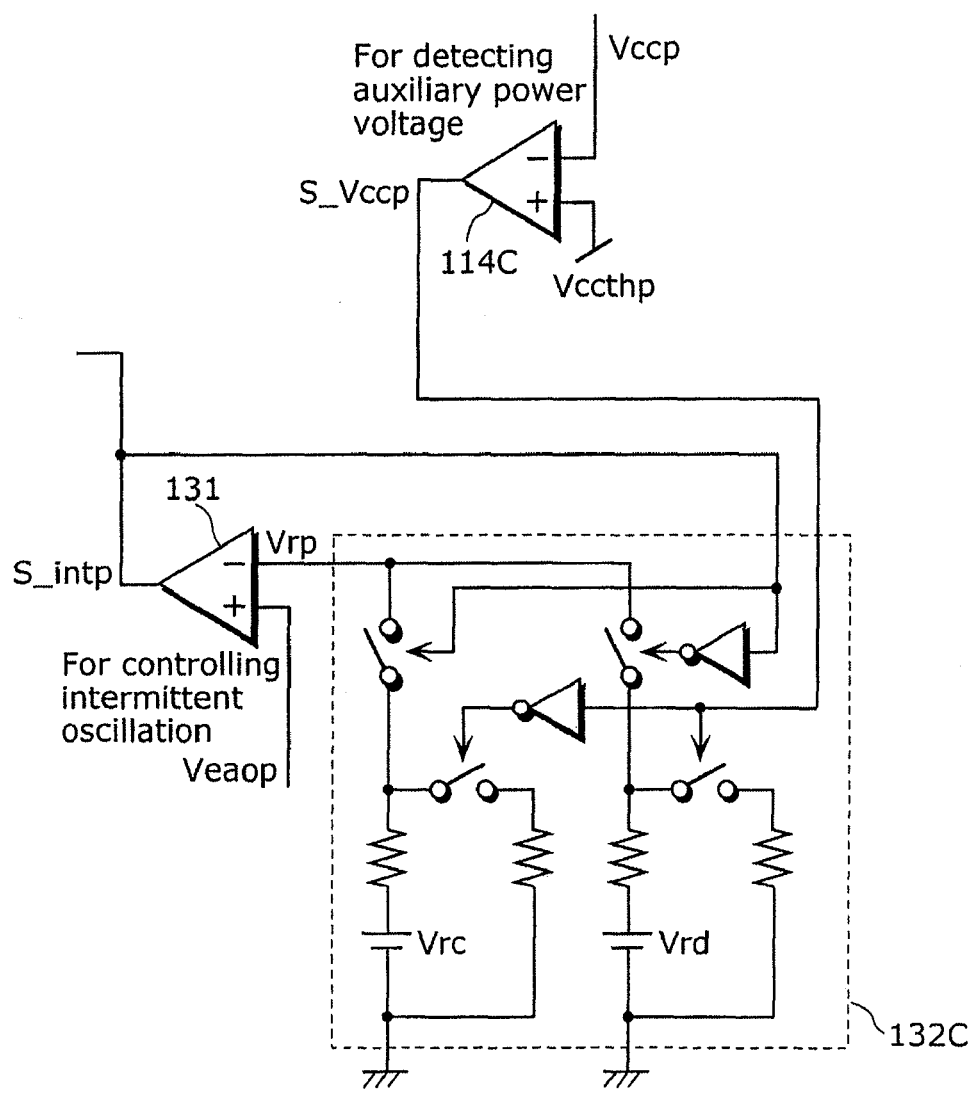
FIG. 23B is a circuit diagram showing an example of a configuration of a reference voltage source of a semiconductor device of the conventional design.
Figure 24:
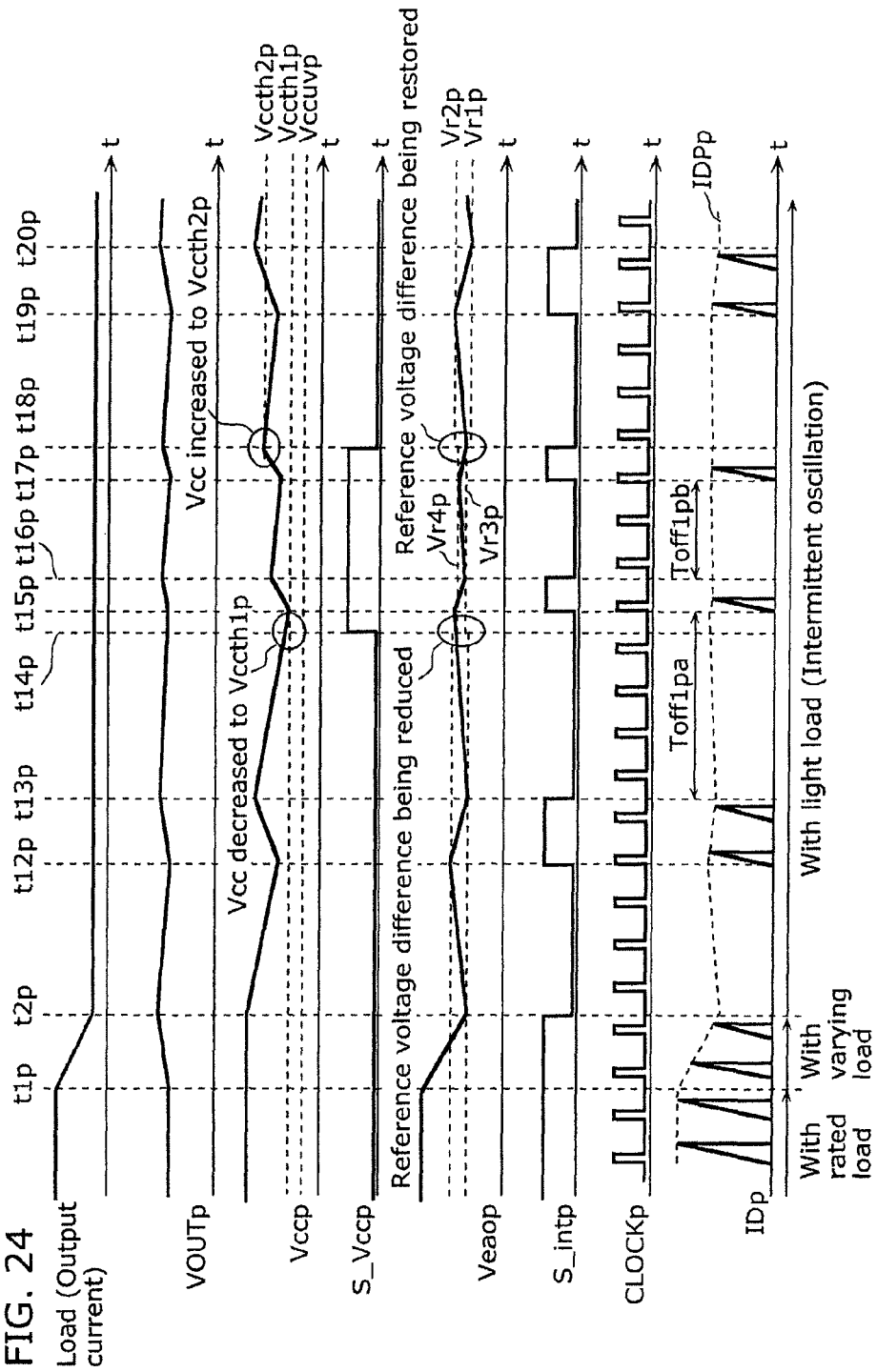
FIG. 24 is a timing chart showing an operation of a switching power supply apparatus of a conventional design when an auxiliary power voltage decreases to a lower-limit level during intermittent oscillation.
Figure 25:
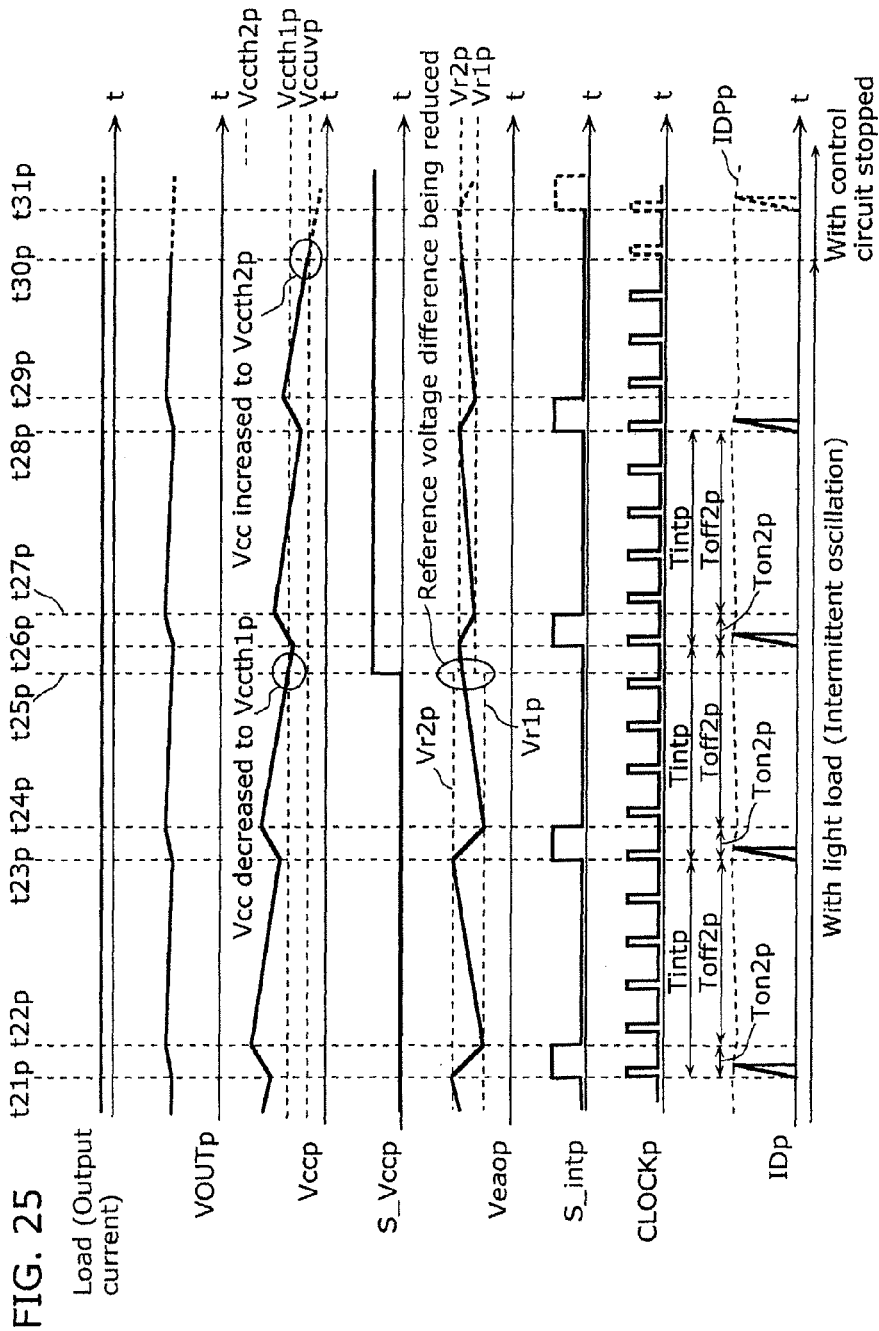
FIG. 25 is a timing chart showing an operation of a switching power supply apparatus of a conventional design when an auxiliary power voltage decreases to a lower-limit level during intermittent oscillation in which switching occurs only once in one cycle of the intermittent oscillation.

FIG. 16A is a view showing a relation between the device current detection signal VD_S and the input signal VD of the device current detection circuit 21. FIG. 16B is a view showing a relation between the device current detection signal VD_S and the current peak IDP of the device current ID.

When the auxiliary power voltage Vcc decreases to the lower-limit level Vccth1 at time t40 of FIG. 14, the relation between the device current detection signal VD_S and the input signal VD of the device current detection circuit 21 changes as shown in FIG. 16A. Since the input signal VD of the device current detection circuit 21 is based on the device current ID, the relation between the device current detection signal VD_S and the current peak IDP of the device current ID also changes. Thus, the current peak changes to IDPd, which is lower than IDPa.

Consequently, the current peak IDPd in the oscillation period after time t40 is lower than the current peak IDPa in the oscillation period before time t40. This makes the suspension period from time t42 to time t43 shorter than that from time t39 to time t41 for the same reasons as in the first and second embodiments, thus causing an increase in the auxiliary power voltage Vcc.

Later, at time t44, the auxiliary power voltage Vcc increases to the upper-limit level Vccth2, and the level of the auxiliary power voltage detection signal S_Vcc is switched from a high level to a low level. This causes the switch 23Ca in the current peak conversion circuit 23C to be in an OFF state, with the result that the current device detection signal becomes VD_Sa. Thus, the current peak in the oscillation period from time t45 to t46 becomes IDPa which is the same as the current peak in the oscillation period before time t40.

As described above, in the semiconductor device 6C according to the third embodiment, when the auxiliary power voltage Vcc decreases to the lower-limit level Vccth1, the relation between the input signal VD and the output signal, i.e., the device current detection signal VD_S, of the device current detection circuit 21 is changed according to the operation of the current peak conversion circuit 23C. The semiconductor device 6C is therefore capable of lowering the current peak IDP of the oscillation period in the auxiliary power voltage decrease mode. This shortens the suspension period, with the result that the semiconductor device 6C is capable of preventing the problems such as shutting down of the control circuit caused due to the decrease of the auxiliary power voltage Vcc to the minimum allowable voltage Vccuv.

The semiconductor device 6C provides the same effects as those obtained in the first or second embodiment, regarding any intermittent oscillation including a case where switching occurs only once in one cycle of the intermittent oscillation.

As described above, the switching power supply apparatus 50 according to the first to third embodiments of the present invention have a longer suspension period in the intermittent oscillation when the load is light, and when the auxiliary power voltage Vcc decreases to the lower-limit level, the switching power supply apparatus 50 detects such a decrease and shifts to the auxiliary power voltage decrease mode. In the auxiliary power decrease mode, the current peak is lower in the oscillation period of the intermittent oscillation than in the oscillation period of the intermittent oscillation before the auxiliary power voltage Vcc decreases to the lower-limit level. By so doing, the switching power supply apparatus 50 according to the first to third embodiments of the present invention is capable of shortening the suspension period of the intermittent oscillation while preventing the auxiliary power voltage Vcc from decreasing to the minimum allowable voltage. The switching power supply apparatus 50 according to the first to third embodiments of the present invention is thus capable of preventing problems such as shutting down of the control circuit caused due to the decrease of the auxiliary power voltage Vcc to the minimum allowable voltage, and a significant increase in power consumption.

Furthermore, the switching power supply apparatus 50 according to the first to third embodiments of the present invention is capable of lowering the current peak in the oscillation period even when switching occurs only once in one cycle of the intermittent oscillation. Accordingly, the switching power supply apparatus 50 according to the first to third embodiments of the present invention is capable of shortening the suspension period in any intermittent oscillation, and is thus capable of preventing shutting down of the control circuit and a signification increase in power consumption.

Furthermore, in the switching power supply apparatus 50 according to the first to third embodiments of the present invention, the intermittent oscillation continues even after detection of the decrease in the auxiliary power voltage Vcc to the lower-limit level, so that the effects of power efficiency improvement can be maintained.

It is to be noted that the first to third embodiments are configured such that the reference voltage source 32 generates the reference voltages of two levels, i.e., the lower-limit reference voltage and the upper-limit reference voltage, and the comparison circuit for controlling intermittent oscillation 31 operates with hysteresis, but the configuration may be such that the difference between the lower-limit reference voltage and the upper-limit reference voltage is zero, that is, the reference voltage source 32 generates a reference voltage of a single level, and the comparison circuit for controlling intermittent oscillation 31 does not operate with hysteresis. In the latter case, the feedback control signal Veao will change to alternately a higher level and a lower level than the reference voltage, but there is no influence on lowering of the current peak in the oscillation period of the intermittent oscillation, thus resulting in the same effects as those in the first to third embodiments.

Furthermore, the device current detection circuit 21 according to the first to third embodiments is configured to detect the voltage across the drain and the source of the switching device 8 (ON voltage), which reflects the device current, that is, the voltages on the both terminals of the switching device 8, but other configurations are also applicable such as a configuration including a sense resistor for detecting the device current flowing through the switching device 8. However, the above-described method in which the voltage between the both ends of the switching device 8 is preferable to the method in which the sense resistor is used, because the former method have advantages that the sense resistor is not necessary and that the loss can be reduced.

Furthermore, the above explanation for the first to third embodiments is based on the premise that the control method of the switching device 8 is the PWM control method, but the present invention is not influenced by this control method and other control methods are also applicable such as the PFM control method, in which frequencies are modulated, the burst control method, in which the number of oscillation events is controlled, a method using a ringing choke converter, and a composite control method of these methods.

Furthermore, in order to stabilize the output voltage VOUT at a constant level, the first to third embodiments employ the configuration in which the feedback signal FB_S generated by the output voltage detection circuit 4 is fed back to the control circuits 9A to 9C. However, there is no particular limitation on the feedback configuration and it is also possible to employ a winding feedback configuration in which an auxiliary winding of the transformer is used for the feedback, for example.

Furthermore, the semiconductor device may be formed of a simple monolithic IC by providing on a single semiconductor chip the semiconductor devices 6A to 6C including the switching devices 8 and the control circuits 9A to 9C. Moreover, the semiconductor device may also be formed of one module having two semiconductor chips on which the switching devices 8 are provided on one chip and the control circuits 9A to 9C are provided on the other chip. Such providing of the main circuit components on one semiconductor chip allows for a reduction in the number of components for constituting the circuit, and the use of such a semiconductor device can easily make a power supply apparatus smaller in size and weight and moreover, lower in cost.

Thus, the switching power supply apparatus 50 according to the first to third embodiments of the present invention is capable of preventing problems such as shutting down of the control circuits 9A to 9C caused due to the decrease of the auxiliary power voltage Vcc to the minimum allowable voltage, and a significant increase in power consumption. Furthermore, the switching power supply apparatus 50 according to the first to third embodiments of the present invention rarely have their effects reduced depending on the state of the intermittent oscillation and furthermore, variation and temperature characteristics of the components of the switching power supply apparatus. The present invention is thus capable of enhancing reliability of the switching power supply apparatus 50 and therefore useful for all apparatuses and equipment using switching power sources, especially for embedded power sources of commercial products as well as various electronics.

As above, the explanation for the above embodiments shows specific examples of the present invention, and the present invention is not limited to these examples and may be developed into various examples which a person skilled in the art can easily make using the techniques of the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to switching power supply apparatuses and is useful especially for embedded power sources of commercial products and for various electronics.

What is claimed is:

1. A switching power supply apparatus, comprising:
  a transformer including a primary winding, a secondary winding, and an auxiliary winding;
  a switching device connected in series with said primary winding;
  an output voltage generation circuit which is connected between said secondary winding and a load and generates a direct-current output voltage by rectifying and smoothing a first alternating-current voltage induced in said secondary winding;
  an auxiliary power voltage generation circuit which is connected to said auxiliary winding and generates an auxiliary power voltage by rectifying and smoothing a second alternating-current voltage induced in said auxiliary winding; and
  a control circuit which operates using the auxiliary power voltage and controls an operation of said switching device;
  wherein said control circuit includes:
  a driver circuit which generates first pulse signals for driving said switching device;
  an intermittent operation control circuit which controls said driver circuit so that an intermittent oscillation is performed in which the first pulse signals are generated less frequently when the output voltage is higher than or equal to a first output voltage than when the output voltage is lower than the first output voltage;
  an auxiliary power voltage detection circuit which detects a magnitude of the auxiliary power voltage; and
  a peak current control circuit which:
    (i) sets, to a first peak current value, a peak of a current flowing through said switching device when the output voltage is lower than the first output voltage,
    (ii) sets, to a second peak current value that is smaller than the first peak current value, the peak of the current flowing through said switching device when the output voltage is higher than or equal to the first output voltage and the auxiliary power voltage is higher than a first auxiliary power voltage,
    (iii) sets, to a third peak current value that is smaller than the second peak current value, the peak of the current flowing through said switching device when the output voltage is higher than or equal to the first output voltage and the auxiliary power voltage is lower than or equal to the fist auxiliary power voltage, and
    (iv) outputs a signal to said driver circuit.

2. The switching power supply apparatus according to claim 1,
  wherein the first auxiliary power voltage is higher than a minimum voltage that said control circuit can operate.

3. The switching power supply apparatus according to claim 2, further comprising:
  an output voltage detection circuit which detects a magnitude of the output voltage and generates a feedback control signal indicating the magnitude of the output voltage,
  wherein said peak current control circuit further controls said driver circuit by using said feedback control signal so that, in both of the normal mode and the auxiliary power voltage decrease mode, the peak of the current flowing through said switching device becomes lower as the output voltage becomes higher, the peak being included in each of the first pulse signals.

4. The switching power supply apparatus according to claim 3,
  wherein said intermittent operation control circuit includes:
  a reference voltage source which generates a first reference voltage corresponding to the first output voltage; and
  a comparison circuit for controlling intermittent oscillation, which (i) compares the feedback control signal with the first reference voltage to determine whether or not the output voltage is higher than the first output voltage, (ii) keeps said driver circuit from generating the first pulse signals when the output voltage is higher than the first output voltage, and (iii) causes said driver circuit to generate the first pulse signals when the output voltage is lower than the first output voltage, and
  said peak current control circuit includes:
  a device current detection circuit which detects the device current flowing through said switching device and generates a device current detection signal, which varies to a further extent as the device current becomes larger, in an opposite orientation to an orientation in which the feedback control signal varies as the output voltage becomes higher;
  a comparison circuit for detecting device current, which compares the feedback control signal with the device current detection signal and controls said driver circuit so that each of the first pulse signals becomes inactive at a moment when the device current detection signal and the feedback control signal are equalized; and
  a current peak conversion circuit which converts at least one of the feedback control signal and the device current detection signal, which are inputted to said comparison circuit for detecting device current, so that each of the first pulse signals becomes inactive earlier in the auxiliary power voltage decrease mode than in the normal mode.

5. The switching power supply apparatus according to claim 4,
wherein said reference voltage source further generates a second reference voltage corresponding to a second output voltage higher than the first output voltage,
said comparison circuit for controlling intermittent oscillation further (i) compares the feedback control signal with the second reference voltage to determine whether or not the output voltage is higher than the second output voltage, (ii) keeps said driver circuit from generating the first pulse signals when the output voltage is higher than the second reference voltage, and (ii) causes said driver circuit to generate the first pulse signals when the output voltage is lower than the second output voltage, and
said current peak conversion circuit causes said reference voltage source in the normal mode to generate the first reference voltage and causes said reference voltage source in the auxiliary power voltage decrease mode to generate the second reference voltage so that the feedback control signal which is inputted to said comparison circuit for detecting device current varies to a further extent in the auxiliary power voltage decrease mode than in the normal mode, in an orientation in which the feedback control signal changes as the output voltage becomes higher.

6. The switching power supply apparatus according to claim 5,
wherein said reference voltage source generates the first reference voltage and the second reference voltage as lower-limit reference voltages and further generates a third reference voltage and a fourth reference voltage as upper-limit reference voltages, the third reference voltage corresponding to a third output voltage higher than the first output voltage, and the fourth reference voltage corresponding to a fourth output voltage higher than the second output voltage,
said comparison circuit for controlling intermittent oscillation compares the feedback control signal with the lower-limit voltages and the upper-limit voltages to keep said driver circuit from generating the first pulse signals from when the output voltage increases to a level corresponding to the upper-limit voltages until when the output voltage decreases to a level corresponding to the lower-limit voltages, and
said current peak conversion circuit causes said reference voltage source in the normal mode to generate the first reference voltage as the lower-limit reference voltages and generate the third reference voltage as the upper-limit voltages, and causes said reference source in the auxiliary power voltage decrease mode to generate the second reference voltage as the lower-limit reference voltages and generate the fourth reference voltage as the upper-limit reference voltages.

7. The switching power supply apparatus according to claim 6,
wherein the second output voltage is higher than the third output voltage.

8. The switching power supply apparatus according to claim 4,
wherein said current peak conversion circuit varies the feedback control signal which is inputted to said comparison circuit for detecting device current to a further extent in the auxiliary power voltage decrease mode than in the normal mode, in an orientation in which the feedback control signal changes as the output voltage becomes higher.

9. The switching power supply apparatus according to claim 4,
wherein the current peak conversion circuit varies the device current detection signal which is inputted to said comparison circuit for detecting device current to a further extent in the auxiliary power voltage mode than in the normal mode, in an orientation in which the device current detection signal changes as the output voltage becomes higher.

10. The switching power supply apparatus according to claim 4,
wherein said device current detection circuit detects voltages on both terminals of said switching device to generate the device current detection signal.

11. The switching power supply apparatus according to claim 4,
wherein said driver circuit includes:
a flip-flop circuit which generates the first pulse signals to turn on said switching device when said flip-flop circuit is in a set state and to turn off said switching device when said flip-flop circuit is in a reset state;
an oscillation circuit which generates second pulse signals, which are generated at constant frequency; and
a logical AND circuit which supplies the second pulse signals to a set terminal of said flip-flop circuit when said comparison circuit for controlling intermittent oscillation determines that the output voltage is lower the first output voltage and which maintains an existing state of said flip-flop circuit when said comparison circuit for controlling intermittent oscillation determines that the output voltage is higher the first output voltage, and
said comparison circuit for detecting device current resets said flip-flop circuit at a moment when the device current detection signal and the feedback control signal are equalized.

12. A semiconductor device, comprising:
said control circuit recited in claim 1,
wherein said control circuit is provided on a single semiconductor chip.

13. A semiconductor device, comprising:
said control circuit and said switching device recited in claim 1,
wherein said control circuit and said switching device are provided on a single semiconductor chip.

14. A semiconductor device, comprising:
said control circuit recited in claim 1,
wherein said control circuit is provided over semiconductor chips, and said semiconductor chips are included in a single module.

15. A semiconductor device, comprising:
said control circuit and said switching device recited in claim 1,
wherein said control circuit and said switching device are provided over semiconductor chips, and
said semiconductor chips are included in a single module.

* * * * *